United States Patent
Sanji et al.

(10) Patent No.: US 11,027,701 B2
(45) Date of Patent: Jun. 8, 2021

(54) LOCATION DETERMINATION SYSTEM

(71) Applicants: SOKEN, INC., Nisshin (JP); DENSO CORPORATION, Kariya (JP)

(72) Inventors: Kenichiro Sanji, Nisshin (JP); Taichi Yamaguchi, Kariya (JP); Munenori Matsumoto, Kariya (JP); Noritaka Hirao, Kariya (JP)

(73) Assignees: SOKEN, INC., Nisshin (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 16/549,991

(22) Filed: Aug. 23, 2019

(65) Prior Publication Data

US 2019/0375372 A1 Dec. 12, 2019

Related U.S. Application Data

(63) Continuation of application No. PCT/JP2018/000927, filed on Jan. 16, 2018.

(30) Foreign Application Priority Data

Feb. 28, 2017 (JP) .............................. JP2017-036124
Nov. 27, 2017 (JP) .............................. JP2017-226766

(51) Int. Cl.
*B60R 25/24* (2013.01)
*H04W 4/40* (2018.01)
(Continued)

(52) U.S. Cl.
CPC ............ *B60R 25/245* (2013.01); *B60R 25/31* (2013.01); *G07C 9/00309* (2013.01);
(Continued)

(58) Field of Classification Search
CPC ....... B60R 25/245; B60R 25/31; B60R 25/10; B60R 25/241; B60R 16/037; H04W 4/40;
(Continued)

(56) References Cited

U.S. PATENT DOCUMENTS 9,124,703 B2 * 9/2015 Tadayon ............... H04W 4/029
10,425,176 B2 * 9/2019 Hamada ................. H04B 17/27
(Continued)

FOREIGN PATENT DOCUMENTS

JP H09284841 A 10/1997
JP 20122031 A 1/2012
(Continued)

*Primary Examiner* — An T Nguyen
(74) *Attorney, Agent, or Firm* — Harness, Dickey & Pierce, P.L.C.

(57) ABSTRACT

A location determination system is provided. The location determination system includes a vehicle device mounted in a vehicle, and a mobile terminal provided as a communication terminal to be carried by a user of the vehicle and set to transmit a radio signal including transmission source information at least once within a predetermined period of time. The vehicle device may receive the radio signal transmitted from the mobile terminal via an antenna disposed in the vehicle and detect a reception strength of the received radio signal. The vehicle device may determine, based on the reception strength of the radio signal detected by the reception portion, whether the mobile terminal is present inside a target area set in advance based on a position at which the antenna is disposed.

22 Claims, 24 Drawing Sheets

(51) Int. Cl.
*B60R 25/31* (2013.01)
*G07C 9/00* (2020.01)
*H04W 4/02* (2018.01)

(52) U.S. Cl.
CPC .............. *H04W 4/023* (2013.01); *H04W 4/40* (2018.02); *G07C 2209/63* (2013.01)

(58) Field of Classification Search
CPC ....... H04W 4/023; H04W 4/021; H04W 4/48; G07C 9/00309; G07C 2209/63; G01S 5/02; G01S 11/06; H04Q 9/00; H01Q 1/3233
See application file for complete search history.

(56) References Cited

U.S. PATENT DOCUMENTS

| | | | | |
|---|---|---|---|---|
| 2006/0273888 | A1* | 12/2006 | Yamamoto | B60R 25/33 340/426.36 |
| 2008/0106375 | A1* | 5/2008 | Nakajima | B60R 25/245 340/5.72 |
| 2014/0045531 | A1* | 2/2014 | Kessoku | H04W 4/021 455/456.2 |
| 2015/0149042 | A1* | 5/2015 | Cooper | H04W 4/48 701/48 |
| 2015/0329081 | A1* | 11/2015 | Morita | H04W 4/023 701/2 |
| 2016/0063786 | A1* | 3/2016 | Lewis | G07C 9/00309 340/5.72 |
| 2016/0267734 | A1* | 9/2016 | Hamada | G07C 9/00309 |
| 2016/0272154 | A1 | 9/2016 | Sanji et al. | |
| 2017/0054842 | A1* | 2/2017 | Choi | H04W 4/40 |
| 2017/0203721 | A1* | 7/2017 | Hamada | G01S 1/08 |
| 2018/0234797 | A1* | 8/2018 | Ledvina | B60R 25/24 |
| 2019/0375372 | A1* | 12/2019 | Sanji | H04W 4/40 |
| 2020/0233072 | A1* | 7/2020 | Osai | B60R 25/10 |

FOREIGN PATENT DOCUMENTS

| | | |
|---|---|---|
| JP | 2012172334 A | 9/2012 |
| JP | 2015085899 A | 5/2015 |
| JP | 2015184261 A | 10/2015 |
| JP | 2015186212 A | 10/2015 |
| JP | 2015190774 A | 11/2015 |
| JP | 2015200516 A | 11/2015 |
| JP | 2015214316 A | 12/2015 |
| JP | 2016038320 A | 3/2016 |
| JP | 2016061686 A | 4/2016 |
| JP | 2016-094801 A | 5/2016 |
| JP | 2016148590 A | 8/2016 |
| JP | 2016148591 A | 8/2016 |
| JP | 2016155526 A | 9/2016 |
| JP | 2016176789 A | 10/2016 |
| JP | 2016200478 A | 12/2016 |
| WO | WO-2014/171082 A1 | 10/2014 |

\* cited by examiner

LOCATION DETERMINATION SYSTEM

CROSS REFERENCE TO RELATED APPLICATIONS

The present application is a continuation application of International Patent Application No. PCT/JP2018/000927 filed on Jan. 16, 2018, which designated the U.S. and claims the benefit of priority from Japanese Patent Application No. 2017-036124 filed on Feb. 28, 2017 and Japanese Patent Application No. 2017-226766 filed on Nov. 27, 2017. The entire disclosures of all of the above applications are incorporated herein by reference.

TECHNICAL FIELD

The present disclosure relates to a location determination system in which a vehicle device mounted in a vehicle estimates a location of a mobile terminal carried by a user who uses the vehicle.

BACKGROUND

A system in which a vehicle device mounted in a vehicle performs wireless communication with a mobile terminal carried by a user of the vehicle to estimate a location of the mobile terminal relative to the vehicle has been proposed.

SUMMARY

The present disclosure provides a location determination system. The location determination system includes a vehicle device mounted in a vehicle, and a mobile terminal provided as a communication terminal to be carried by a user of the vehicle and set to transmit a radio signal including transmission source information at least once within a predetermined period of time. The vehicle device may receive the radio signal transmitted from the mobile terminal via an antenna disposed in the vehicle and detect a reception strength of the received radio signal. The vehicle device may determine, based on the reception strength of the radio signal detected by the reception portion, whether the mobile terminal is present inside a target area set in advance based on a position at which the antenna is disposed.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
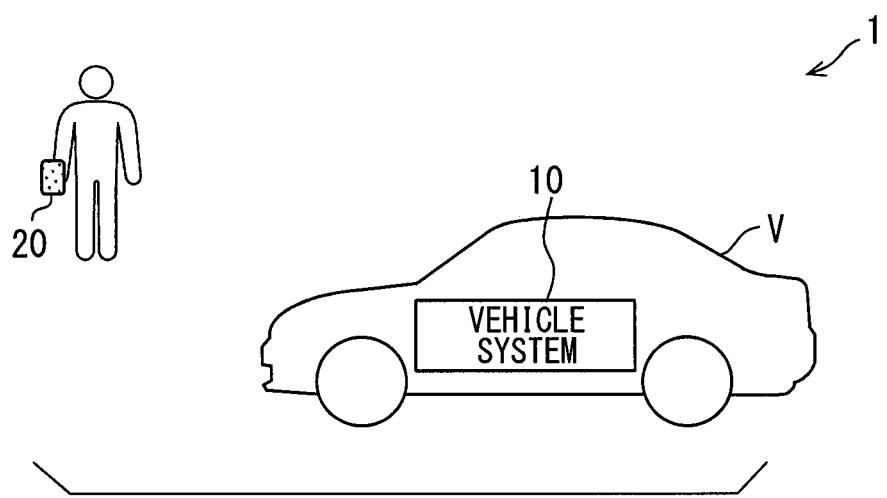
FIG. 1 is a view showing a schematic configuration of a location determination system.

For example, a system (hereinafter referred to as the location estimation system) in which a vehicle device mounted in a vehicle performs wireless communication with a mobile terminal carried by a user of the vehicle to estimate a location of the mobile terminal relative to the vehicle has been proposed. Specifically, when receiving a request signal requesting a response signal returned from the vehicle device, the mobile terminal disclosed in Patent Document 1 returns the response signal including an RSSI (Received Signal Strength Indication) of the request signal. The vehicle device sequentially stores, in a memory, the RSSIs included in the response signals returned from the mobile terminal. Then, when an average value of the most recent five RSSIs stored in the memory is in excess of a predetermined threshold, the vehicle device determines that the mobile terminal is present inside a vehicle compartment. On the other hand, when the average value of the most recent five RSSIs is equal to or less than the threshold, the vehicle device determines that the mobile terminal is present outside the vehicle compartment.

Note that the mobile terminal described above is a communication terminal having a communication function based on the Bluetooth (registered trademark) and, a smart phone, a mobile phone, or the like is assumed as the mobile terminal. Accordingly, the vehicle device performs wireless communication based on the Bluetooth (registered trademark). For the sake of convenience, communication based on a predetermined wireless communication standard according to which a communication area extends over, e.g., a maximum of about several tens of meters, such as the Bluetooth, is hereinafter referred to as short-range communication.

In a configuration in which a short-range communication antenna is disposed inside a vehicle compartment, the present inventors have performed a test for a relationship between a reception strength of a signal transmitted from a mobile terminal and received by a vehicle device and a location of the mobile terminal, and obtained the following findings.

When the mobile terminal is present inside the vehicle compartment, in a large number of regions in the vehicle compartment, the reception strengths sufficiently larger than those obtained when the mobile terminal is present outside the vehicle compartment are obtained. However, even when the mobile terminal is present inside the vehicle compartment, there may be a position (hereinafter referred to as the null point) at which a plurality of radio waves caused by a multipath function weaken each other, and the reception strength decreases to be significantly lower than that in the other region inside the vehicle compartment.

In a configuration in which the vehicle device estimates the location of the mobile terminal based on a comparison between the reception strength of a signal from the mobile terminal and a predetermined threshold, when the mobile terminal is present at the null point inside the vehicle compartment, there is a case where the reception strength of the signal from the mobile terminal cannot exceed the threshold, and the vehicle device erroneously determines that the mobile terminal is present outside the vehicle compartment.

An example embodiment of the present disclosure provides a location determination system which can more accurately determine whether or not a mobile terminal is present inside a predetermined target area.

In the example embodiment of the present disclosure, a location determination system according to the present disclosure includes a vehicle device and a mobile terminal. The vehicle device is mounted in a vehicle. The mobile terminal is provided as a communication terminal to be carried by a user of the vehicle and set to transmit a radio signal including transmission source information at least once within a predetermined period of time. The vehicle device includes a reception portion and a location determination portion. The reception portion receives the radio signal transmitted from the mobile terminal via an antenna disposed in the vehicle and detects a reception strength of the received radio signal. The location determination portion determines, based on the reception strength of the radio signal detected by the reception portion, whether the mobile terminal is present inside a target area set in advance based on a position at which the antenna is disposed. Two parameters that are a high level threshold and a low level threshold lower than the high level threshold are set as determination thresholds for the location determination portion to determine whether the mobile terminal is present inside the target area based on the reception strength of the radio signal detected by the reception portion. In a state where the location determination portion has determined that the mobile terminal is present outside the target area, when the reception strength of the radio signal detected by the reception portion becomes equal to or more than the high level threshold, the location determination portion determines that the mobile terminal is present inside the target area. In a state where the location determination portion has determined that the mobile terminal is present inside the target area, when the reception strength of the radio signal detected by the reception portion becomes equal to or less than the low level threshold, the location determination portion determines that the mobile terminal is present outside the target area.

In the configuration described above, when the reception strength detected by the reception portion becomes equal to or more than the predetermined high level threshold, the location determination portion determines that the location of the mobile terminal is inside the target area, and holds a result of the determination until the reception strength becomes equal to or less than the low level threshold. When the reception strength becomes equal to or less than the low level threshold, the location determination portion determines that the location of the mobile terminal has shifted from the inside of the target area to the outside of the target area, and holds a result of the determination until the reception strength becomes equal to or more than the high level threshold.

Accordingly, once the location determination portion determines that the mobile terminal is present inside the target area, even when the reception strength of the signal from the mobile terminal temporarily decreases under the influence of a multipath or the like, the result of the determination that the mobile terminal is present inside the target result is maintained unless the reception strength becomes equal to or less than the low level threshold. Therefore, it is possible to reduce the probability of erroneously determining the location of the mobile terminal due to a multipath. In other words, it is possible to more accurately determine whether or not the mobile terminal is present inside a predetermined area.

First Embodiment

The following will describe a first embodiment as an example of embodiments of the present disclosure. FIG. 1 is a view showing an example of a schematic configuration of a location determination system 1 according to the present disclosure. As shown in FIG. 1, the location determination system 1 includes an vehicle system 10 mounted in a vehicle V and a mobile terminal 20 as a communication terminal to be carried by a user of the vehicle V. For the sake of convenience, in the present description, the vehicle V is assumed to be a vehicle in which a driver seat (i.e., a steering wheel) is provided on a right side thereof, but the vehicle V is not limited thereto. The vehicle V may also be a vehicle in which a driver seat is provided on a left side thereof.

The mobile terminal 20 is a communication terminal having a function of performing communication (hereinafter referred to as the short-range communication) based on a predetermined short-range wireless communication standard according to which a communication range extends over, e.g., a maximum of about several tens of meters. Examples of the short-range wireless communication standard adopted herein include the Bluetooth Low Energy (Bluetooth is a registered trademark), the Wi-Fi (a registered trademark), and the ZigBee (a registered trademark).

The mobile terminal 20 may appropriately have the short-range communication function described above. For example, a smart phone can be used as the mobile terminal 20. Needless to say, the mobile terminal 20 may also be a tablet terminal, a wearable device, a mobile music player, a mobile game machine, or the like. The wearable device may also have a function of sensing biological information such as a pulse. Signals transmitted from the mobile terminal 20 for short-range communication include transmission source information. The transmission source information is, e.g., identification information (hereinafter referred to as the terminal ID) allocated to the mobile terminal 20. The terminal ID functions as information for distinguishing the mobile terminal 20 from another communication terminal.

The mobile terminal 20 wirelessly transmits communication packets each including the transmission source information at predetermined transmission intervals to notify a peripheral communication terminal having the short-range communication function of the presence of the mobile terminal 20 (i.e., advertise the presence of the mobile terminal 20). For the sake of convenience, the communication packets periodically transmitted for an advertising purpose are hereinafter referred to as the advertise packets.

Note that the mobile terminal 20 is configured to wirelessly transmit the advertise packets at the predetermined transmission intervals (e.g., 100 milliseconds). The transmission intervals of the advertise packets may also be variable depending on a situation in which the mobile terminal 20 is operating. For example, when a predetermined application using the short-range communication function is operating in the foreground in the mobile terminal 20, the transmission intervals are set to relatively short periods of time (e.g., 50 milliseconds). On the other hand, when the application is not operating in the foreground, the transmission intervals are set to relatively long periods of time (200 milliseconds). The mobile terminal 20 may appropriately be configured to transmit the advertise packet at least once in a predetermined period of time (e.g., 200 milliseconds) defined by the location determination system 1.

The vehicle system 10 also has the short-range communication function described above. The vehicle system 10 receives the signals (e.g., the advertise packets) transmitted from the mobile terminal 20 to detect the presence of the mobile terminal 20 in a range in which the mobile terminal 20 can perform short-range communication with the vehicle system 10. The range in which the vehicle system 10 can perform short-range communication with the mobile terminal 20 is hereinafter referred to also as the communication area. The vehicle system 10 corresponds to a vehicle device.

(Vehicle System 10)

Figure 2:
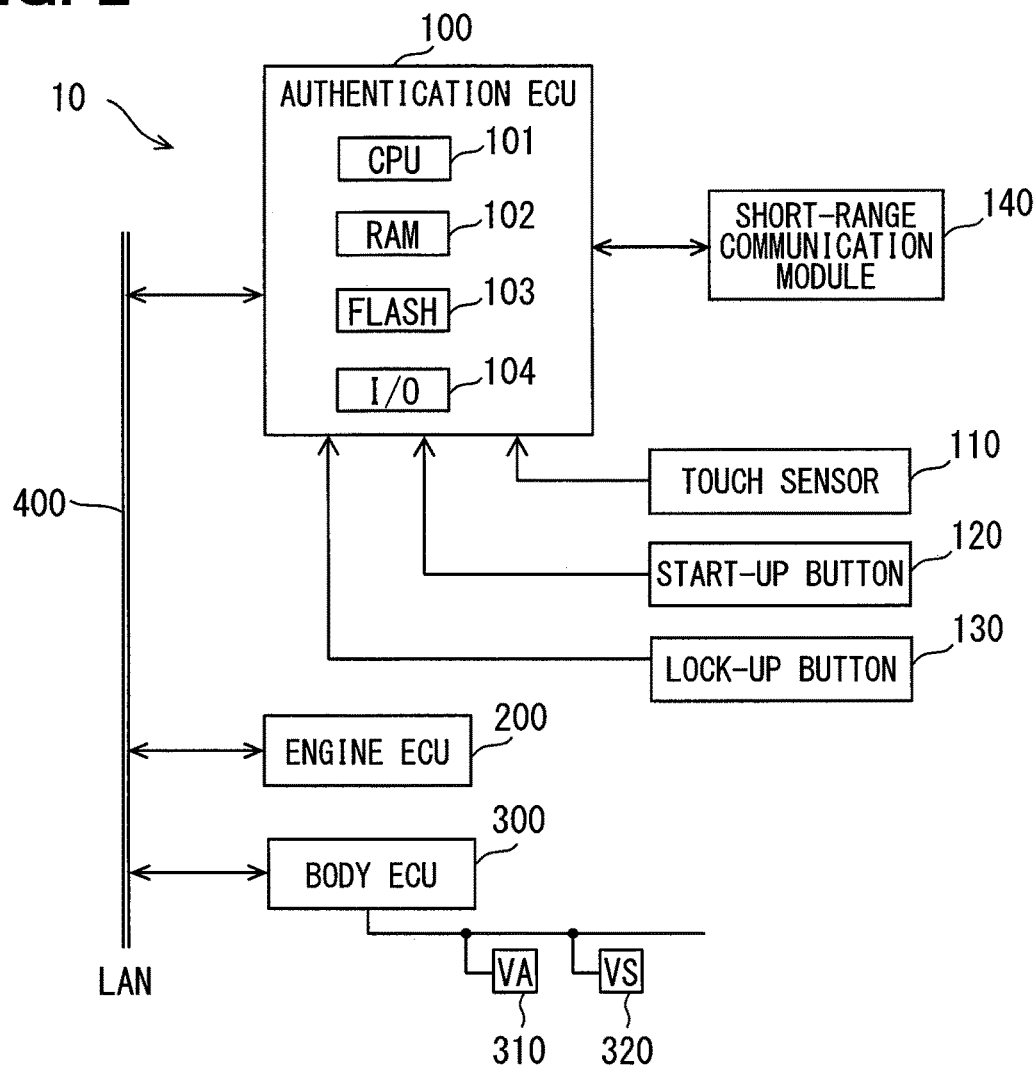
FIG. 2 is a block diagram showing a schematic configuration of a vehicle system of a first embodiment.

Next, a description will be given of a configuration and an operation of the vehicle system 10. As shown in FIG. 2, the vehicle system 10 includes an authentication ECU 100, a short-range communication module 140, touch sensors 110, a start-up button 120, lock-up buttons 130, an engine ECU 200, and a body ECU 300. Note that the ECU stands for Electronic Control Unit.

The short-range communication module 140 is intercommunicatively connected to the authentication ECU 100. Each of the touch sensors 110, the start-up button 120, and the lock-up buttons 130 is electrically connected to the authentication ECU 100. The authentication ECU 100 is intercommunicatively connected to each of the engine ECU 200 and the body ECU 300 via a communication network (hereinafter referred to as the LAN standing for Local Area Network) 400 built in the vehicle.

Briefly speaking, the authentication ECU 100 is an ECU which collaborates (i.e., cooperates) with the short-range communication module 140 to estimate the location of the mobile terminal 20 and implement vehicle control based on the estimation result in cooperation with the other ECUs.

The authentication ECU 100 is implemented using a computer. Specifically, the authentication ECU 100 includes a CPU 101, a RAM (Random Access Memory) 102, a flash memory 103, an I/O 104, and a bus line connecting these components.

The CPU 101 is an arithmetic processing unit which executes various arithmetic processes. The RAM 102 is a volatile storage medium. The flash memory 103 is a rewritable nonvolatile storage medium. The I/O 104 is a circuit module which functions as an interface for allowing the authentication ECU 100 to communicate with the short-range communication module 140 or another device mounted in the vehicle V and not shown. The I/O 104 may appropriately be implemented using an analog circuit element, an IC, or the like.

In the flash memory 103, the terminal ID allocated to the mobile terminal 20 owned by the user is registered. For the sake of convenience, the terminal ID registered as the terminal ID of the mobile terminal 20 in the flash memory 103 is hereinafter referred to also as the registration ID. Also, in the flash memory 103, a program (hereinafter referred to as the location determination program) for causing a typical computer to function as the authentication ECU 100 and the like are stored. Note that the location determination program described above may appropriately be stored in a non-transitory tangible storage medium. Execution of the location determination program by the CPU 101 corresponds to execution of a method corresponding to the location determination program.

Details of the authentication ECU 100 will be separately described later. The vehicle system 10 is configured such that, even when a driving power source (e.g., an ignition power source) of the vehicle V is OFF, a sufficient power required to perform a location determination process described later is supplied from an in-vehicle battery to the authentication ECU 100.

The touch sensors 110 are provided in individual door handles of the vehicle V to detect contact of the user with the door handles. Results of the detection by the individual touch sensors 110 are sequentially output to the authentication ECU 100.

The start-up button 120 is a push switch for allowing the user to start up a drive source (e.g., an engine). When the user performs a pushing operation on the start-up button 120, the start-up button 120 outputs a control signal indicative of the pushing operation to the authentication ECU 100. By way of example, it is assumed herein that the vehicle V is a vehicle including the engine as a power source, but the vehicle V is not limited thereto. The vehicle V may also be an electric vehicle or a hybrid vehicle. When the vehicle V is a vehicle including a motor as the drive source, the start-up button 120 is a switch for starting up the drive motor.

The lock-up buttons 130 are buttons for allowing the user to lock up individual doors of the vehicle V. The lock-up buttons 130 may appropriately be provided in the individual door handles. When depressed by the user, each of the lock-up buttons 130 outputs a control signal indicative of the depression to the authentication ECU 100.

Figure 3:
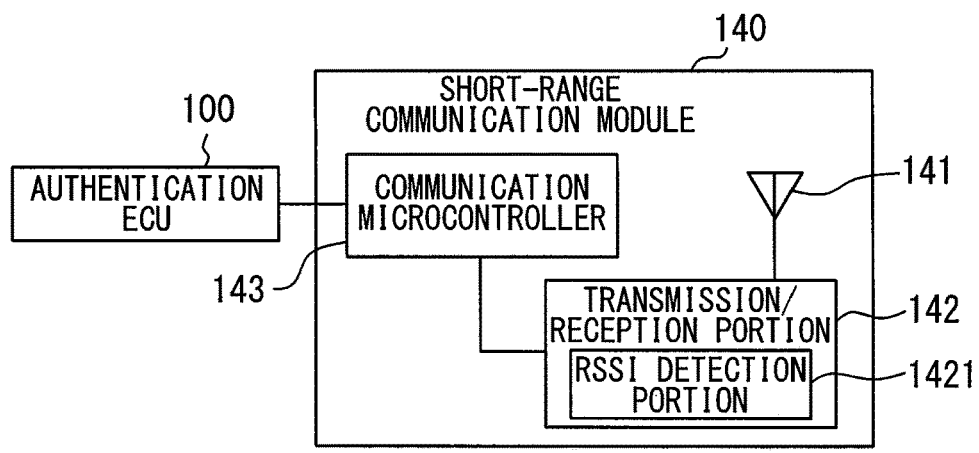
FIG. 3 is a block diagram showing a schematic configuration of a short-range communication module.

The short-range communication module 140 is a communication module for performing the short-range communication. The short-range communication module 140 corresponds to a reception portion. As shown in FIG. 3, the short-range communication module 140 includes, as subordinate components, an antenna 141, a transmission/reception portion 142, and a communication microcontroller 143.

The antenna 141 is an antenna for transmitting/receiving a radio wave in a frequency band (e.g., 2.4 GHz band) used for the short-range communication. In the present embodiment, by way of example, the antenna 141 is assumed to be a non-directional antenna. In another mode, the antenna 141 may also have directionality.

The transmission/reception portion 142 demodulates a signal received by the antenna 141 and provides the resulting signal to the communication microcontroller 143. The transmission/reception portion 142 also modulates a signal input thereto from the authentication ECU 100 via the communication microcontroller 143 and outputs the resulting signal to the antenna 141 to allow the signal to be radiated as a radio wave.

The transmission/reception portion 142 includes an RSSI detection portion 1421 which sequentially detects strength of the signal (hereinafter each referred to as RSSI standing for Received Signal Strength Indication) received by the antenna 141. The RSSIs detected by the RSSI detection portion 1421 are each assigned to the terminal ID included in reception data and sequentially provided to the communication microcontroller 143. Note that each of the RSSIs may appropriately be represented in, e.g., units [dBm] of electric power. For the sake of convenience, data in which the RSSI is assigned to the terminal ID is referred to as RSSI data.

The communication microcontroller 143 is a microcontroller which controls data reception/delivery from/to the authentication ECU 100, which is implemented using a MPU (Micro-processing unit), a RAM, or the like. The communication microcontroller provides the reception data input thereto from the transmission/reception portion 142 to the authentication ECU 100 in sequential order or based on a request from the authentication ECU 100. Specifically, the data received by the transmission/reception portion 142 is provided to the authentication ECU 100 via the communication microcontroller 143.

When acquiring the RSSI data from the RSSI detection portion 1421, the communication microcontroller 143 cumulatively stores the acquired RSSI data in the RAM not shown. The sequentially acquired RSSI data items may appropriately be sorted in chronological order such that, e.g., the RSSI of the most recent reception data occupies a leading position, and then stored in the RAM. When a given period of time has elapsed since each of the RSSI data items was stored, the data item may appropriately be discarded in sequential order. In other words, each of the RSSI data items is stored in the RAM for a given period of time. The communication microcontroller 143 provides the RSSI data items stored in the RAM based on a request from the authentication ECU 100.

Note that the RSSI data items provided to the authentication ECU 100 may appropriately be deleted from the RAM. The period during which each of the RSSI data items is stored in the communication microcontroller 143 may appropriately be set to a value longer than that of a predetermined sampling period. The sampling period is a time interval between successive acquisition (i.e., sampling) of the RSSIs of the signals transmitted from the mobile terminal 20 by the authentication ECU 100. In the present embodiment, the sampling period corresponds to a time interval between successive issuing of requests to provide the RSSI data items from the authentication ECU 100 to the communication microcontroller. A specific value of the sampling interval may appropriately be designed. It is assumed herein that, by way of example, the sampling interval is set to 200 milliseconds.

In the present embodiment, it is assumed that each of the RSSI data items output from the transmission/reception portion 142 is temporarily stored in the RAM, and the communication microcontroller 143 provides the RSSI data items stored in the RAM to the authentication ECU 100 based on requests from the ECU 100. However, a configuration to be adopted is not limited thereto. It may also be possible to adopt a configuration in which the RSSI data items are provided in sequential order to the authentication ECU 100.

The short-range communication module 140 including the antenna 141 may appropriately be disposed at a position designed appropriately in a vehicle compartment so as to form the communication area in at least a space (hereinafter referred to as front passenger space) around front seats, such as a driver seat and a front passenger seat, inside the vehicle compartment. The communication area for the given short-range communication module 140 is a range in which the short-range communication module 140 can bidirectionally communicate with the mobile terminal 20. The communication area can be adjusted by adjusting parameters such as a signal transmission power and a signal reception sensitivity in the short-range communication module 140 and a position in which the short-range communication module 140 is mounted. Preferably, the antenna 141 is disposed such that each of regions outside the doors (i.e., a region outside the vehicle compartment) is an out-of-sight region.

The out-of-sight region for the antenna 141 is a region at which a signal transmitted from the antenna 141 does not directly arrive. Note that, since a propagation path for a radio signal is reversible, in other words, the out-of-sight region for the antenna 141 corresponds to a region where the antenna 141 can directly receive a signal transmitted from the mobile terminal 20. Even when the mobile terminal 20 is present in the out-of-sight region, the signal transmitted from the mobile terminal 20 may reach the out-of-sight region by being reflected by various structures.

Figure 4:
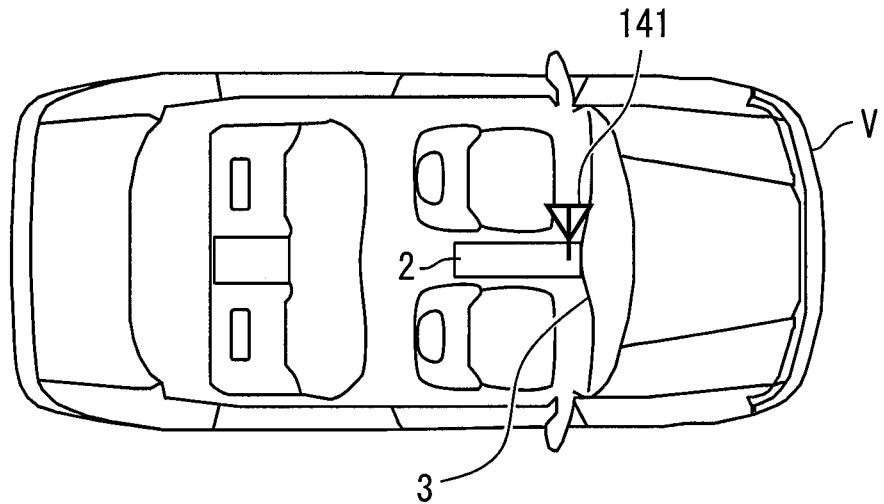
FIG. 4 is a view showing an example of a location at which a short-range communication module is disposed.

In the present embodiment, by way of example, it is assumed that, as shown in FIG. 4, the short-range communication module 140 is disposed in the vicinity of a boundary between a center console 2 and an instrument panel 3 so as to form the communication area in the entire space inside the vehicle compartment. Note that the position at which the short-range communication module 140 is disposed is not limited thereto. The short-range communication module 140 may also be disposed, e.g., at feet under the driver seat or in a side surface of a door for the driver seat inside the vehicle compartment such that the vicinity of the driver seat inside the vehicle compartment is in sight and a region outside the vehicle compartment is out of sight. Note that FIG. 4 is a conceptual top view of the vehicle V and shows the vehicle V through a roof portion thereof to allow the center console 2 and the like to be illustrated.

When leakage of a radio wave to the outside of the vehicle compartment is permitted, the antenna 141 may also be disposed at a center of a roof portion inside the vehicle compartment. Note that, when the antenna 141 is formed of a directional antenna, even though the antenna 141 is to be provided at the roof inside the vehicle compartment, it is possible to inhibit the radio wave from leaking to the outside of the vehicle compartment by disposing the antenna 141 in a position in which a center of the directionality thereof faces a floor surface of the vehicle V. In the present embodiment, by way of example, it is assumed that only one short-range communication module 140 is provided inside the vehicle compartment. As will be described later in another embodiment, it may also be possible to provide a plurality of the short-range communication modules 140 in the vehicle compartment.

The engine ECU 200 is an ECU which controls an operation of the engine mounted in the vehicle V. The body ECU 300 is an ECU communicatively connected to various in-vehicle actuators (VA) 310 and various in-vehicle sensors 320 to control the in-vehicle actuators 310 based on a request from the authentication ECU 100. Examples of the in-vehicle actuators 310 mentioned herein include door lock motors included in respective locking mechanisms for the individual doors and actuators (hereinafter referred to as seat actuators) for adjusting seat positions. The in-vehicle sensors (VS) 320 mentioned herein includes respective courtesy switches disposed for the individual doors and the like. The courtesy switches are sensors which detect the opening/closing of the doors. The body ECU 300 locks or unlocks each of the doors by outputting, based on, e.g., a request from the authentication ECU 100, a predetermined control signal to the door lock motor provided in each of the doors of the vehicle V.

(Authentication ECU 100)

Figure 5:
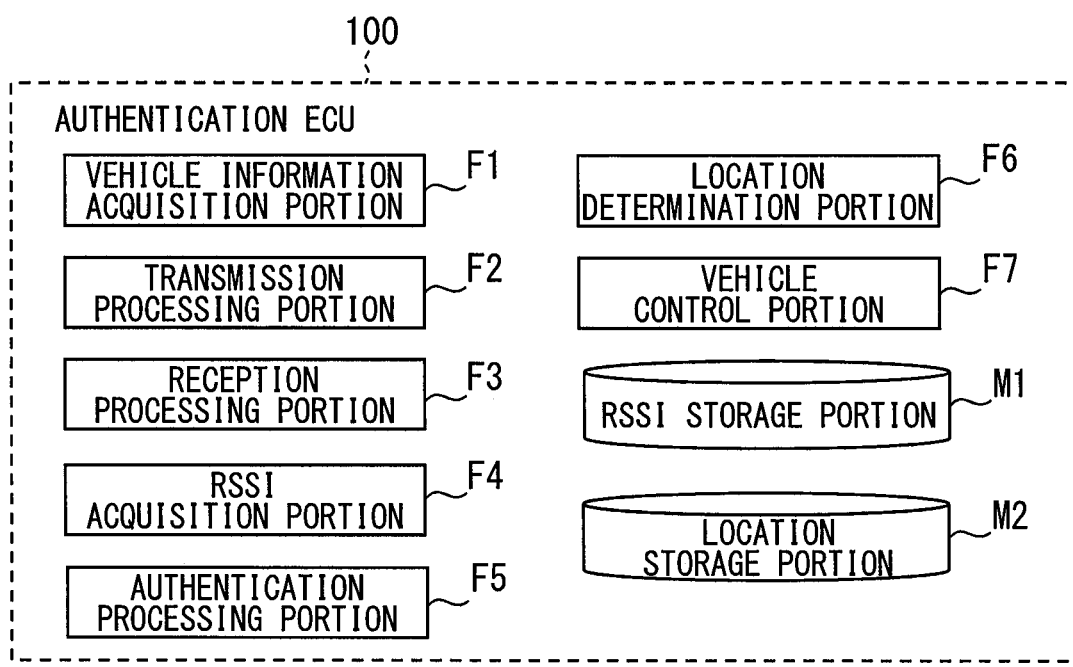
FIG. 5 is a view showing a schematic configuration of an authentication ECU.

The authentication ECU 100 executes the location determination program described above to provide functions corresponding to various functional blocks shown in FIG. 5. Specifically, the authentication ECU 100 includes, as the functional blocks, a vehicle information acquisition portion F1, a transmission processing portion F2, a reception processing portion F3, an RSSI acquisition portion F4, an authentication processing portion F5, a location determination portion F6, and a vehicle control portion F7.

Note that some or all of the functions to be performed by the authentication ECU 100 may also be implemented as hardware using logic circuits or the like. Modes in which the functions performed by the authentication ECU 100 are implemented as hardware also include modes in which the functions performed by the authentication ECU 100 are implemented using a single or plurality of ICs. Also, some or all of the functional blocks included in the authentication ECU 100 may be implemented by a combination of execution of software by the CPU 101 and an electronic circuit.

The authentication ECU 100 includes an RSSI storage portion M1 and a location storage portion M2. The RSSI storage portion M1 is a storage region for storing the RSSIs of the signals transmitted from the mobile terminal 20. The location storage portion M2 is a storage region in which data indicative of the location of the mobile terminal, such as whether or not the mobile terminal 20 is present inside the vehicle compartment, is to be stored.

Each of the RSSI storage portion M1 and the location storage portion M2 may appropriately be a memory (e.g., a nonvolatile memory) which retains data even during a period during which the driving power source of the vehicle V is OFF. Even during the period during which the driving power source of the vehicle V is OFF, data in the RAM 102 is retained with a power supplied from the in-vehicle battery. Therefore, in the present embodiment, by way of example, it is assumed that each of the RSSI storage portion M1 and the location storage portion M2 is implemented using a portion of a storage region included in the RAM 102. Note that, in another mode, each of the RSSI storage portion M1 and the location storage portion M2 may also be implemented using a rewritable nonvolatile storage medium such as the flash memory 103. The location storage portion M2 may also be implemented using a register included in the CPU 101.

The vehicle information acquisition portion F1 acquires, from the sensors (e.g., the touch sensors 110) and the ECUs (e.g., the body ECU 300) which are mounted in the vehicle V, various information (hereinafter referred to as vehicle information) showing states of the vehicle V. To the vehicle information, e.g., an open/closed state of each of the doors, a locked/unlocked state of each of the doors, the presence or absence of a touch on each of the door handles, the presence or absence of depression of the start-up button 120, and the like correspond. Note that information included in the vehicle information is not limited to that mentioned above. A shift position detected by a shift position sensor not shown, a result of detection by a brake sensor which detects whether or not a brake pedal is stepped on, and the like are also included in the vehicle information. Note that acquiring information showing the locked or unlocked state of each of the doors corresponds to determining the locked or unlocked state of each of the doors.

The vehicle information acquisition portion F1 specifies, based on the various information described above, a current state of the vehicle V. For example, when the engine is OFF and all the doors are locked, the vehicle information acquisition portion F1 determines that the vehicle V is parked. Needless to say, conditions for determining that the vehicle V is parked may appropriately be designed, and various determination conditions and the like can be used appropriately. The vehicle information acquisition portion F1 corresponds to a vehicle state determination portion.

The transmission processing portion F2 generates data addressed to the mobile terminal 20, and outputs the generated data to the short-range communication module 140. Thus, the transmission processing portion F2 allows a signal corresponding to intended data to be transmitted as a radio wave. The reception processing portion F3 is configured to acquire the reception data from the short-range communication module 140.

The RSSI acquisition portion F4 is configured to acquire the RSSI data from the short-range communication module 140. The RSSI acquisition portion F4 of the present embodiment issues, to the short-range communication module 140, a request to provide the RSSI data items at the predetermined sampling intervals and thus acquires the RSSI data items.

When the RSSI data items acquired from the short-range communication module 140 include the RSSIs of the signals transmitted from the mobile terminal 20, the RSSI acquisition portion F4 stores the RSSIs in the RSSI storage portion M1. In other words, the RSSI acquisition portion F4 collects the RSSIs of the signals transmitted from the mobile terminal 20. Note that the RSSIs of the signals transmitted from the mobile terminal 20 are the RSSIs each assigned to the terminal ID of the mobile terminal 20. The RSSIs of the signals transmitted from the mobile terminal 20 are hereinafter referred to as the RSSIs of the mobile terminal 20 for short.

Note that the RSSIs of signals from the sources other than the mobile terminal 20 may appropriately be discarded. A process of discarding the RSSIs of the signals from sources other than the mobile terminal 20 may also be performed appropriately in the short-range communication module 140 (e.g., the communication microcontroller 143). In that case, it is assumed that the terminal ID of the mobile terminal 20 is registered also in the short-range communication module 140.

When the mobile terminal 20 is present around the vehicle V, in the RSSI storage portion M1, the RSSIs of the mobile terminal 20 are sequentially accumulated. The plurality of RSSIs acquired at different times may appropriately be sorted in chronological order such that, e.g., the RSSI of the most recent reception data occupies a leading position, and then stored in the RAM 102. When a given period of time has elapsed since each of the RSSIs was stored in the RAM 102, the RSSI may appropriately be deleted in sequential order. In such a configuration, in the RAM 102, the RSSIs of the signals received within a most recent given period of time are stored. The period of time during which each of the RSSIs is to be retained may appropriately be, e.g., five to ten times the sampling period.

Note that, when a plurality of mobile terminals 20 are registered in the vehicle system 10 and when the RSSIs from the plurality of mobile terminals 20 have successfully been acquired, the RSSI acquisition portion F4 separately stores the RSSIs of the individual mobile terminals 20 according to the individual terminal IDs of the RSSIs.

The authentication processing portion F5 cooperates with the short-range communication module 140 to perform a process of authenticating the mobile terminal 20 (hereinafter referred to as the authentication process). It is assumed that the short-range communication for authentication is performed using encryption. In other words, the authentication process is performed by encrypted communication. The authentication process may be performed appropriately using various methods such as a challenge-response method, though a detailed description thereof is omitted herein. It is assumed that data (e.g., a verification code) required for the authentication process is stored in each of the mobile terminal 20 and the authentication ECU 100.

Note that the vehicle system 10 may also include a short-range communication module for specifying the location of the mobile terminal 20 and a short-range communication module (data communication module) for performing data communication with the mobile terminal 20 as separate modules. In that case, the data communication module has the function of performing the authentication process with the mobile terminal 20. The data communication module functions as a gateway.

The location determination portion F6 is configured to determine, based on the RSSIs of the mobile terminal 20 collected by the RSSI acquisition portion F4, whether or not the mobile terminal 20 is present inside the vehicle compartment. In the flash memory 103, as the determination threshold for allowing the location determination portion F6 to determine whether or not the mobile terminal 20 is present inside the vehicle compartment based on the RSSIs of the mobile terminal 20, two parameters which are a high level threshold and a low level threshold are stored in advance.

The high level threshold is a threshold for allowing the location determination portion F6 to determine that the mobile terminal 20 is present inside the vehicle compartment. The high level threshold is set to a relatively high value compared to that of the low level threshold. For example, the high level threshold may appropriately be designed based on the RSSIs when the mobile terminal 20 is present inside the vehicle compartment (particularly around the driver seat), which are specified by a test or the like.

Figure 6:
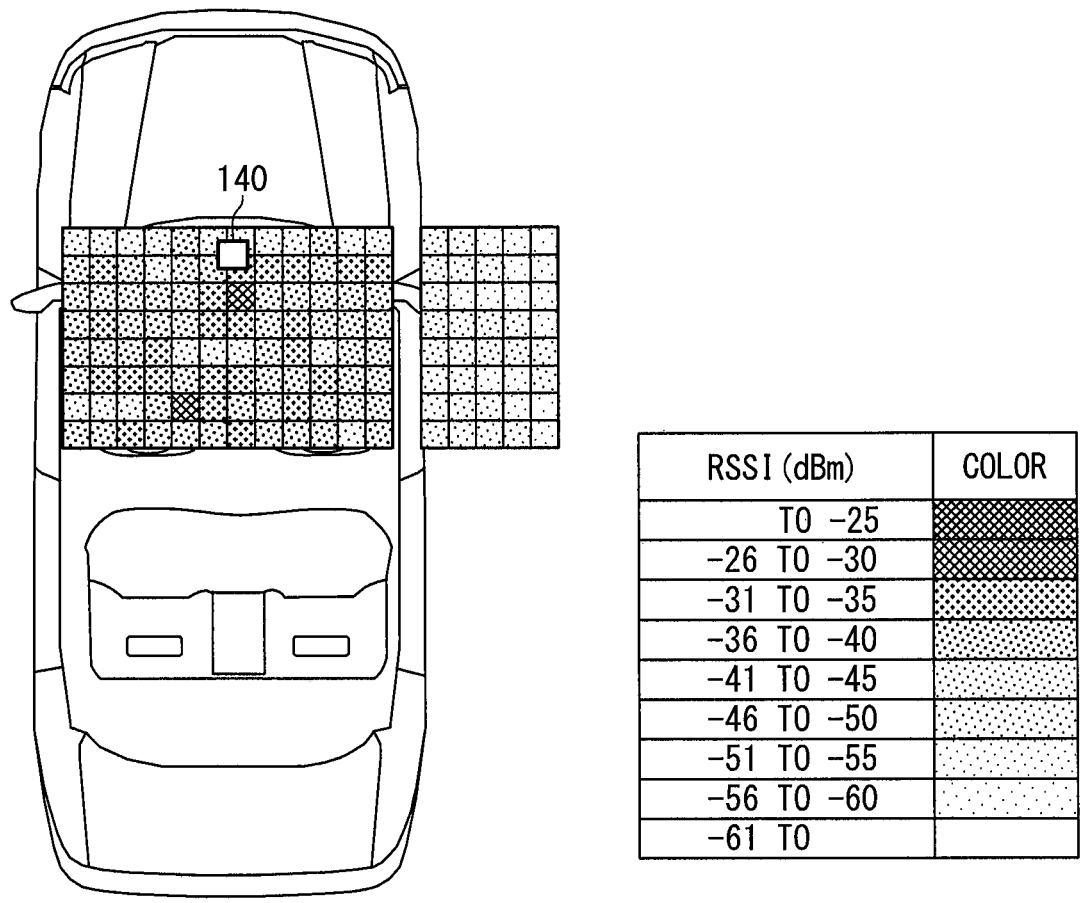
FIG. 6 is a view showing a result of testing a relationship between a location of a mobile terminal and RSSIs.
Figure 7:
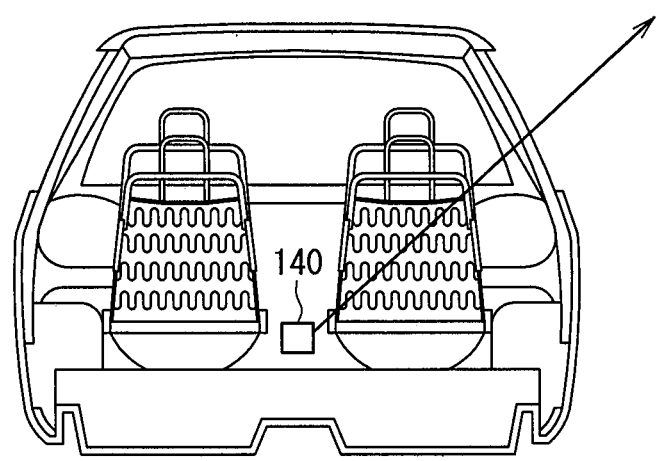
FIG. 7 is a view showing a reason that the RSSI is higher in the vicinity of a window.

FIG. 6 is a view showing a result of performing a test for a relationship between the RSSIs of the mobile terminal 20 and the location of the mobile terminal 20 in a front seat space and in a region around the door for the driver seat which is located outside the vehicle compartment. The test result shown in FIG. 6 shows the RSSIs when, in a state where the doors of the vehicle V are closed, the mobile terminal 20 is disposed at a location at substantially the same height as that of each of the window portions of the vehicle V, specifically at a height of 1.1 m from a road surface. By way of example, it is assumed herein that the driver seat is provided on the right side of the vehicle.

As shown in FIG. 6, when the doors of the vehicle V are closed, the RSSIs when the mobile terminal 20 is present in the front seat inside the vehicle compartment have relatively large values compared to those of the RSSIs when the mobile terminal 20 is present at a point spaced apart at a distance of about several meters from the vehicle compartment. A point in the front seat space at which the RSSI is lower, by 10 dBm or more, than the RSSIs on the periphery thereof represents a point at which the RSSI abruptly lowers under the influence of a multipath, i.e., a null point. Note that, even though a region in the vicinity of each of the window portions is the region outside the vehicle compartment, the region in the vicinity of the window portion may be in sight of the antenna 141. Accordingly, the RSSI in the region in the vicinity of the window portion may have a relatively high value compared to those of the RSSIs in the other region outside the vehicle compartment.

Based on the test result described above, the high level threshold may appropriately be set to a value sufficiently larger than those of the RSSIs when the mobile terminal 20 is present at a point spaced apart at a distance of about several meters from the vehicle V. In the present embodiment, by way of example, it is assumed that the high level threshold is set to −40 dBm. Note that, when the high level threshold is determined based on the RSSIs observed when the mobile terminal 20 is present inside the vehicle compartment, the high level threshold is preferably determined after a value extremely lower than those in the other region, i.e., a value monitored at a point assumed to be the null point are omitted from the observed RSSIs.

The low level threshold is a threshold for allowing the location determination portion F6 to determine that the mobile terminal 20 is present outside the vehicle compartment. Similarly to a specific value of the high level threshold, a specific value of the low level threshold may also be designed appropriately based on the result of performing the test for the correspondence relationship between the location of the mobile terminal 20 and the RSSIs. The low level threshold is preferably set to a value lower, by 10 dBm or more, than that of the high level threshold. It is assumed herein that, by way of example, the low level threshold is set to −50 dBm.

The location determination portion F6 determines, using the high level threshold and the low level threshold each described above, whether or not the mobile terminal 20 is present inside the vehicle compartment. An operation of the location determination portion F6 will be separately described later. The result of the determination by the location determination portion F6 is stored in the location storage portion M2. The result of the determination by the location determination portion F6 is location information of the mobile terminal 20 such as showing whether the mobile terminal 20 is present inside the vehicle compartment or outside the vehicle compartment. The result of the determination by the location determination portion F6 is referred to by the vehicle control portion F7.

It is assumed that the location information of the mobile terminal 20 registered in the location storage portion M2 is set to the outside of the vehicle compartment in an initial state such as before shipment from a factory. In a preferred mode in the present embodiment, it is assumed that, when the signal from the mobile terminal 20 can no longer be received, the location information of the mobile terminal 20 registered in the location storage portion M2 is set to the outside of the vehicle compartment. Besides, when a state where the vehicle V is parked continues for a given period of time (e.g., one hour) or longer, the location information of the mobile terminal 20 registered in the location storage portion M2 may also be set to the outside of the vehicle compartment. Whether or not the vehicle V is in the parked state may appropriately be specified by the vehicle information acquisition portion F1 based on signals input thereto from the various sensors. Such a mode allows the location information of the mobile terminal 20 registered in the location storage portion M2 to be reset periodically or with predetermined timing.

When authentication of the mobile terminal 20 by the authentication processing portion F5 is successful, the vehicle control portion F7 is brought into a standby state for a given period of time (e.g., 10 seconds). When the vehicle information acquisition portion F1 detects a predetermined user operation performed while the vehicle control portion F7 is in the standby state, the vehicle control portion F7 performs vehicle control in accordance with the details of the user operation. Specifically, the vehicle control portion F7 is configured to perform the vehicle control in accordance with the user operation when the vehicle information acquisition portion F1 detects the predetermined user operation within a predetermined period of time after the process of authenticating the mobile terminal 20 was successfully performed by the authentication processing portion F5. Note that, as conditions for performing the vehicle control, the result of the determination by the location determination portion F6 is also used preferably.

For example, when, in a situation where the vehicle V is parked, it is determined by the location determination portion F6 that the mobile terminal 20 is present outside the vehicle compartment, the vehicle control portion F7 is in the standby state, and an operation of touching the handle performed by the user is detected by the touch sensor 110, the vehicle control portion F7 unlocks the doors in cooperation with the body ECU 300.

Also, for example, when it is determined by the location determination portion F6 that the mobile terminal 20 is present inside the vehicle compartment, the vehicle control portion F7 is in the standby state, and the start-up button 120 is depressed by the user, the vehicle control portion F7 starts up the engine in cooperation with the engine ECU 200. Besides, the details of the vehicle control performed by the vehicle control portion F7 may appropriately be designed in accordance with the conditions for performing the vehicle control.

(Location Determination Process)

Next, using a flow chart shown in FIG. 8, a description will be given of a location determination process performed by the authentication ECU 100. The location determination process is a process for determining the location of the mobile terminal 20. The location determination process may appropriately be performed at, e.g., predetermined sampling intervals.

First, in S101, the RSSI acquisition portion F4 acquires the RSSI data from the short-range communication module 140, and moves the process flow to S102. In S102, the RSSI acquisition portion F4 determines whether or not the RSSI acquisition portion F4 has successfully acquired the RSSI data assigned to the terminal ID (i.e., registration ID) of the mobile terminal 20. As a result of the process in S101, when the RSSI acquisition portion F4 has successfully acquired the RSSIs assigned to the registration ID, the RSSI acquisition portion F4 makes an affirmative determination in S102, and moves the process flow to S103. On the other hand, when the RSSI acquisition portion F4 has not successfully acquired the RSSIs assigned to the registration ID, the RSSI acquisition portion F4 makes a negative determination in S102, and ends the present flow.

Note that a case where the RSSI acquisition portion F4 has successfully acquired the RSSIs assigned to the registration ID in S101 means that the mobile terminal 20 is present around the vehicle V (including the inside of the vehicle compartment), and the short-range communication module 140 has successfully received the signal transmitted from the mobile terminal 20. When the mobile terminal 20 is not present near the vehicle V and the short-range communication module 140 has not received the signal transmitted from the mobile terminal 20, the RSSI acquisition portion F4 makes a negative determination in S102. In other words, the determination process in S102 corresponds to a process of determining whether or not the mobile terminal 20 is present around the vehicle V.

In S103, the RSSI acquisition portion F4 stores the RSSIs of the mobile terminal 20 acquired in S101 in the RSSI storage portion M1, and moves the process flow to S104. In S104, the location determination portion F6 calculates, based on the data stored in the RSSI storage portion M1, a moving average value of the RSSIs of the mobile terminal 20. Specifically, assuming that most recent N RSSIs stored in the RSSI storage portion M1 are a population, the location determination portion F6 calculates the average value of the most recent N RSSIs. N may appropriately be a natural number of equal to or more than 2, which is assumed to be 5 in the present embodiment. In this case, the location determination portion F6 calculates the moving average value using the RSSIs of the mobile terminal 20 that have been sampled at five most recent times. Needless to say, N may also be 10, 20, or the like.

The moving average value of the RSSIs of the mobile terminal 20 calculated in S104 is hereinafter referred to as an average strength. When the calculation process in S104 is completed, the location determination portion F6 moves the process flow to S105.

In S105, the location determination portion F6 refers to the location storage portion M2 to read out the result of the previous location determination process. When it has been determined in the previous location determination process that the location of the mobile terminal 20 is outside the vehicle compartment, the location determination portion F6 makes an affirmative determination in S106, and moves the process flow to S107. On the other hand, when it has been determined in the previous location determination process that the location of the mobile terminal 20 is inside the vehicle compartment, the location determination portion F6 makes a negative determination in S106, and moves the process flow to S111.

In S107, the location determination portion F6 compares the average strength calculated in S104 to the high level threshold to determine whether or not the average strength is equal to or more than the high level threshold. When the average strength is equal to or more than the high level threshold, the location determination portion F6 makes an affirmative determination in S107, moves the process flow to S108, and determines that the mobile terminal 20 is present inside the vehicle compartment. Then, the location determination portion F6 stores, in the location storage portion M2, the result of the determination that the location of the mobile terminal 20 is inside the vehicle compartment, and moves the process flow to S109.

Note that the process of storing, in the location storage portion M2, the result of the determination that the mobile terminal 20 is present inside the vehicle compartment corresponds to a process of rewriting the location information of the mobile terminal 20 stored in the location storage portion M2 from the outside of the vehicle compartment to the inside of the vehicle compartment. In S109, the location determination portion F6 sets the determination threshold to be used for the location determination process to be performed next time to the low level threshold, and moves the process flow to S115.

On the other hand, when the average strength is less than the high level threshold in S107, the location determination portion F6 moves the process flow to S110, and determines that the mobile terminal 20 is present outside the vehicle compartment. The process in S110 corresponds to maintaining the result of the previous determination that the mobile terminal 20 is present outside the vehicle compartment. When the result of the previous determination is to be maintained, the location determination portion F6 does not change the setting of the determination threshold to be used for the location determination process to be performed next time (i.e., maintains the determination threshold set to the high level threshold), and moves the process flow to S115.

When it has been thus determined in the previous location determination process that the mobile terminal 20 is present outside the vehicle compartment, the location determination portion F6 determines, using the high level threshold as the determination threshold, whether or not a state where the mobile terminal 20 is present outside the vehicle compartment continues. When the average strength becomes equal to or more than the high level threshold, the location determination portion F6 determines that the location of the mobile terminal 20 has shifted from the outside of the vehicle compartment to the inside of the vehicle compartment. In other words, the high level threshold functions as a threshold for allowing the location determination portion F6 to determine whether or not the mobile terminal 20 has been brought into the vehicle compartment.

In S111, the location determination portion F6 compares the average strength calculated in S104 to the low level threshold to determine whether or not the average threshold is equal to or less than the low level threshold. When the average strength is equal to or less than the low level threshold, the location determination portion F6 makes an affirmative determination in S111, moves the process flow to S112, and determines that the mobile terminal 20 is present outside the vehicle compartment. Then, the location determination portion F6 stores, in the location storage portion M2, the result of the determination that the location of the mobile terminal 20 is outside the vehicle compartment, and moves the process flow to S113. Note that the process of storing, in the location storage portion M2, the result of the determination that the mobile terminal 20 is present outside the vehicle compartment corresponds to a process of rewriting the location information of the mobile terminal 20 stored in the location storage portion M2 from the inside of the vehicle compartment to the outside of the vehicle compartment. In S113, the location determination portion F6 sets the determination threshold to be used for the location determination process to be performed next time to the high level threshold, and moves the process flow to S115.

On the other hand, when the average strength is in excess of the low level threshold in S111, the location determination portion F6 moves the process flow to S114, and determines that the mobile terminal 20 is present inside the vehicle compartment. The process in S114 corresponds to maintaining the result of the previous determination that the mobile terminal 20 is present inside the vehicle compartment. When the result of the previous determination is to be maintained, the location determination portion F6 does not change the setting of the determination threshold to be used for the location determination process to be performed next time (i.e., maintains the determination threshold set to the low level threshold), and moves the process flow to S115.

When it has been thus determined in the previous location determination process that the mobile terminal 20 is present inside the vehicle compartment, the location determination portion F6 determines, using the low level threshold as the determination threshold, whether or not a state where the mobile terminal 20 is present inside the vehicle compartment continues. When the average strength becomes equal to or less than the low level threshold, the location determination portion F6 determines that the location of the mobile terminal 20 has shifted from the inside of the vehicle compartment to the outside of the vehicle compartment. In other words, the low level threshold functions as a threshold for allowing the location determination portion F6 to determine whether or not the mobile terminal 20 has been taken out of the vehicle compartment. Note that determining that the mobile terminal 20 has been taken out of the vehicle compartment indicates that the user of the mobile terminal 20 has exited out of the vehicle compartment.

In S115, the authentication processing portion F5 performs the authentication process using encrypted communication with the mobile terminal 20. When the authentication process is successful, the authentication processing portion F5 moves the process flow to S116. On the other hand, when the authentication process has failed, the authentication processing portion F5 ends the present flow. In S116, the vehicle control portion F7 shifts into the standby state, and ends the present flow. Note that, when the user operation performed in accordance with the location of the mobile terminal 20 is detected while the vehicle control portion F7 is in the standby state, predetermined vehicle control (e.g., locking of the doors) in accordance with the situation or the like is performed.

(Effects of First Embodiment)

Next, a description will be given of the functions and effects of the present embodiment described heretofore by introducing a comparative configuration. The comparative configuration mentioned herein is a configuration which determines whether or not the mobile terminal 20 is present inside the vehicle compartment using one type of determination threshold. The comparative configuration determines that the mobile terminal 20 is present inside the vehicle compartment when the average strength of the RSSIs is equal to or more than the determination threshold, while determining that the mobile terminal 20 is present outside the vehicle compartment when the average strength of the RSSIs is less than the determination threshold. When the set value of the determination threshold is excessively small, the probability that the comparative configuration erroneously determines that the mobile terminal 20 is present inside the vehicle compartment even though the mobile terminal 20 is actually present outside the vehicle compartment increases. On the other hand, when the set value of the determination threshold is excessively large, the probability that the comparative configuration erroneously determines that the mobile terminal 20 is present outside the vehicle compartment even though the mobile terminal 20 is actually present inside the vehicle compartment increases. Accordingly, in the comparative configuration, in view of such circumstances, it is required to set the determination threshold to a value with which the erroneous determination is less likely to be made.

Figure 9:
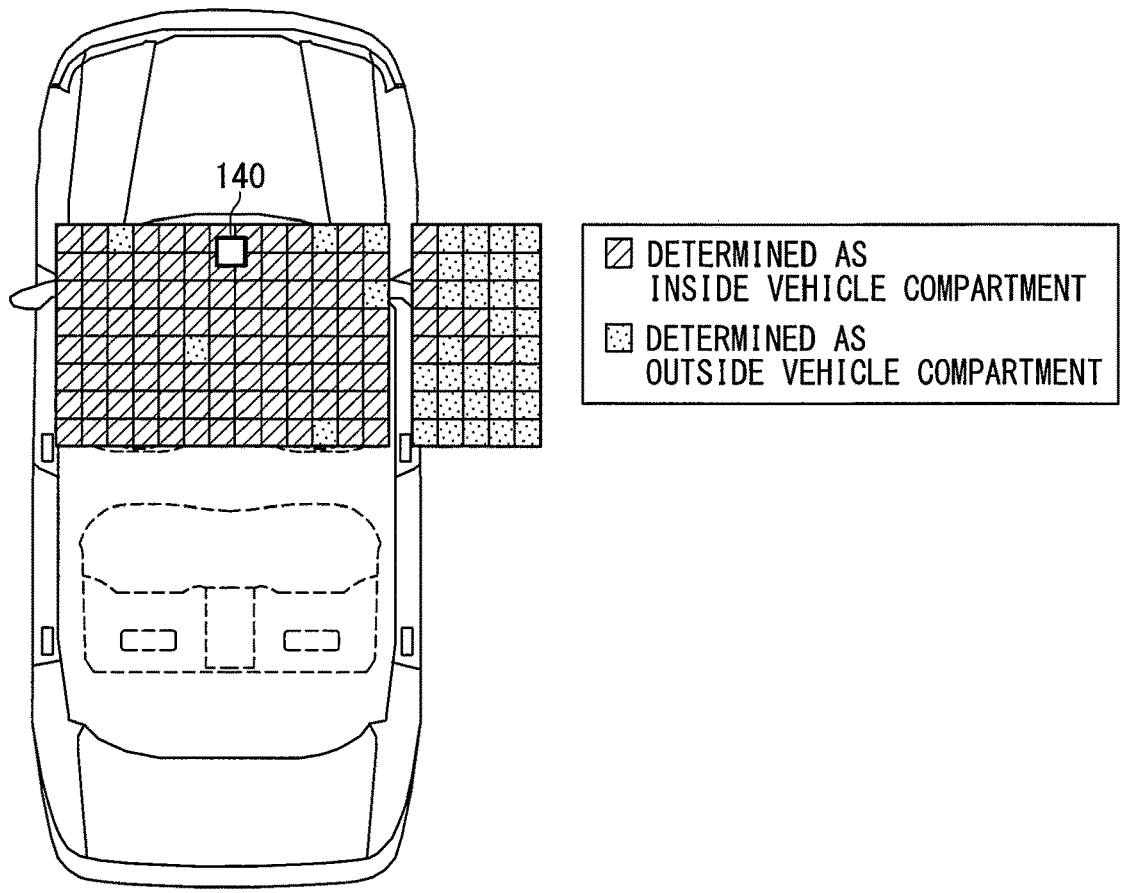
FIG. 9 is a view showing a result of determining the location of the mobile terminal in a comparative configuration.

However, as described using FIG. 6, in the vehicle compartment, there is the null point resulting from the multipath. Accordingly, it is difficult to separate the region inside the vehicle compartment provided as the null point from the region outside the vehicle compartment using the one threshold. As a result, in the comparative configuration, as shown in FIG. 9, several regions are present in which it is erroneously determined that the mobile terminal 20 is present outside the vehicle compartment, even though the mobile terminal 20 is actually present inside the vehicle compartment.

When the mobile terminal 20 is disposed in the vicinity of one of the window portions outside the vehicle compartment, the RSSIs assumedly fluctuate between relatively high levels. Consequently, in the comparative configuration, when the mobile terminal 20 is present in the vicinity of the window portion outside the vehicle compartment, it may be possible to determine that the mobile terminal 20 is present inside the vehicle compartment, even though the mobile terminal 20 is actually present outside the vehicle compartment. Note that FIG. 9 shows the result of the determination of the location of the mobile terminal 20 by the comparative configuration when, in a test environment shown in FIG. 6, the determination threshold of the comparative configuration is set to −45 dBm.

By contrast, in the present embodiment, when the average strength becomes not less than the high level threshold, the location determination portion F6 determines that the location of the mobile terminal 20 has shifted from the outside of the vehicle compartment to the inside of the vehicle compartment, and holds the determination result until the average strength becomes equal to or less than the low level threshold. When the average strength becomes equal to or less than the low level threshold, the location determination portion F6 determines that the location of the mobile terminal 20 has shifted from the inside of the vehicle compartment to the outside of the vehicle compartment, and holds the determination result until the average strength becomes equal to or more than the high level threshold.

Figure 10:
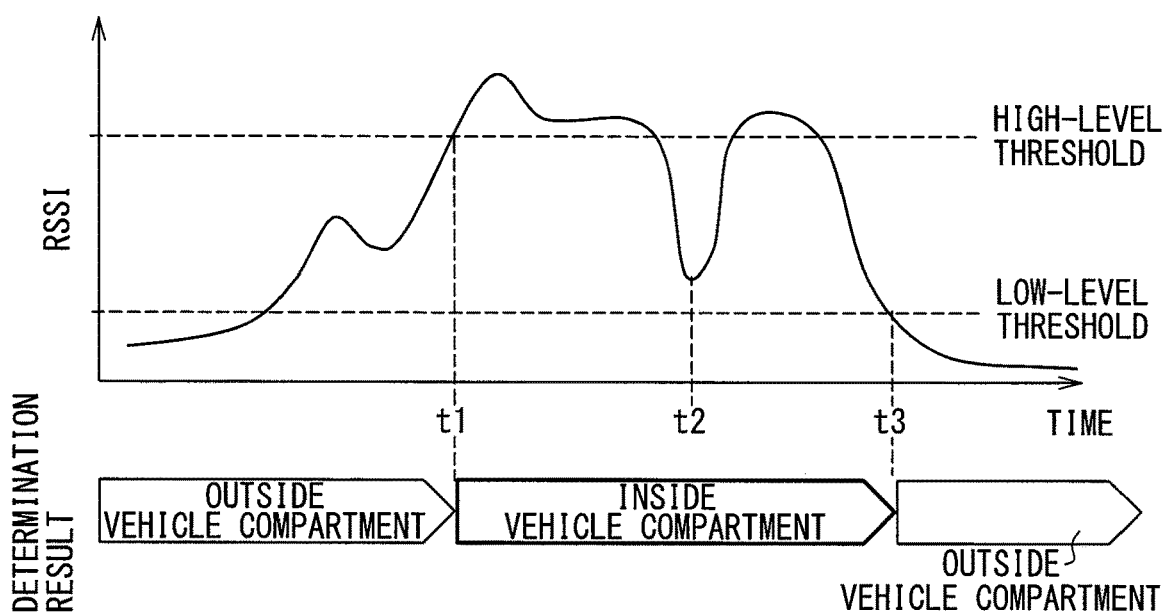
FIG. 10 is a view showing an operation of a location determination portion.

Accordingly, even though the RSSIs of the mobile terminal 20 temporarily decrease under the influence of the multipath, the result of the determination that the mobile terminal 20 is present inside the vehicle compartment is maintained unless the average strength becomes equal to or less than the low level threshold, as shown in FIG. 10. Note that a time t1 shown in FIG. 10 represents a time when the mobile terminal 20 is brought into the vehicle compartment, and the average strength of the RSSIs becomes equal to or more than the high level threshold. A time t3 represents a time when the mobile terminal 20 is taken out of the vehicle compartment, and the average strength of the RSSIs becomes equal to or less than the low level threshold. A time t2 represents a time when the average strength has temporarily decreased under the influence of the multipath.

Figure 11:
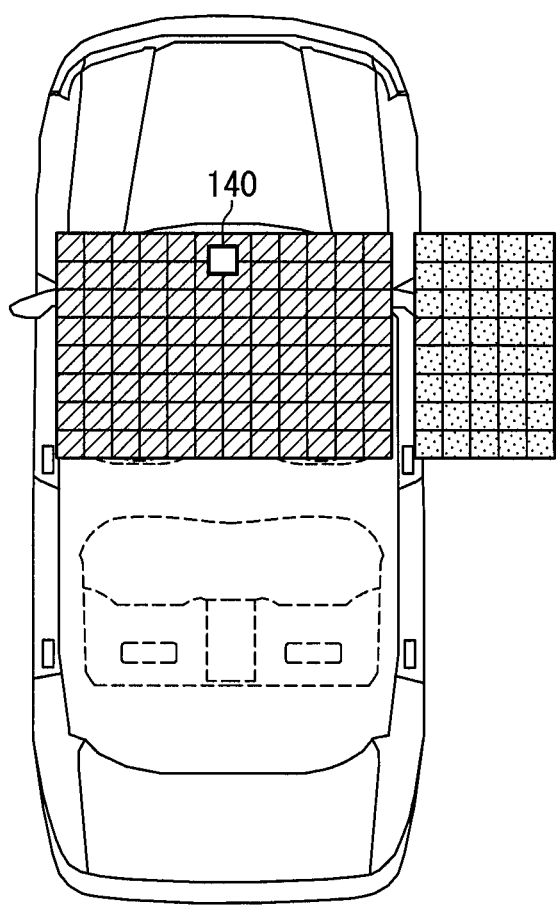
FIG. 11 is a view showing a result of the determination of the location of the mobile terminal by the location determination portion.

As a result, with the configuration of the present embodiment, it is possible to reduce the probability of making an erroneous determination due to the multipath or an erroneous determination made in the vicinity of the window outside the vehicle compartment. FIG. 11 shows a result of determining the location of the mobile terminal 20 when, in the test environment shown in FIG. 6, the high level threshold is set to −40 dBm, while the low level threshold is set to −50 dBm. As will be understood from a comparison between FIGS. 11 and 9, the present embodiment can reduce the regions where the erroneous determination is made as compared to the comparative configuration.

Note that, as described above in the present embodiment, as a gap between the high level threshold and the low level threshold, 10 dB or more is preferably provided. When the gap between the high level threshold and the low level threshold is set large, it is easier to hold the determination result. In other words, it is possible to further reduce the probability that the location of the mobile terminal 20 is erroneously determined due to the multipath, leakage of a radio wave, or the like. However, when the gap between the high level threshold and the low level threshold is set excessively large, it becomes rather difficult for the average strength to become more than the high level threshold or become less than the low-threshold. As a result, the probability of making an erroneous determination relatively increases. Accordingly, in view of the trade-off therebetween mentioned above, the gap between the high level threshold and the low level threshold is preferably set to a value within a predetermined range based on 10 dB.

The evaluation results in FIGS. 6 and 11 are evaluation results obtained at the height equivalent to that of the window portion. At a height of a space lower than that of the window portion, e.g., a height equivalent to that of a seat surface or at a height equivalent to that of a floor surface in the vehicle compartment, an erroneous determination is far less likely to be made. This is because, in a space lower in level than the window portion, when the mobile terminal 20 is present outside the vehicle compartment, a metal body such as a door is interposed between the mobile terminal 20 and the antenna 141 and, depending on whether or not the mobile terminal 20 is present inside the vehicle compartment, the RSSIs tend to have significantly different values.

Also, in the embodiment described above, the sampling interval is set to several hundreds of milliseconds (specifically, 200 milliseconds). Since the moving speed of the user around the vehicle is assumed to be about 1 m/second, by setting the sampling interval to 200 milliseconds, it is generally possible to sample the RSSI of the mobile terminal 20 every time the user moves over a distance of about 20 cm. By thus sampling the RSSIs of the mobile terminal 20 rather densely, it is possible to reduce the probability of missing the moment at which the RSSI of the mobile terminal 20 exceeds the high level threshold. As a result, it is possible to accurately detect that the mobile terminal 20 has been brought into the vehicle compartment. Note that the sample interval may appropriately be a time interval which is sufficiently short in terms of the movement of a person.

Second Embodiment

Next, using the drawings, a description will be given of the location determination system 1 according to a second embodiment of the present disclosure. The present embodiment is mainly different from the first embodiment in that the location of the mobile terminal 20 is estimated using differences between the RSSIs in the short-range communication module disposed inside the vehicle compartment and the RSSIs in the short-range communication module disposed such that a predetermined region outside the vehicle compartment is provided as an in-sight region.

The following will mainly describe a configuration and an operation of the vehicle system 10 included in the location determination system 1 in the second embodiment. Note that members having the same functions as those of the members described above in the first embodiment are given the same reference numerals, and a description thereof is omitted. When only a portion of the configuration is mentioned, the configuration of the embodiment previously described is applicable to the other portion of the configuration. When the various short-range communication modules included in the vehicle system 10 are not distinguished from each other, the short-range communication modules may be referred to simply as the short-range communication modules without being given reference numerals.

Figure 12:
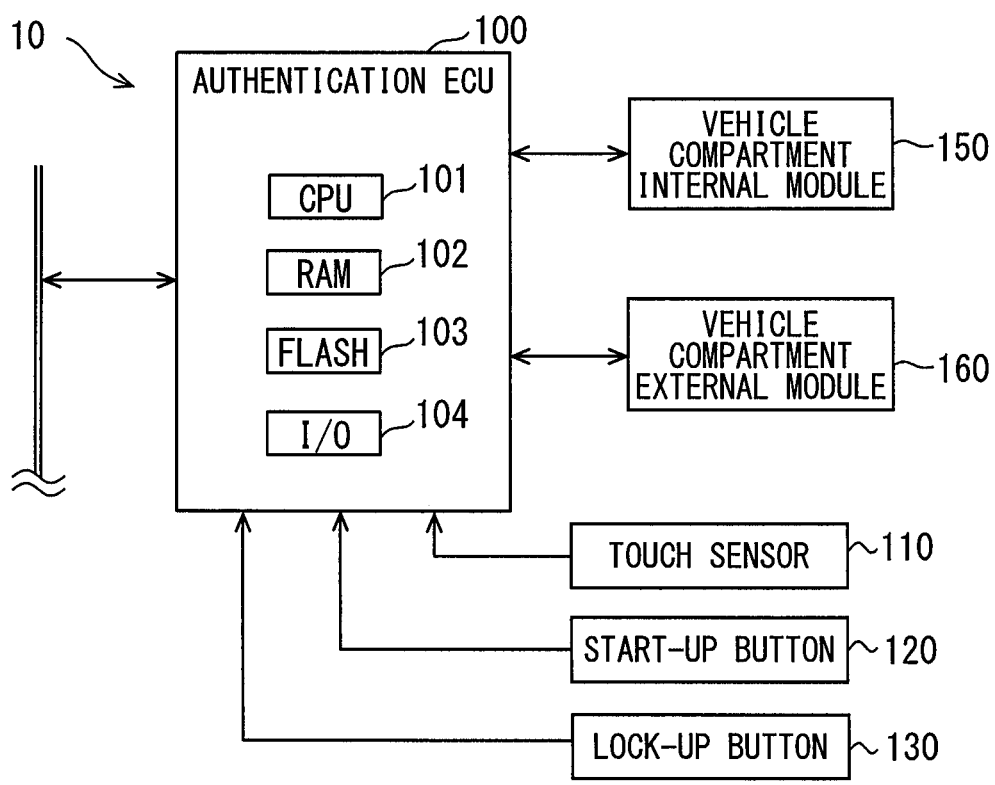
FIG. 12 is a block diagram showing a schematic configuration of a vehicle system of a second embodiment.

As shown in FIG. 12, the vehicle system 10 in the present embodiment includes, as the short-range communication modules, a vehicle compartment internal module 150 and a vehicle compartment external module 160. In FIG. 12, the illustration of the engine ECU 200 and the like is omitted.

The vehicle compartment internal module 150 is the short-range communication module for mainly performing short-range communication with the mobile terminal 20 present inside the vehicle compartment, which corresponds to the short-range communication module 140 in the first embodiment. The vehicle compartment internal module 150 is preferably provided at a position at which the outside of the vehicle compartment is in an out-of-sight region, such as in the vicinity of the center console 2 or at feet under the driver seat. The vehicle compartment internal module 150 corresponds to the reception portion, particularly to a vehicle compartment internal reception portion. In addition, a short-range communication antenna provided in the vehicle compartment internal module 150 corresponds to a vehicle compartment internal antenna.

The vehicle compartment external module 160 is the short-range communication module for mainly performing short-range communication with the mobile terminal 20 present outside the vehicle compartment. The vehicle compartment external module 160 has the same configuration and function as those of the vehicle compartment internal module 150. The vehicle compartment external module 160 may appropriately be disposed in, e.g., an outer side surface of the door for the driver seat, a roof portion of the vehicle V, a hood, a pillar, or the like such that a predetermined range outside the vehicle compartment is in sight. The vehicle compartment external module 160 corresponds to the reception portion, particularly to a vehicle compartment external reception portion. In addition, a short range communication antenna included in the vehicle compartment external module 160 corresponds to a vehicle compartment external antenna. The vehicle compartment external module 160 is preferably mounted at a position at which the inside of the vehicle compartment is out of sight. The vehicle compartment external antenna may also be implemented using a directional antenna. In the present embodiment, by way of example, it is assumed that only one vehicle compartment external module 160 is provided. As will be described later in another mode, a plurality of the vehicle compartment external modules 160 may also be provided.

The RSSI acquisition portion F4 in the present embodiment acquires the RSSI data from each of the vehicle compartment internal module 150 and the vehicle compartment external module 160 and separately and individually stores, in the RSSI storage portion M1, the acquired RSSI data according to each of the sources from which the RSSI data is acquired. Specifically, the RSSI acquisition portion F4 separately and individually stores, in the RSSI storage portion M1, the RSSIs of the mobile terminal 20 acquired from the vehicle compartment internal module 150 and the RSSIs of the mobile terminal 20 acquired from the vehicle compartment external module 160.

The location determination portion F6 determines whether or not the mobile terminal 20 is present inside the vehicle compartment based on differences between the RSSIs of the mobile terminal 20 acquired from the vehicle compartment internal module 150 and the RSSIs of the mobile terminal 20 acquired from the vehicle compartment external module 160. Specifically, the location determination portion F6 individually calculates a vehicle compartment internal average strength as an average strength of the RSSIs of the mobile terminal 20 acquired from the vehicle compartment internal module 150 and a vehicle compartment external average strength as an average strength of the RSSIs of the mobile terminal 20 acquired from the vehicle compartment external module 160. Then, the location determination portion F6 calculates a strength difference ΔRSSI as a value obtained by subtracting the vehicle compartment external average strength from the vehicle compartment internal average strength and determines the location of the mobile terminal 20 through a comparison between the strength difference and the high level threshold or the low level threshold as the determination threshold. The strength difference ΔRSSI represents a difference between a signal strength of a radio signal transmitted from the mobile terminal 20 inside the vehicle compartment and a signal strength thereof outside the vehicle compartment (particularly in the vicinity of the vehicle). The strength difference ΔRSSI corresponds to a strength differential value.

In the present embodiment, an index used for the determination of the location of the mobile terminal 20 is not a direct representation of a reception strength, but is a difference between the reception strength in the vehicle compartment internal module 150 and the reception strength in the vehicle compartment external module 160. Accordingly, the high level threshold and the low level threshold in the present embodiment are determined based on the difference between the reception strength in the vehicle compartment internal module 150 and the reception strength in the vehicle compartment external module 160 when the mobile terminal 20 is present outside the vehicle compartment and on the difference between the reception strength in the vehicle compartment internal module 150 and the reception strength in the vehicle compartment external module 160 when the mobile terminal 20 is present inside the vehicle compartment.

When the mobile terminal 20 is present inside the vehicle compartment, the reception strength in the vehicle compartment internal module 150 tends to be larger than the reception strength in the vehicle compartment external module 160. Accordingly, it is expected that the strength difference ΔRSSI has a positive value. On the other hand, when the mobile terminal 20 is present outside the vehicle compartment, the reception strength in the vehicle compartment internal module 150 tends to be lower than the reception strength in the vehicle compartment external module 160. Accordingly, it is expected that the strength difference ΔRSSI has a negative value.

The high level threshold and the low level threshold may appropriately be determined in view of the tendencies described above. In the present embodiment, by way of example, it is assumed that the high level threshold is set to +5 dB, while the low level threshold is set to −5 dB. Needless to say, in another mode, it may also be possible to set the high level threshold to +10 dB and set the low level threshold to 0 dB. Specific values of the high level threshold and the low level threshold may appropriately be designed.

Next, using the flow chart shown in FIG. 13, a description will be given of the location determination process performed by the authentication ECU 100 in the second embodiment. The flow chart shown in FIG. 13 may appropriately be executed at predetermined sampling intervals, similarly to the flow chart shown in FIG. 8.

First, in S201, the RSSI acquisition portion F4 acquires the RSSI data from each of the vehicle compartment internal module 150 and the vehicle compartment external module 160, and moves the process flow to S202. In S202, the RSSI acquisition portion F4 determines whether or not the RSSI data assigned to the registration ID has successfully been acquired as a result of the process in S201.

When, as a result of the process in S201, at least either one of the vehicle compartment internal module 150 and the vehicle compartment external module 160 has successfully acquired the RSSIs (i.e., the RSSIs of the mobile terminal 20) assigned to the registration ID, the RSSI acquisition portion F4 makes an affirmative determination in S202, and moves the process flow to S203. On the other hand, when neither the vehicle compartment internal module 150 nor the vehicle compartment external module 160 has successfully acquired the RSSIs assigned to the registration ID, the RSSI acquisition portion F4 makes a negative determination in S202, and ends the present flow.

In the present embodiment, by way of example, it is assumed that, when at least either one of the vehicle compartment internal module 150 and the vehicle compartment external module 160 has successfully acquired the RSSIs of the mobile terminal 20, a subsequent process in S203 or the like is performed, but the present flow is not limited thereto. It may also be possible that, when at least one of the vehicle compartment internal module 150 and the vehicle compartment external module 160 has not successfully acquired the RSSIs of the mobile terminal 20, the RSSI acquisition portion F4 makes a negative determination in S202, and ends the present flow.

In S203, the RSSI acquisition portion F4 stores, in the RSSI storage portion M1, the RSSIs of the mobile terminal 20 acquired in S201, and moves the process flow to S204. It is assumed that, when one of the vehicle compartment internal module 150 and the vehicle compartment external module 160 has not successfully acquired the RSSIs of the mobile terminal 20, as the most recent RSSI in the short-range communication module that has not successfully acquired the RSSIs of the mobile terminal 20, a lower limit value (i.e., a minimum value) of the RSSIs that can be output from the RSSI detection portion 1421 is registered in the RSSI storage portion M1. With such a configuration, when at least either one of the vehicle compartment internal module 150 and the vehicle compartment external module 160 has successfully received a signal from the mobile terminal 20, the RSSI acquisition portion F4 can continue the location determination process, and consequently allow the location of the mobile terminal 20 to be determined.

In S204, the location determination portion F6 calculates the moving average value (i.e., average strength) of the RSSIs in each of the short-range communication modules based on the RSSIs assigned to each of the short-range communication modules which are stored in the RSSI storage portion M1. Specifically, the location determination portion F6 calculates, based on the most recent N RSSIs acquired in the vehicle compartment internal module 150, the moving average value (i.e., vehicle compartment internal average strength) of the RSSIs in the vehicle compartment internal module 150. The location determination portion F6 also calculates, based on the most recent N RSSIs acquired in the vehicle compartment external module 160, the moving average value (i.e., vehicle compartment external average strength) of the RSSIs in the vehicle compartment external module 160. When the calculation process in S204 is completed, the location determination portion F6 moves the process flow to S205.

In S205, the location determination portion F6 subtracts the vehicle compartment external average strength from the vehicle compartment internal average strength to calculate the strength difference ΔRSSI, and moves the process flow to S206. In S206, the location determination portion F6 refers to the location storage portion M2 to read the result of the previous location determination process. When it has been determined in the previous location determination process that the location of the mobile terminal 20 is outside the vehicle compartment, the location determination portion F6 makes an affirmative determination in S207, and moves the process flow to S208. On the other hand, when it has been determined in the previous location determination process that the location of the mobile terminal 20 is inside the vehicle compartment, the location determination portion F6 makes a negative determination in S207, and moves the process flow to S212.

In S208, the location determination portion F6 compares the strength difference ΔRSSI calculated in S205 to the high level threshold to determine whether or not the strength difference ΔRSSI is equal to or more than the high level threshold. When the strength difference ΔRSSI is equal to or more than the high level threshold, the location determination portion F6 makes an affirmative determination in S208, moves the process flow to S209, and determines that the mobile terminal 20 is present inside the vehicle compartment. Then, the location determination portion F6 stores, in the location storage portion M2, the result of the determination that the location of the mobile terminal 20 is inside the vehicle compartment, and moves the process flow to S210. In S210, the location determination portion F6 sets the determination threshold to be used for the location determination process to be performed next time to the low level threshold, and ends the present flow.

On the other hand, when the strength difference ΔRSSI is less than the high level threshold in S208, the location determination portion F6 moves the process flow to S211, and determines that the mobile terminal 20 is present outside the vehicle compartment. The process in S211 corresponds to maintaining the result of the previous determination that the mobile terminal 20 is present outside the vehicle compartment. When the result of the previous determination is to be maintained, the location determination portion F6 does not change the setting of the determination threshold to be used for the location determination process to be performed next time, and ends the present flow.

In S212, the location determination portion F6 compares the strength difference ΔRSSI calculated in S205 to the low level threshold to determine whether or not the strength difference ΔRSSI is equal to or less than the low level threshold. When the strength difference ΔRSSI is equal to or less than the low level threshold, the location determination portion F6 makes an affirmative determination in S212, moves the process flow to S213, and determines that the mobile terminal 20 is present outside the vehicle compartment. Then, the location determination portion F6 stores, in the location storage portion M2, the result of the determination that the location of the mobile terminal 20 is outside the vehicle compartment, and moves the process flow to S214. In S214, the location determination portion F6 sets the determination threshold to be used for the location determination process to be performed next time to the high level threshold, and ends the present flow.

On the other hand, when the average strength is in excess of the low level threshold in S212, the location determination portion F6 moves the process flow to S215. In S215, the location determination portion F6 determines that the mobile terminal 20 is present inside the vehicle compartment, and ends the present flow. The process in S215 corresponds to maintaining the result of the previous determination that the mobile terminal 20 is present inside the vehicle compartment. When the result of the previous determination is to be maintained, the location determination portion F6 does not change the setting of the determination threshold to be used for the location determination process to be performed next time, and ends the present flow.

Figure 13:
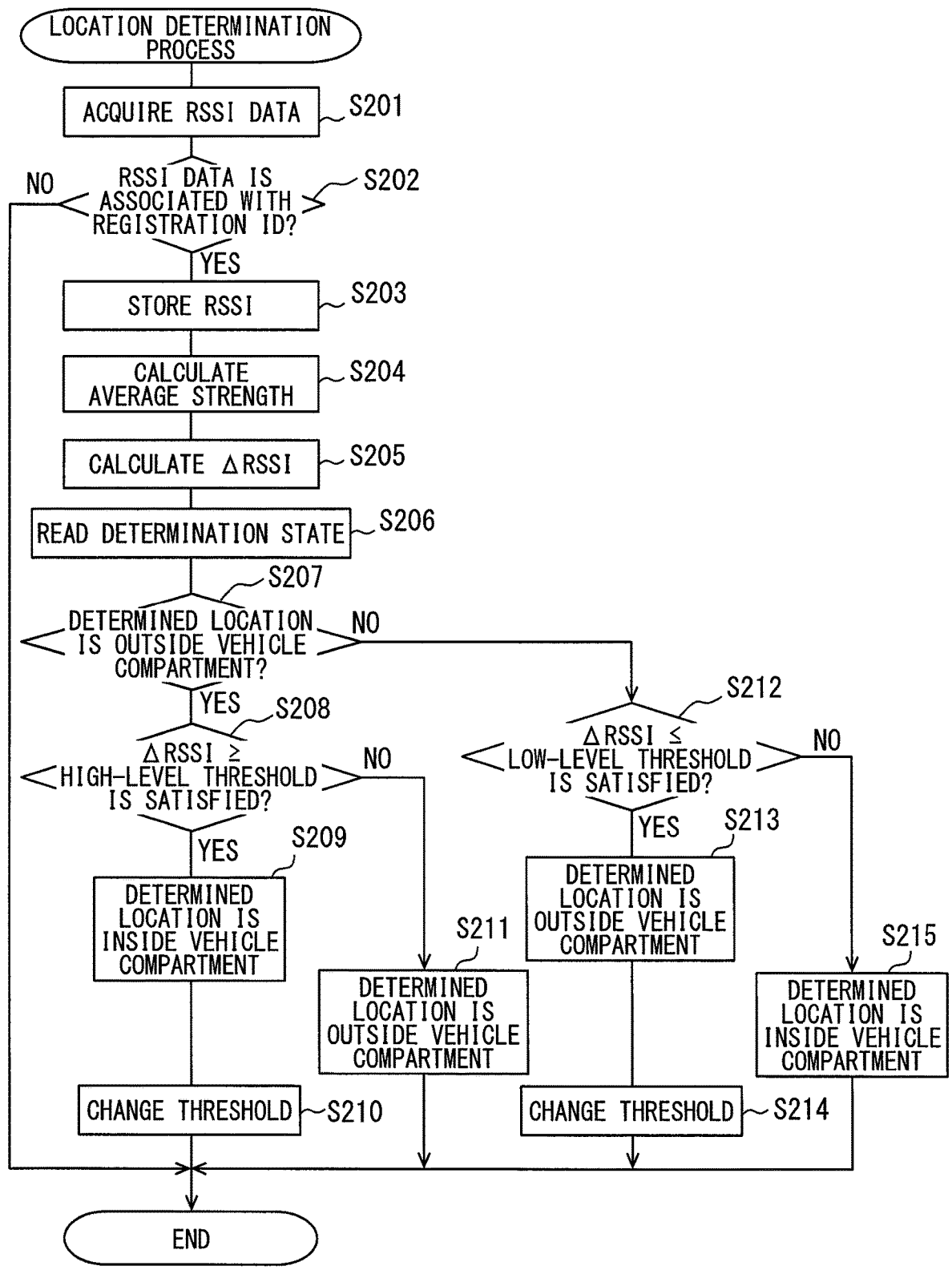
FIG. 13 is a flow chart showing a location determination process performed by an authentication ECU of the second embodiment.

Note that, as a process subsequent to S210, S211, S214, or S215, the authentication process or the like may also be performed in the same manner as in the first embodiment described above, though the authentication process or the like is omitted from FIG. 13. The authentication process may appropriately be performed using any one of the plurality of short-range communication modules.

(Effects of Second Embodiment)

The configuration described above also achieves the same effects as those achieved in the first embodiment. The second embodiment also achieves the following effects in addition to the effects achieved by the first embodiment.

In general, a mobile terminal such as a smart phone differs from one model to another in transmission power for a short-range communication radio signal. Accordingly, in the configuration of the first embodiment, to increase determination accuracy, it is required to set the high level threshold and the low level threshold in accordance with the model of the mobile terminal 20. By contrast, in the configuration of the second embodiment, by using the strength difference ΔRSSI, it is possible to compensate for the transmission power difference resulting from the different models of the mobile terminal 20. Consequently, according to the second embodiment, an operation of setting the high level threshold and the low level threshold for each of the models is not required. Therefore, the configuration of the second embodiment can achieve a reduction in the number of development process steps as well as an improvement in determination accuracy.

In addition, since the strength difference ΔRSSI is the differences between the RSSIs in the vehicle compartment internal module 150 and the RSSIs in the vehicle compartment external module 160, the strength difference ΔRSSI sharply changes depending on whether the mobile terminal 20 is present inside the vehicle compartment or outside the vehicle compartment, as compared to the simple RSSIs or the average strength. Accordingly, with the configuration of the second embodiment, it is possible to determine that the mobile terminal 20 has been brought into the vehicle compartment earlier than in the first embodiment. The same applies also to the case where the mobile terminal 20 is taken out of the vehicle compartment. In addition, with the configuration of the second embodiment, even when the mobile terminal 20 is continuously located by the window outside the vehicle compartment, the location of the mobile terminal 20 can more correctly be determined.

In an application example, the location determination portion F6 of the second embodiment may be such that, when determining that the mobile terminal 20 is present outside the vehicle compartment, the location determination portion F6 determines whether or not the mobile terminal 20 is present inside a predetermined locking/unlocking area based on the vehicle compartment external average strength. Specifically, when the vehicle compartment external average strength is equal to or more than a predetermined threshold (hereinafter referred to as the locking/unlocking threshold), the location determination portion F6 determines that the mobile terminal 20 is present inside the locking/unlocking area. On the other hand, when the vehicle compartment external average strength is less than the locking/unlocking threshold, the location determination portion F6 determines that the mobile terminal 20 is not present inside the locking/unlocking area.

The locking/unlocking area is an area which is set appropriately such that, only when the mobile terminal 20 is present inside the area, door locking/unlocking control is performed based on a touch operation performed on the touch sensor 110 or on a depressing operation performed on the lock-up button 130. The locking/unlocking area is set in an area within 1 to 2 meters from each of the various doors including a trunk door that are provided in the vehicle V. With such a configuration, only when the mobile terminal 20 is present in the locking/unlocking area included in the region outside the vehicle compartment, the locking/unlocking control is performed, and therefore it is possible to enhance crime-prevention performance.

The foregoing has disclosed the mode in which the value obtained by subtracting the vehicle compartment external average strength from the vehicle compartment internal average strength is used as the strength difference ΔRSSI. However, the present embodiment is not limited thereto. It may also be possible to use a value obtained by subtracting the vehicle compartment internal average strength from the vehicle compartment external average strength as the strength difference ΔRSSI and determine the location of the mobile terminal 20 through comparison between the strength difference ΔRSSI and the high level threshold or the low level threshold provided as the determination threshold.

Figure 14:
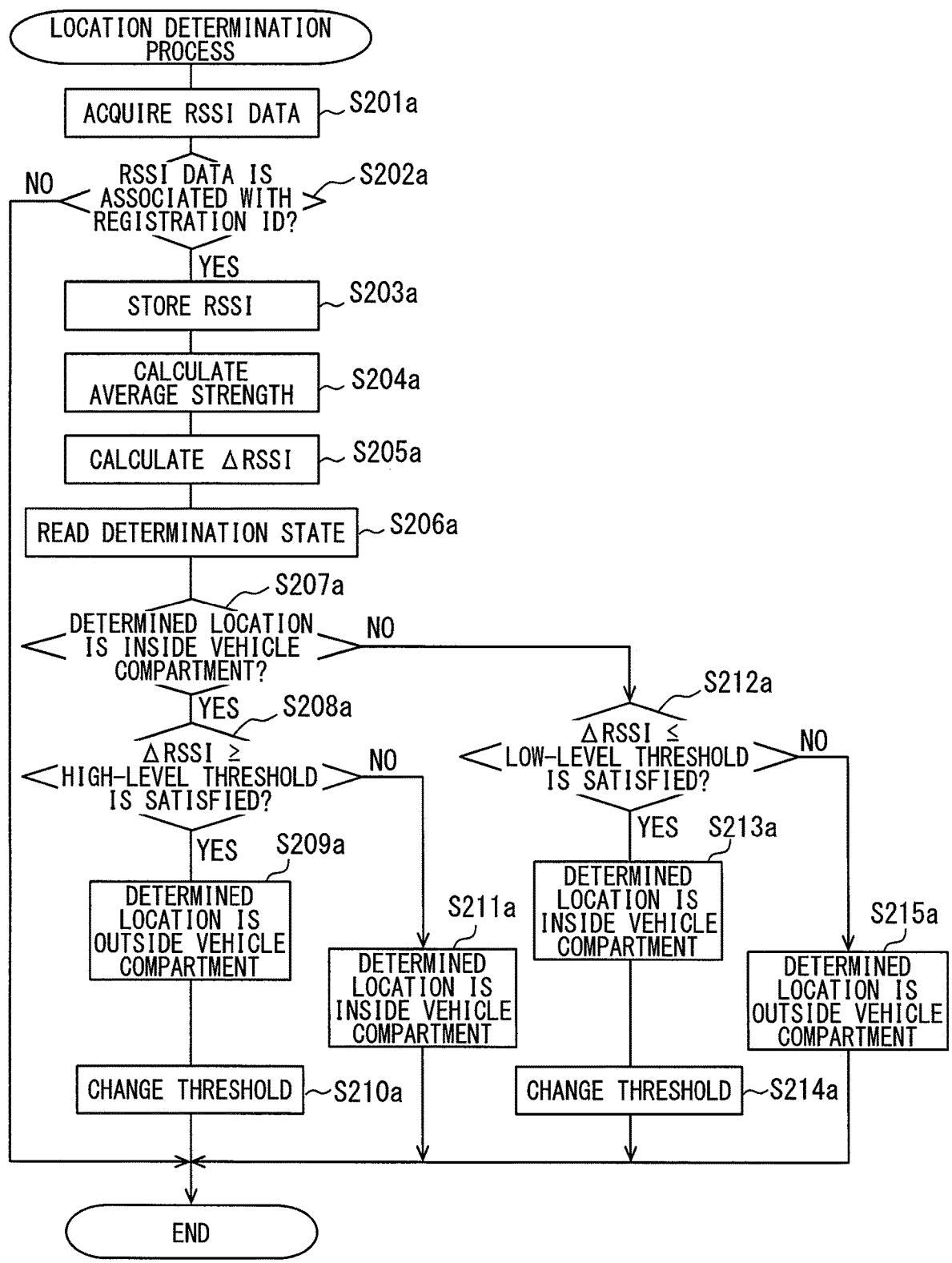
FIG. 14 is a flow chart showing a modification of the location determination process performed by the authentication ECU of the second embodiment.

In that case, the authentication ECU 100 may appropriately perform the location determination process in accordance with a procedure shown by way of example in FIG. 14. FIG. 14 is a flow chart for the location determination process when the location of the mobile terminal 20 is estimated using the strength difference ΔRSSI obtained by subtracting the vehicle compartment internal average strength from the vehicle compartment external average strength. The flow chart shown in FIG. 14 may appropriately be executed at predetermined sampling intervals, similarly to the flow chart shown in FIG. 13. The process in S201a to S204a shown in FIG. 14 is the same as the process in S201 to S204 described above.

In S205a, the location determination portion F6 subtracts the vehicle compartment internal average strength from the vehicle compartment external average strength to calculate the strength difference ΔRSSI, and moves the process flow to S206a. In S206a, in the same manner as in S206, the location determination portion F6 refers to the location storage portion M2 to read the result of the previous location determination process. When it has been determined in the previous location determination process that the location of the mobile terminal 20 is inside the vehicle compartment, the location determination portion F6 makes an affirmative determination in S207a, and moves the process flow to S208a. On the other hand, when it has been determined in the previous location determination process that the location of the mobile terminal 20 is outside the vehicle compartment, the location determination portion F6 makes a negative determination in S207a, and moves the process flow to S212a.

In S208a, the location determination portion F6 compares the strength difference ΔRSSI calculated in S205 to the high level threshold to determine whether or not the strength difference ΔRSSI is equal to or more than the high level threshold. The high level threshold used at this time is a value larger than 0. Preferably, the high level threshold is set to a value larger than +5 dB, such as, e.g., +10 dB.

When the strength difference ΔRSSI is equal to or more than the high level threshold, the location determination portion F6 makes an affirmative determination in S208a, moves the process flow to S209a, and determines that the mobile terminal 20 is present outside the vehicle compartment. Then, the location determination portion F6 stores, in the location storage portion M2, the result of the determination that the location of the mobile terminal 20 is outside the vehicle compartment, and moves the process flow to S210a. In S210a, the location determination portion F6 sets the determination threshold to be used for the location determination process to be performed next time to the low level threshold, and ends the present flow.

On the other hand, when the strength difference ΔRSSI is less than the high level threshold in S208a, the location determination portion F6 moves the process flow to S211a, and determines that the mobile terminal 20 is present inside the vehicle compartment. The process in S211 corresponds to maintaining the result of the previous determination that the mobile terminal 20 is present inside the vehicle compartment. When the result of the previous determination is to be maintained, the location determination portion F6 does not change the setting of the determination threshold to be used for the location determination process to be performed next time, and ends the present flow.

In S212a, the location determination portion F6 compares the strength difference ΔRSSI calculated in S205a to the low level threshold, and determines whether or not the strength difference ΔRSSI is equal to or less than the low level threshold. The low level threshold used at this time is a value lower than 0. Preferably, the low level threshold is set to a value lower than −5 dB, such as, e.g., −10 dB.

When the strength difference ΔRSSI is equal to or less than the low level threshold, the location determination portion F6 makes an affirmative determination in S212a, moves the process flow to S213a, and determines that the mobile terminal 20 is present inside the vehicle compartment. Then, the location determination portion F6 stores, in the location storage portion M2, the result of the determination that the location of the mobile terminal 20 is inside the vehicle compartment and moves the process flow to S214a. In S214a, the location determination portion F6 sets the determination threshold to be used for the location determination process to be performed next time to the high level threshold, and ends the present flow.

On the other hand, when the average strength is in excess of the low level threshold, the location determination portion F6 moves the process flow to S215a. In S215a, the location determination portion F6 determines that the mobile terminal 20 is present outside the vehicle compartment, and ends the present flow. The process in S215a corresponds to maintaining the result of the previous determination that the mobile terminal 20 is present outside the vehicle compartment. When the result of the previous determination is to be maintained, the location determination portion F6 does not change the setting of the determination threshold to be used for the location determination process to be performed next time, and ends the present flow.

Figure 15A:
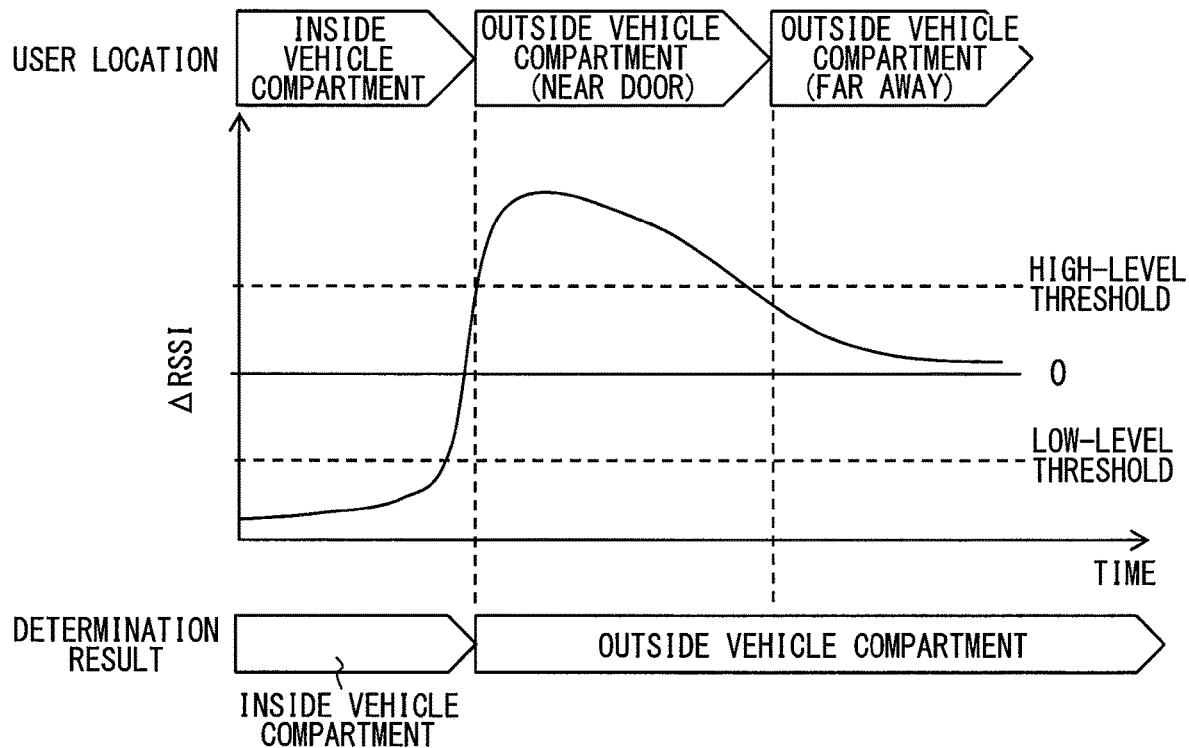
FIG. 15A is a view showing the operation of the location determination portion when a passenger gets out of a vehicle when a determination algorithm shown in FIG. 14 is used.
Figure 15B:
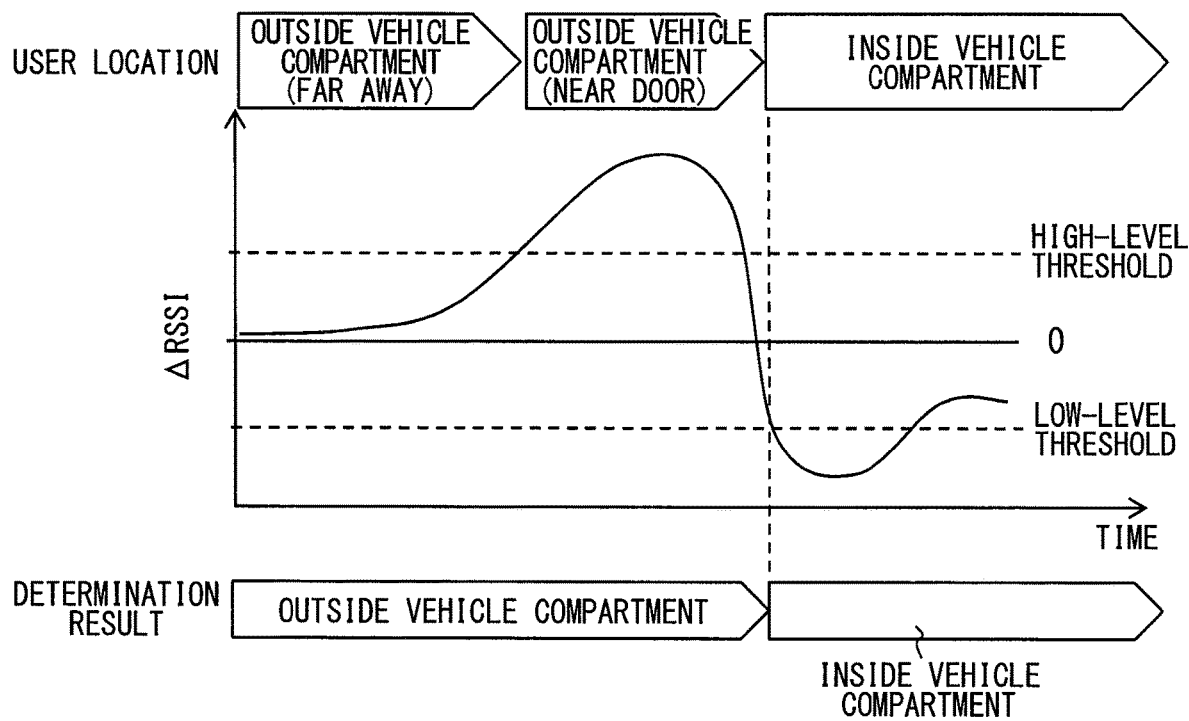
FIG. 15B is a view showing the operation of the location determination portion when a passenger gets into the vehicle when the determination algorithm shown in FIG. 14 is used.

FIGS. 15A and 15B are views each for illustrating an operation of the location determination portion F6 when the determination algorithm described above is used. FIG. 15A shows a correspondence relationship between the strength difference ΔRSSI and the result of the determination by the location determination portion F6 when the user carrying the mobile terminal 20 in the vehicle V gets out of the vehicle V and leaves the vehicle V (hereinafter referred to as a leaving process). FIG. 15B shows the correspondence relationship between the strength difference ΔRSSI and the result of the determination by the location determination portion F6 when the user carrying the mobile terminal 20 approaches the vehicle V and gets into the vehicle V (hereinafter referred to as an entry process).

As shown in FIG. 15A, when the user is present inside the vehicle compartment, the vehicle compartment internal strength representative value is sufficiently larger than the vehicle compartment external strength representative value. Consequently, the strength difference ΔRSSI fluctuates in a region of equal to or less than the high level threshold (mainly in a region of equal to or less than the low level threshold). In the leaving process, when the user opens the door, gets out of the vehicle compartment, and closes the door, the vehicle compartment external strength representative value suddenly becomes larger than the vehicle compartment internal strength representative value, while the strength difference ΔRSSI suddenly becomes equal to or more than the high level threshold. The location determination portion F6 detects, based on such a behavior of the strength difference ΔRSSI, that the mobile terminal 20 has been taken out of the vehicle compartment to the outside thereof. Note that, as the user is further away from the vehicle V, the RSSI of the mobile terminal 20 in the vehicle compartment external module 160 decreases, and consequently the strength difference ΔRSSI converges to 0. Note that, according to the determination algorithm described above, the result of the determination that the mobile terminal 20 is present outside the vehicle compartment is maintained until the strength difference ΔRSSI becomes equal to or less than the low level threshold.

In the entry process, as the user approaches the vehicle, the RSSIs of the mobile terminal 20 in the vehicle compartment external module 160 increase, and consequently the strength difference ΔRSSI gradually increases from around 0. At that time, the strength difference ΔRSSI may become equal to or more than the high level threshold. Then, when the user opens the door, gets into the vehicle V, and closes the door, the vehicle compartment internal strength representative value suddenly becomes larger than the vehicle compartment external strength representative value, and the strength difference ΔRSSI becomes equal to or less than the low level threshold. The location determination portion F6 detects, based on such a behavior of the strength difference ΔRSSI, that the mobile terminal 20 has been brought into the vehicle compartment from the outside thereof.

Even when the strength difference ΔRSSI temporarily decreases under the influence of a multipath, such a mode allows the result of the determination that the mobile terminal 20 is present inside the vehicle compartment to be maintained unless the strength difference ΔRSSI becomes equal to or more than the high level threshold. In addition, once the location determination portion F6 determines that the mobile terminal 20 is present outside the vehicle compartment, the result of the determination that the mobile terminal 20 is present outside the vehicle compartment is maintained thereafter unless the strength difference ΔRSSI becomes equal to or less than the low level threshold. Accordingly, such a mode achieves the same effects as those achieved by the mode in which the value obtained by subtracting the vehicle compartment external average strength from the vehicle compartment internal average strength is used as the strength difference ΔRSSI.

Third Embodiment

Next, using the drawings, a description will be given of the location determination system 1 according to a third embodiment of the present disclosure. The present embodiment is mainly different from the second embodiment previously described in that the vehicle system 10 includes a plurality of the vehicle compartment internal modules 150 and a plurality of the vehicle compartment external modules 160. The following will mainly describe a configuration and an operation of the vehicle system 10 included in the location determination system 1 in the third embodiment. Note that members having the same functions as those of the members described above in the first embodiment are given the same reference numerals, and a description thereof is omitted. When only a portion of the configuration is mentioned, the configuration of any of the various embodiments previously described is applicable to the other portion of the configuration.

Figure 16:
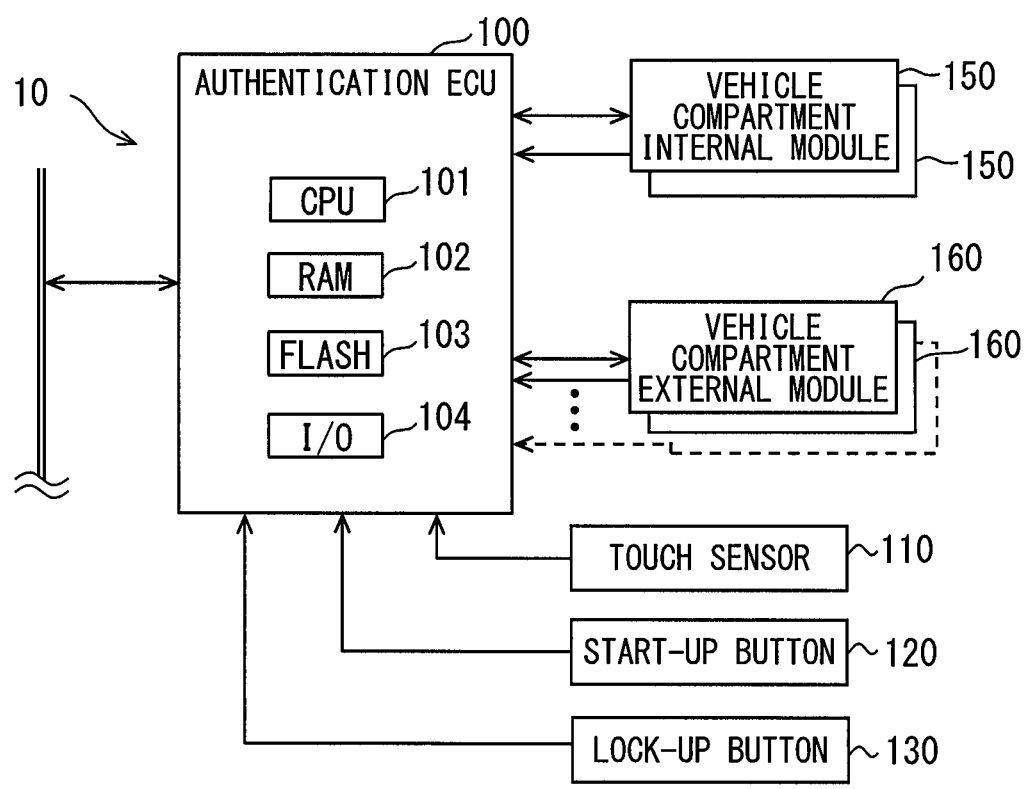
FIG. 16 is a block diagram showing a schematic configuration of a vehicle system of a third embodiment.

As shown in FIG. 16, the vehicle system 10 in the present embodiment includes the plurality of vehicle compartment internal modules 150 and the plurality of vehicle compartment external modules 160. In FIG. 16, the illustration of the engine ECU 200 and the like is omitted. As the individual short-range communication modules, those having basically the same configuration and the same function can be used. By way of example, it is assumed herein that each of the short-range communication modules has the configuration shown in FIG. 3.

Figure 17:
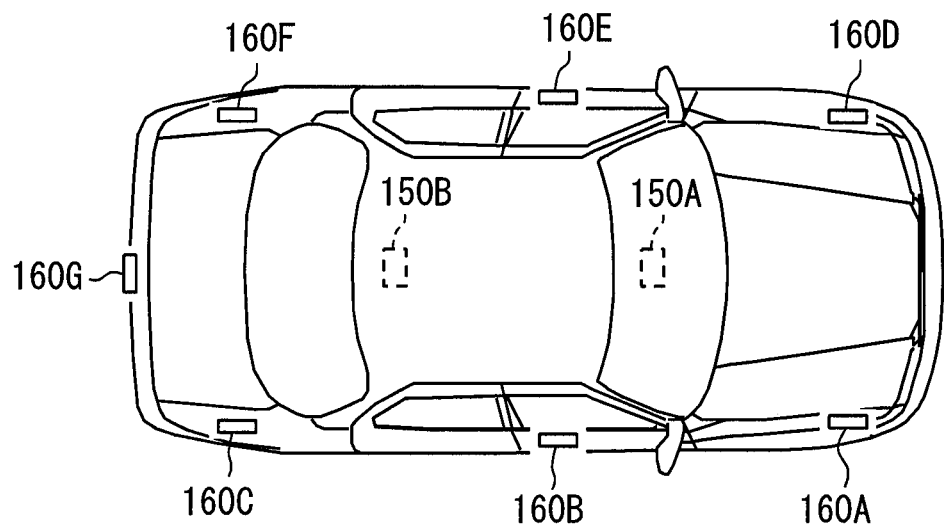
FIG. 17 is a view showing an example of respective positions at which various short-range communication modules are disposed.

In the present embodiment, by way of example, the vehicle system 10 includes, as the vehicle compartment internal modules 150, a front passenger seat module 150A and a rear passenger seat module 150B, as shown in FIG. 17. The front passenger seat module 150A is the vehicle compartment internal module 150 mainly for forming the communication area in a front passenger seat space. Similarly to, e.g., the vehicle compartment internal module 150 of the first embodiment, the front passenger seat module 150A is disposed in the vicinity of the center console 2.

The rear passenger seat module 150B is the vehicle compartment internal module 150 mainly for forming the communication area in a vehicle compartment internal space (hereinafter referred to as the rear passenger seat space) around a rear passenger seat. The rear passenger seat module 150B is embedded in, e.g., a seat surface of a middle portion of the rear passenger seat in the vehicle width direction. Needlessly to say, the respective positions at which the front passenger seat module 150A and the rear passenger seat module 150B are disposed may appropriately be designed, and are not limited to those in the mode described above. The vehicle system 10 may also include the three or more vehicle compartment internal modules 150. Each of the vehicle compartment internal modules 150 is intercommunicatively connected to the authentication ECU 100.

Figure 18:
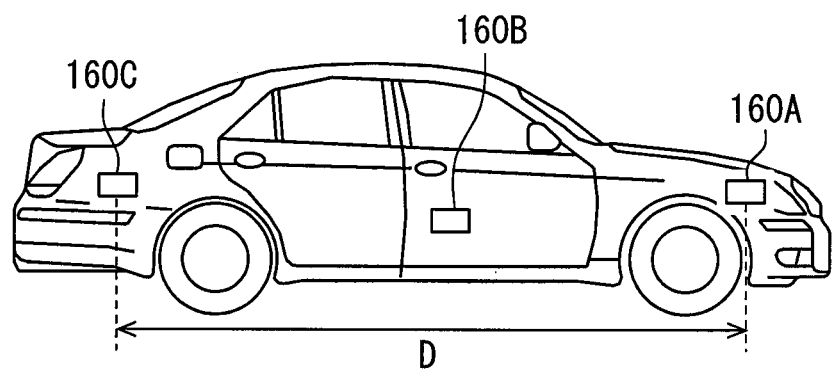
FIG. 18 is a view showing an example of respective positions at which vehicle compartment external modules are disposed.

The vehicle system 10 also includes, as the vehicle compartment external module 160, a right first module 160A, a right second module 160B, a right third module 160C, a left first module 160D, a left second module 160E, a left third module 160F, and a rear end portion module 160G, as shown in FIGS. 17 and 18.

The right first module 160A is the vehicle compartment external module 160 disposed in a region of a right side surface portion of the vehicle which is closer to the front end portion than the door for the front passenger seat. In the present embodiment, by way of example, it is assumed that the right first module 160A is disposed in the vicinity of a right front wheel.

The right second module 160B is the vehicle compartment external module 160 disposed in a region of the right side surface portion of the vehicle which is located in the vicinity of the middle portion of the vehicle in the front-rear direction thereof. In the present embodiment, by way of example, it is assumed that the right second module 160B is disposed in the outer side surface portion of the door for the front passenger seat. Note that, in another mode, the right second module 160B may also be disposed in the door handle for the right front passenger seat, in an outer side surface portion of the door for the rear passenger seat, or in the door handle for the right rear passenger seat. The right second module 160B may also be disposed in a locker portion below the door or in a right edge portion of the roof portion.

The right third module 160C is the vehicle compartment external module 160 disposed in a region of the right side surface portion of the vehicle which is closer to the rear end portion than the door for the rear passenger seat. In the present embodiment, by way of example, it is assumed that the right third module 160C is disposed in the vicinity of a right rear wheel. Among the plurality of vehicle compartment external modules disposed in the right side surface of the vehicle V, the frontmost vehicle compartment external module and the rearmost vehicle compartment external module are preferably disposed at positions spaced apart at a distance of 1 m or more in the front-rear direction of the vehicle. Note that, in the present embodiment, among the plurality of vehicle compartment external modules disposed in the right side surface of the vehicle V, the frontmost vehicle compartment external module is the right first module 160A and the rearmost vehicle compartment external module is the right third module 160C. By way of example, a distance D between the right first module 160A and the right third module 160C is set to about 3 m. The distance D may also be 2 m, 1.5 m, or the like.

The left first module 160D, the left second module 160E, and the left third module 160F are the vehicle compartment external modules 160 which are respectively paired up with the right first module 160A, the right second module 160B, and the right third module 160C which have been already described. The left first module 160D is disposed at a position in a left side surface portion of the vehicle V which is opposite to that of the right first module 160A. Likewise, the left second module 160E and the left third module 160F may also be disposed appropriately at respective positions in the left side surface of the vehicle V which are opposite to those of the right second module 160B and the right third module 160C. For example, the left second module 160E is disposed at a place corresponding to the position at which the right second module 160B is mounted, such as in the door handle for the left front passenger seat, in the door handle for the right rear passenger seat, in the locker portion below the door, or in the right edge portion of the roof portion. The rear end portion module 160G is the vehicle compartment external module 160 disposed in the vicinity of the middle portion of the vehicle rear end portion in the vehicle width direction. For example, the rear end portion module 160G may appropriately be disposed in the vicinity of the door handle for the trunk.

Needless to say, the respective positions at which the individual vehicle compartment external modules are disposed may appropriately be designed, and are not limited to those in the mode described above. The number of the vehicle compartment external modules included in the vehicle system 10 may be equal to or less than 5 or equal to or more than 8. Each of the vehicle compartment external modules 160 is intercommunicatively connected to the authentication ECU 100.

The RSSI acquisition portion F4 in the present embodiment acquires the RSSI data from each of the plurality of short-range communication modules and separately and individually stores, in the RSSI storage portion M1, the acquired RSSI data according to each of the sources from which the RSSI data is acquired.

The location determination portion F6 calculates, based on the RSSIs acquired in each of the short-range communication modules, the moving average value (i.e., average strength) of the RSSIs in each of the short-range communication modules, and determines the location of the mobile terminal 20 based on the average strength in each of the short-range communication modules. Details of the operation of the location determination portion F6 will be separately described later.

Figure 19:
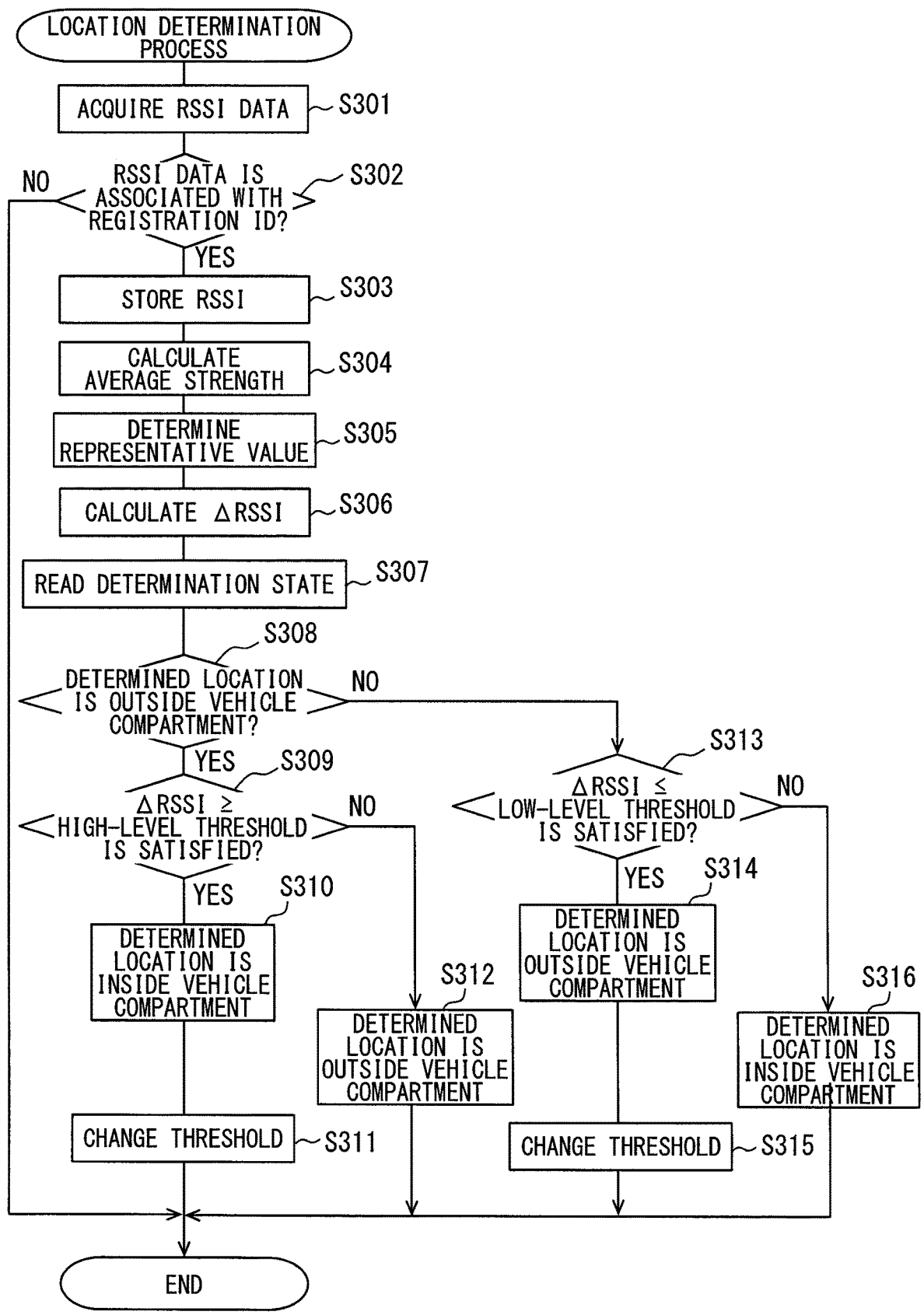
FIG. 19 is a flow chart showing the location determination process performed by the authentication ECU of the third embodiment.

Next, using the flow chart shown in FIG. 19, a description will be given of the location determination process performed by the authentication ECU 100 of the third embodiment. The flow chart shown in FIG. 19 may appropriately be executed at predetermined sampling intervals, similarly to the flow chart shown in FIG. 8.

First, in S301, the RSSI acquisition portion F4 acquires the RSSI data from each of the plurality of short-range communication modules, and moves the process flow to S302. In S302, the RSSI acquisition portion F4 determines whether or not the RSSI acquisition portion F4 has successfully acquired the RSSI data assigned to the registration ID as a result of the process in S301.

When, as a result of the process in S301, at least any one of the plurality of short-range communication modules has successfully acquired the RSSIs (i.e., the RSSIs of the mobile terminal 20) assigned to the registration ID, the RSSI acquisition portion F4 makes an affirmative determination in S302, and moves the process flow to S303. On the other hand, when none of the short-range communication modules has successfully acquired the RSSIs assigned to the registration ID, the RSSI acquisition portion F4 makes a negative determination in S302, and ends the present flow.

In the present embodiment, by way of example, it is assumed that, when at least any one of the plurality of short-range communication modules has successfully received the signal from the mobile terminal 20, a subsequent process in S303 or the like is performed, but the process flow is not limited thereto. When neither the vehicle compartment internal module 150 nor the vehicle compartment external module 160 has successfully acquired the RSSIs of the mobile terminal 20, the RSSI acquisition portion F4 may also make a negative determination in S302, and end the present flow.

In S303, the RSSI acquisition portion F4 stores, in the RSSI storage portion M1, the RSSIs of the mobile terminal 20 acquired in S301, and moves the process flow to S304. Note that, for the most recent RSSI in the short-range communication module that has not successfully received the signal from the mobile terminal 20, a lower limit value (i.e., minimum value) in the range of the RSSIs that can be output from the RSSI detection portion 1421 is assumed to be registered, instead of an actually observed value. With such a configuration, when at least any one of the plurality of short-range communication modules has successfully received the signal from the mobile terminal 20, it is possible to determine the location of the mobile terminal 20.

In S304, the location determination portion F6 calculates the average strength in each of the short-range communication modules based on the RSSIs assigned to each of the short-range communication modules, which are stored in the RSSI storage portion M1. A method of calculating the average strength in each of the short-range communication modules is as described above. When the calculation process is completed in S304, the location determination portion F6 moves the process flow to S305.

In S305, the location determination portion F6 calculates, based on the average strength in each of the vehicle compartment internal modules 150, a representative value (hereinafter referred to as the vehicle compartment internal strength representative value) of the RSSIs in the short-range communication module corresponding to the vehicle compartment internal module 150. Specifically, the location determination portion F6 makes a comparison between the average strength in the front passenger seat module 150A and the average strength in the rear passenger seat module 150B, and uses the higher average strength as the vehicle compartment internal strength representative value. In another mode, the vehicle compartment internal strength representative value may also be an average value of the average strengths in the individual vehicle compartment internal modules 150. When the vehicle system 10 includes the three or more vehicle compartment internal modules 150, the vehicle compartment internal strength representative value may also be a median value of the average strengths in the individual vehicle compartment internal modules 150. Besides, the vehicle compartment internal strength representative value may also be a minimum value of the average strengths in the individual vehicle compartment internal modules 150.

In S305, the location determination portion F6 also calculates, based on the average strengths in the individual vehicle compartment external modules 160, a representative value (hereinafter referred to as the vehicle compartment external strength representative value) of the RSSIs in the short-range communication module corresponding to the vehicle compartment external module 160. By way of example, a largest value (i.e., maximum value) of the average strengths in the individual vehicle compartment external modules 160 is used herein as the vehicle compartment external strength representative value.

Note that, in another mode, the vehicle compartment external strength representative value may also be an average value of the average strengths in the individual vehicle compartment external modules 160. When the vehicle system 10 includes the three or more vehicle compartment external modules 160 as in the present embodiment, the vehicle compartment external strength representative value may also be a median value of the average strengths in the individual vehicle compartment external modules 160. Besides, the vehicle compartment external strength representative value may also be a minimum value of the average strengths in the individual vehicle compartment external modules 160.

It is assumed that the vehicle compartment internal strength representative value and the vehicle compartment external strength representative value are determined using the same basic amount of statistics. For example, when the vehicle compartment internal strength representative value is assumed to be the average value of the average strengths in the individual vehicle compartment internal modules 150, the vehicle compartment external strength representative value is accordingly assumed to be the average value of the average strengths in the individual vehicle compartment external modules 160. When the process of calculating the vehicle compartment internal strength representative value and the vehicle compartment external strength representative value is completed, the location determination portion F6 moves the process flow to S306.

In S306, the location determination portion F6 calculates a value by subtracting the vehicle compartment external strength representative value from the vehicle compartment internal strength representative value and moves the process flow to S307. Note that the value obtained by subtracting the vehicle compartment external strength representative value from the vehicle compartment internal strength representative value functions as a parameter representing differences between the reception strengths in the vehicle compartment internal modules 150 and the reception strengths in the vehicle compartment external modules 160. Accordingly, the value obtained by subtracting the vehicle compartment external strength representative value from the vehicle compartment internal strength representative value is hereinafter referred to as the strength difference ΔRSSI.

In S307, the location determination portion F6 refers to the location storage portion M2 to read the result of the previous location determination process. When it has been determined in the previous location determination process that the location of the mobile terminal 20 is outside the vehicle compartment, the location determination portion F6 makes an affirmative determination in S308, and moves the process flow to S309. On the other hand, when it has been determined in the previous location determination process that the location of the mobile terminal 20 is inside the vehicle compartment, the location determination portion F6 makes a negative determination in S308, and moves the process flow to S313.

In S309, the location determination portion F6 compares the strength difference ΔRSSI calculated in S306 to the high level threshold to determine whether or not the strength difference ΔRSSI is equal to or more than the high level threshold. The high level threshold used herein is set based on the same technical idea as that used to set the high level threshold used in the second embodiment.

When the strength difference ΔRSSI is equal to or more than the high level threshold, the location determination portion F6 makes an affirmative determination in S309, moves the process flow to S310, and determines that the mobile terminal 20 is present inside the vehicle compartment. Then, the location determination portion F6 stores, in the location storage portion M2, the result of the determination that the location of the mobile terminal 20 is inside the vehicle compartment, and moves the process flow to S311. In S311, the location determination portion F6 sets the determination threshold to be used for the location determination process to be performed next time to the low level threshold, and ends the present flow.

On the other hand, when the strength difference ΔRSSI is less than the high level threshold in S309, the location determination portion F6 moves the process flow to S312. In S312, the location determination portion F6 determines that the mobile terminal 20 is present outside the vehicle compartment, and ends the present flow. In this case, the location determination portion F6 does not change the setting of the determination threshold to be used for the location determination process to be performed next time.

In S313, the location determination portion F6 compares the strength difference ΔRSSI calculated in S306 to the low level threshold to determine whether or not the strength difference ΔRSSI is equal to or less than the low level threshold. The low level threshold used herein is set based on the same technical idea as that used to set the low level threshold used in the second embodiment.

When the strength difference ΔRSSI is equal to or less than the low level threshold, the location determination portion F6 makes an affirmative determination in S313, moves the process flow to S314, and determines that the mobile terminal 20 is present outside the vehicle compartment. Then, the location determination portion F6 stores, in the location storage portion M2, the result of the determination that the location of the mobile terminal 20 is outside the vehicle compartment, and moves the process flow to S315.

On the other hand, when the strength difference ΔRSSI is in excess of the low level threshold in S313, the location determination portion F6 moves the process flow to S316. In S316, the location determination portion F6 determines that the mobile terminal 20 is present inside the vehicle compartment, and ends the present process. In this case, the location determination portion F6 does not change the setting of the determination threshold to be used for the location determination process to be performed next time, and maintains the low level threshold. Note that, as a process subsequent to S311, S312, S315, or S316, the authentication process or the like may also be performed in the same manner as in the first embodiment described above.

(Effects of Third Embodiment)

The configuration described above also achieves the same effects as those achieved in the second embodiment. The third embodiment also achieves the following effects in addition to the effects achieved by the second embodiment.

In the third embodiment described above, the difference between the representative value (i.e., vehicle compartment internal strength representative value) of the reception strengths in the short-range communication modules provided inside the vehicle compartment and the representative value (i.e., vehicle compartment external strength representative value) of the reception strengths in the short-range communication modules provided outside the vehicle compartment is used as the strength difference ΔRSSI. Such a configuration can reduce the probability that an erroneous determination is made depending on a mode in which the user carries the mobile terminal 20.

Figure 20:
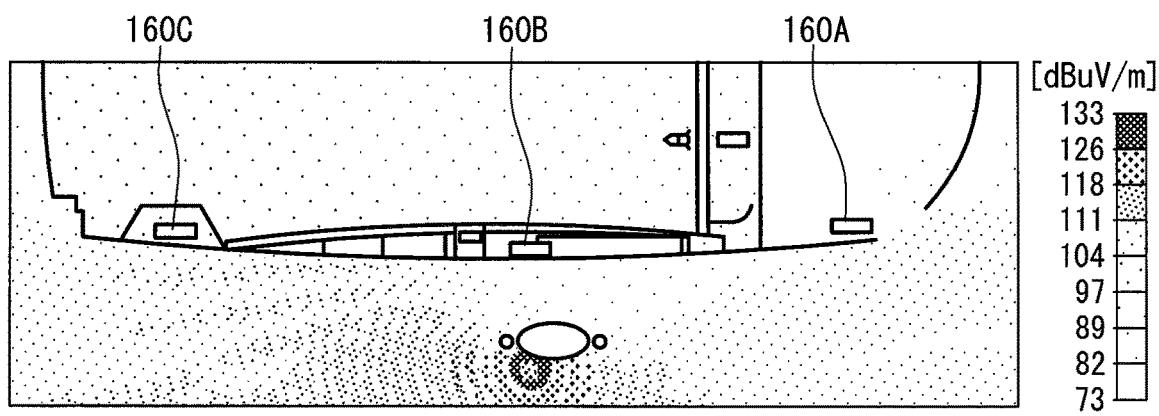
FIG. 20 is a view showing a result of simulating a strength distribution of a signal transmitted from the mobile terminal when the mobile terminal is contained in a back pocket of pants.
Figure 21:
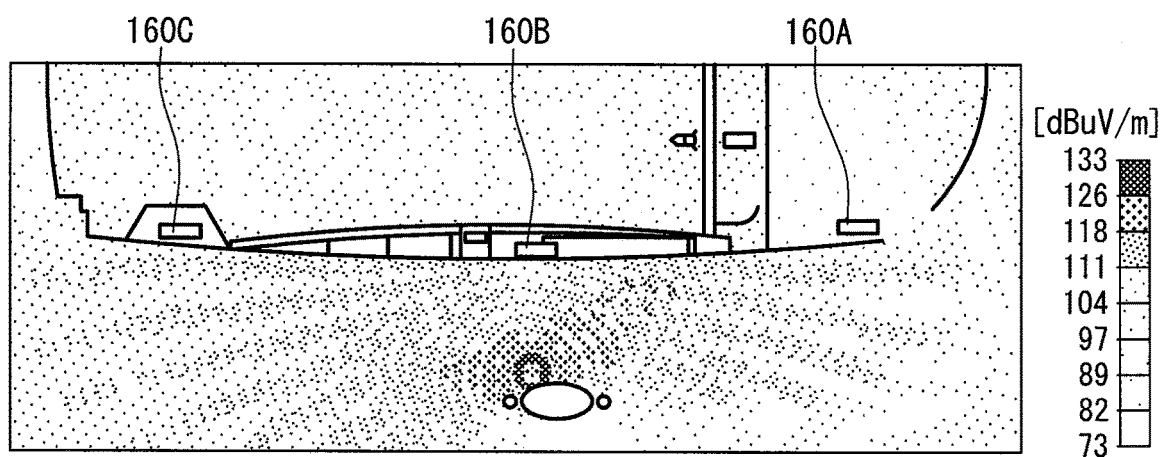
FIG. 21 is a view showing a result of simulating the strength distribution of the signal transmitted from the mobile terminal when the mobile terminal is contained in a breast pocket of a jacket.

Using FIGS. 20 and 21, a description will be given of influence given by the mode in which the user carries the mobile terminal 20 to the RSSIs. FIG. 20 shows a view obtained by simulating a strength distribution of the signal transmitted from the mobile terminal 20 when the user faces a front portion of the body to the vehicle V in a state where the mobile terminal 20 is contained in a pocket provided on the rear side of pants. FIG. 21 shows a view obtained by simulating the strength distribution of the signal transmitted from the mobile terminal 20 when the user faces the front portion of the body to the vehicle V in a state where the mobile terminal 20 is contained in a chest pocket of a jacket.

As will be understood from a comparison between FIGS. 20 and 21, the signal transmitted from the mobile terminal 20 is significantly attenuated by the human body. Accordingly, the RSSI in the short-range communication module present at a position relatively close to the user significantly varies depending on the mode in which the user carries the mobile terminal 20. Specifically, for example, as shown in FIGS. 20 and 21, the RSSI in the right second module 160B located in front of the user significantly varies depending on whether or not the mobile terminal 20 is carried in the mode in which the mobile terminal is located on the back side of the user. On the other hand, an amount of variation of the RSSI in the right third module 160C present at a position relatively away from the user is not so large as the amount of variation in the right second module 160B.

In view of such a tendency, the vehicle compartment external strength representative value to be used in calculating the strength difference $\Delta$RSSI on the assumption that the average strengths in the plurality of individual vehicle compartment external modules are a population is determined. Thus, it is possible to reduce the influence given by the mode in which the user carries the mobile terminal 20 to the strength difference $\Delta$RSSI. As a result, as compared to the second embodiment, the present embodiment allows the location of the mobile terminal 20 to be more accurately determined.

By particularly disposing the plurality of vehicle compartment external modules 160 in the side surface portion of the vehicle V so as to distribute the vehicle compartment external modules 160 over 2 m or more in the front-rear direction of the vehicle as in the present embodiment, it is expected that any of the plurality of vehicle compartment external modules 160 can receive the signal from the mobile terminal 20 without being affected by the human body of the user. Accordingly, by disposing the plurality of vehicle compartment external modules 160 in the side surface portion of the vehicle V so as to distribute the vehicle compartment external modules 160 over 2 m or more in the front-rear direction of the vehicle, it is possible to further increase the accuracy of determination of whether or not the mobile terminal 20 is present inside the vehicle compartment.

Note that a configuration in which the plurality of vehicle compartment external modules 160 are disposed in the side surface portion of the vehicle V so as to be distributed over 2 m or more in the front-rear direction of the vehicle corresponds to a configuration in which, in side view, the vehicle compartment external modules 160 are disposed such that the user present in the vicinity of the door is interposed therebetween. Besides, in the foregoing configuration, the strength difference $\Delta$RSSI is determined using the plurality of vehicle compartment internal modules 150 and the plurality of vehicle compartment external modules 160, which can also prevent the influence of a multipath.

In an application example, the location determination portion F6 of the third embodiment may also be such that, when determining that the mobile terminal 20 is present outside the vehicle compartment, the location determination portion F6 determines whether or not the mobile terminal 20 is present inside a predetermined locking/unlocking area based on the vehicle compartment external strength representative value. Specifically, when the vehicle compartment external strength representative value is equal to or more than a predetermined threshold, the location determination portion F6 determines that the mobile terminal 20 is present inside the locking/unlocking area. On the other hand, when the vehicle compartment external strength representative value is less than the predetermined threshold, the location determination portion F6 determines that the mobile terminal 20 is not present inside the locking/unlocking area. The locking/unlocking area is the area described above in the application example of the second embodiment.

In a case where the location processing portion F6 performs a process of controlling a locked/unlocked state when the mobile terminal 20 is present inside the locking/unlocking area, if there is one vehicle compartment external module 160, even though the mobile terminal 20 is actually present inside the locking/unlocking area, it may be determined that the mobile terminal 20 is present outside the locking/unlocking area due to the influence of the human body, as described using FIG. 20.

As a solution to such a difficulty, the plurality of vehicle compartment external modules 160 are disposed so as to be distributed over 2 m or more in the front-rear direction of the vehicle. This can reduce the probability of making an erroneous determination due to the influence of the human body. This is because any of the plurality of vehicle compartment external modules 160 can receive the signal from the mobile terminal 20 without being affected by the human body, and consequently it is expected that the vehicle compartment external strength representative value becomes equal to or more than the threshold for determining that the mobile terminal 20 is present inside the locking/unlocking area.

The foregoing has disclosed the mode in which the value obtained by subtracting the vehicle compartment external strength representative value from the vehicle compartment internal strength representative value is used as the strength difference $\Delta$RSSI. However, the present embodiment is not limited thereto. It may also be possible to use a value obtained by subtracting the vehicle compartment internal strength representative value from the vehicle compartment external strength representative value as the strength difference $\Delta$RSSI and determine the location of the mobile terminal 20 using the strength difference $\Delta$RSSI.

Figure 22:
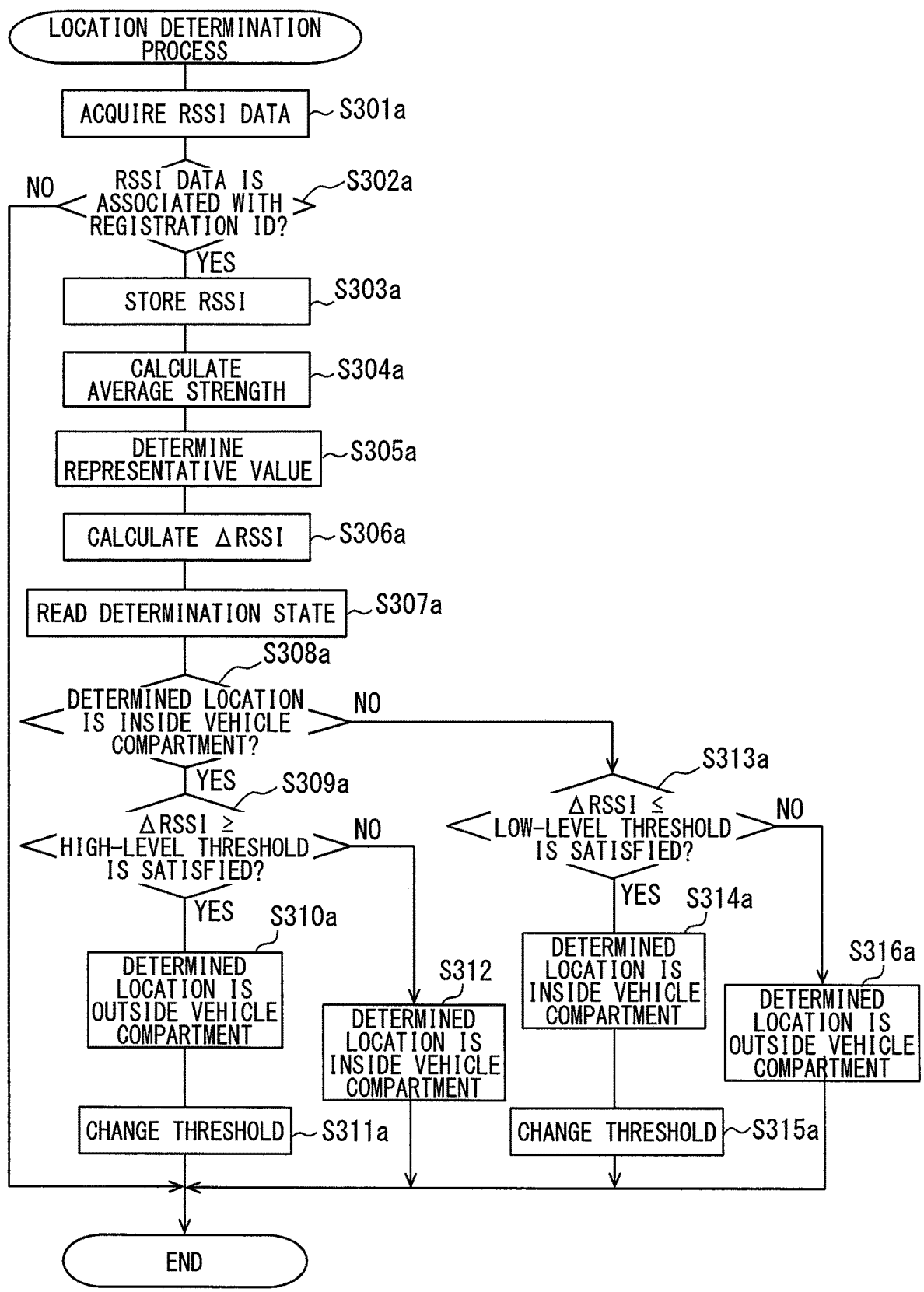
FIG. 22 is a flow chart showing a modification of the location determination process performed by the authentication ECU of the third embodiment.

In that case, the authentication ECU 100 may appropriately perform the location determination process in accordance with a procedure illustrated in FIG. 22. FIG. 22 is a flow chart for the location determination process when the location of the mobile terminal 20 is estimated using the strength difference $\Delta$RSSI obtained by subtracting the vehicle compartment internal strength representative value from the vehicle compartment external strength representative value. The flow chart shown in FIG. 22 may appropriately be executed at predetermined sampling intervals, similarly to the flow chart shown in FIG. 19. The process in S301a to S305a shown in FIG. 22 is the same as the process in S301 to S305 described above.

In S306a, the location determination portion F6 calculates, as the strength difference $\Delta$RSSI, a value by subtracting the vehicle compartment internal strength representative value from the vehicle compartment external strength representative value, and moves the process flow to S307a. In S307a, the location determination portion F6 refers to the location storage portion M2 to read the result of the previous location determination process. When it has been determined in the previous location determination process that the location of the mobile terminal 20 is inside the vehicle compartment, the location determination portion F6 makes an affirmative determination in S308a, and moves the process flow to S309a. On the other hand, when it has been determined in the previous location determination process that the location of the mobile terminal 20 is outside the vehicle compartment, the location determination portion F6 makes a negative determination in S308a, and moves the process flow to S313a.

In S309a, the location determination portion F6 compares the strength difference ΔRSSI calculated in S306a to the high level threshold to determine whether or not the strength difference ΔRSSI is equal to or more than the high level threshold. The high level threshold used herein may appropriately be designed within a range more than the low level threshold, such as +5 dB.

When the strength difference ΔRSSI is equal to or more than the high level threshold, the location determination portion F6 makes an affirmative determination in S309a, moves the process flow to S310a, and determines that the mobile terminal 20 is present outside the vehicle compartment. Then, the location determination portion F6 stores, in the location storage portion M2, the result of the determination that the location of the mobile terminal 20 is outside the vehicle compartment, and moves the process flow to S311a. In S311a, the location determination portion F6 sets the determination threshold to be used for the location determination process to be performed next time to the low level threshold, and ends the present flow.

On the other hand, when the strength difference ΔRSSI is less than the high level threshold in S309a, the location determination portion F6 moves the process flow to S312a. In S312a, the location determination portion F6 determines that the mobile terminal 20 is present inside the vehicle compartment, and ends the present flow. In this case, the location determination portion F6 does not change the setting of the determination threshold to be used for the location determination process to be performed next time.

In S313a, the location determination portion F6 compares the strength difference ΔRSSI calculated in S306a to the low level threshold to determine whether or not the strength difference ΔRSSI is equal to or less than the low level threshold. The low level threshold used herein may be designed appropriately within a range less than the high level threshold to be, e.g., −5 dB such that a gap between the high level threshold and the low level threshold has a predetermined value (e.g., 5 dB) or more.

When the strength difference ΔRSSI is equal to or less than the low level threshold, the location determination portion F6 makes an affirmative determination in S313a, moves the process flow to S314a, and determines that the mobile terminal 20 is present inside the vehicle compartment. Then, the location determination portion F6 stores, in the location storage portion M2, the result of the determination that the location of the mobile terminal 20 is inside the vehicle compartment, and moves the process flow to S315a. In S315a, the location determination portion F6 sets the determination threshold to be used for the location determination process to be performed next time to the high level threshold, and ends the present flow.

On the other hand, when the strength difference ΔRSSI is in excess of the low level threshold, the location determination portion F6 moves the process flow to S316a. In S316a, the location determination portion F6 determines that the mobile terminal 20 is present outside the vehicle compartment, and ends the present flow. In this case, the location determination portion F6 does not change the setting of the determination threshold to be used for the location determination process to be performed next time, and maintains the low level threshold. Such a mode also achieves the same effects as those achieved by the mode in which the value obtained by subtracting the vehicle compartment external strength representative value from the vehicle compartment internal strength representative value is used as the strength difference ΔRSSI.

Fourth Embodiment

The first embodiment described above has disclosed the mode in which whether or not the mobile terminal 20 is present inside the vehicle compartment is determined using the reception strengths in the one vehicle compartment internal module 150. However, a mode to be used is not limited thereto. It may also be possible to introduce the concept of the vehicle compartment internal strength representative value mentioned in the third embodiment to the first embodiment and determine whether the mobile terminal 20 is present inside the vehicle compartment or outside the vehicle compartment based on the vehicle compartment internal strength representative value. For the sake of convenience, such an embodiment is referred to as a fourth embodiment.

Figure 23:
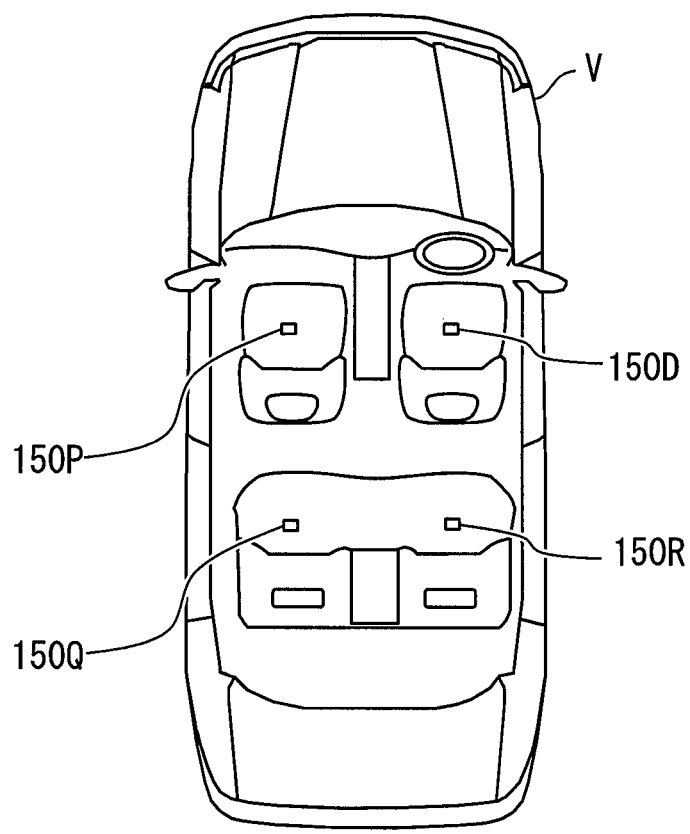
FIG. 23 is a conceptual view showing a configuration of a fourth embodiment.

As shown in FIG. 23, the vehicle system 10 of the fourth embodiment includes, as the vehicle compartment internal modules 150, a driver seat module 150D, a front passenger seat module 150P, a first rear passenger seat module 150Q, and a second rear passenger seat module 150R. The respective antennas 141 included in the driver seat module 150D, the front passenger seat module 150P, the first rear passenger seat module 150Q, and the second rear passenger seat module 150R can be formed of directional antennas to form limited communication areas.

The driver seat module 150D is the vehicle compartment internal module 150 forming the communication area in a driver seat area. The driver seat area is an area (actually a space) to be used by a passenger occupying the driver seat. The driver seat area corresponds to a portion of the front passenger seat space described above. For example, the driver seat area may appropriately be a space located on the driver seat side of the center console 2 and on the front side of a back rest of the driver seat. As a position of the back rest of the driver seat, a position designed in advance based on an average seat position of persons having various body frames can be used appropriately. A space above the instrument panel 3 or the center console 2 portion may also be included in the driver seat area.

The driver seat module 150D is disposed in a region of the roof portion inside the vehicle compartment corresponding to a space above the driver seat to be in a position in which the center of the directionality of the antenna 141 faces the driver seat (mainly a seat surface thereof). Note that the position at which the driver seat module 150D is mounted is not limited thereto. The driver seat module 150D may also be disposed in the side surface portion of the door for the driver seat inside the vehicle compartment, at feet under the driver seat, in the center console 2, in the portion of the instrument panel 3 facing the driver seat, or the like. The driver seat module 150D may also be embedded in the driver seat.

The front passenger seat module 150P is the vehicle compartment internal module 150 forming the communication area in a front passenger seat area. The front passenger seat area is an area (actually a space) to be used by a passenger occupying the front passenger seat. The front passenger seat area is generally set around the front passenger seat. The front passenger seat area can be assumed to be an area remaining after the driver seat area is removed from the front passenger seat space. For example, the front passenger seat area may appropriately be a space located on the front passenger seat side of the center console 2 and on the front side of a back rest portion of the front passenger seat.

For example, the front passenger seat module 150P is disposed in a region of the roof portion inside the vehicle compartment corresponding to a space above the front passenger seat to be in a position in which the center of the directionality of the antenna 141 faces the front passenger seat (mainly a seat surface thereof). Note that the position at which the front passenger seat module 150P is mounted is not limited thereto. The front passenger seat module 150P may also be disposed in the side surface portion of the door for the front passenger seat inside the vehicle compartment, at feet under the front passenger seat, in the center console 2, in a region of the instrument panel 3 facing the front passenger seat, or the like. The front passenger seat module 150P may also be embedded in the front passenger seat. Note that, instead of the center console 2, a line halving the vehicle in the vehicle width direction (i.e., equally dividing the vehicle into a right half and a left half) may also be used as a boundary between the driver seat area and the front passenger seat area.

The first rear passenger seat module 150Q is the vehicle compartment internal module 150 forming the communication area in a region (hereinafter referred to as the first rear passenger seat area) of the rear passenger seat space corresponding to a space behind the front passenger seat. For example, the first rear passenger seat module 150Q may appropriately be disposed in the roof portion inside the vehicle compartment to be in a position in which the center of the directionality of the antenna 141 faces the first rear passenger seat area. Note that the position at which the first rear passenger seat module 150Q is mounted is not limited thereto. The first rear passenger seat module 150Q may also be disposed in the side surface portion of the back rest portion of the front passenger seat closer to the rear passenger seat, at feet under the rear passenger seat, or the like. The first rear passenger seat module 150Q may also be embedded in the rear passenger seat.

The second rear passenger seat module 150R is the vehicle compartment internal module 150 forming the communication area in a region (hereinafter referred to as the second rear passenger seat area) of the rear passenger seat space corresponding to a space behind the driver seat. Similarly to the first rear passenger seat module 150Q, the second rear passenger seat module 150R may also be disposed appropriately at a position designed appropriately inside the vehicle compartment. Note that the driver seat module 150D and the front passenger seat module 150P correspond to the front passenger seat module 150A described above. On the other hand, the first rear passenger seat module 150Q and the second rear passenger seat module 150R correspond to the rear passenger seat module 150B described above.

The RSSI acquisition portion F4 of the authentication ECU 100 of the present embodiment sequentially acquires the reception strengths (i.e., the RSSI data) in the individual vehicle compartment internal modules 150. The location determination portion F6 calculates, based on the average strengths in the individual vehicle compartment internal modules 150, the representative value (hereinafter referred to as the vehicle compartment internal strength representative value) of the RSSIs in the respective short-range communication modules corresponding to the individual vehicle compartment internal modules 150. Specifically, a largest value among the respective average strengths in the driver seat module 150D, the front passenger seat module 150P, the first rear passenger seat module 150Q, and the second rear passenger seat module 150R is used as the vehicle compartment internal strength representative value.

Needless to say, in another mode, the vehicle compartment internal strength representative value may also be an average value of the average strengths in the individual vehicle compartment internal modules 150 or a median value of the average strengths in the individual vehicle compartment internal modules 150. Alternatively, the vehicle compartment internal strength representative value may also be a minimum value among the average strengths in the individual vehicle compartment internal modules 150.

Figure 8:
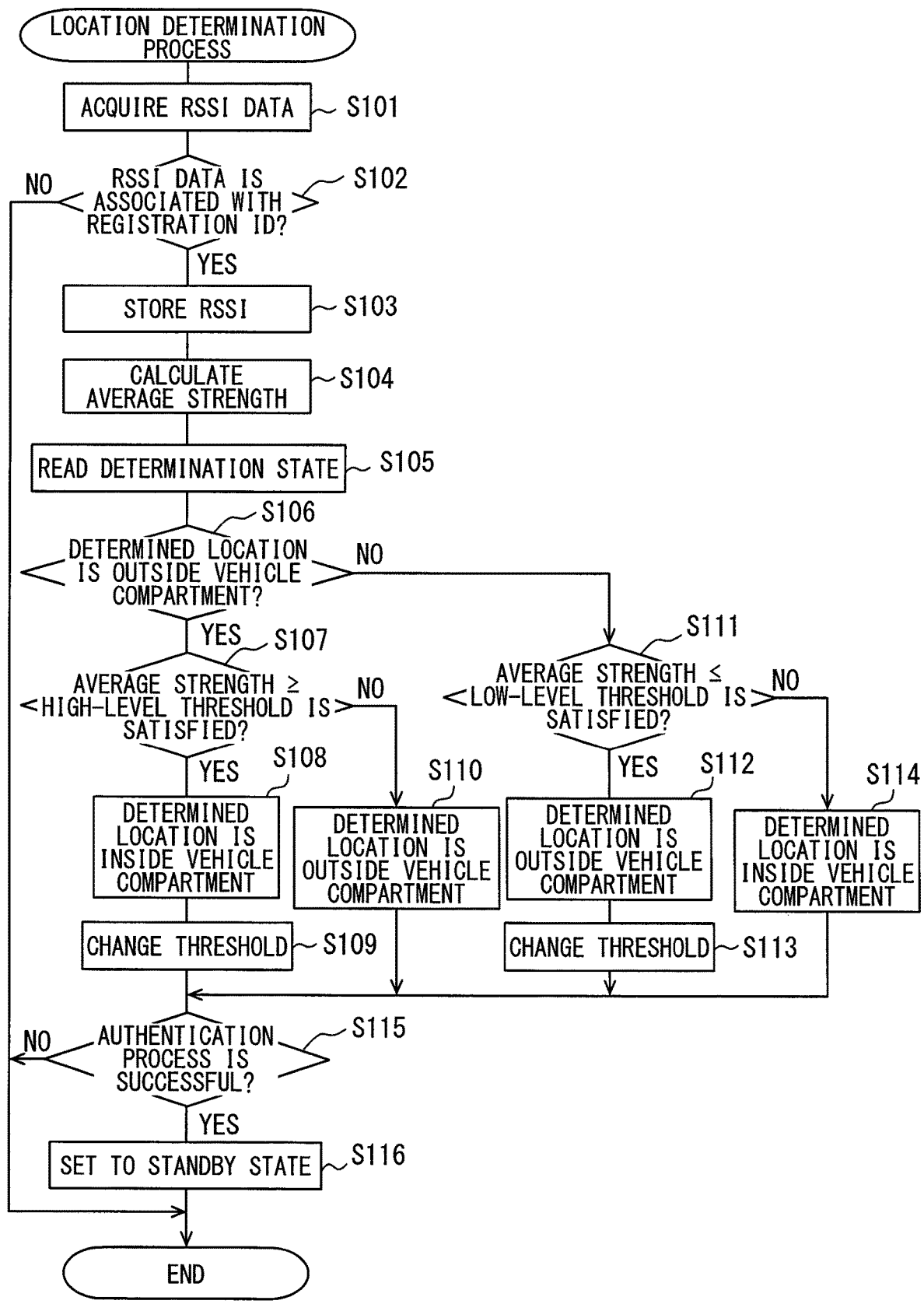
FIG. 8 is a flow chart showing a location determination process.

The location determination portion F6 determines whether or not the mobile terminal 20 is present inside the vehicle compartment using the same determination logic as that used in S106 to S114 included in the flow chart in FIG. 8. Specifically, in a state where the location determination portion F6 has determined that the mobile terminal 20 is present outside the vehicle compartment, when the vehicle compartment internal strength representative value becomes equal to or more than the high level threshold, the location determination portion F6 determines that the mobile terminal 20 is present inside the vehicle compartment. On the other hand, in a state where the location determination portion F6 has determined that the mobile terminal 20 is present inside the vehicle compartment, when the vehicle compartment internal strength representative value becomes equal to or less than the low level threshold, the location determination portion F6 determines that the mobile terminal 20 is present outside the vehicle compartment.

In the configuration described above, the location determination portion F6 makes a determination using the vehicle compartment internal strength representative value including a combination of the RSSIs in the plurality of vehicle compartment internal modules 150 to allow whether or not the mobile terminal 20 is present inside the vehicle compartment to be determined more accurately. Note that the mode disclosed heretofore includes the four vehicle compartment internal modules 150, but the number of the vehicle compartment internal modules 150 to be used to calculate the vehicle compartment internal strength representative value is not limited to 4, and may also be 2, 3, 5, or more.

(First Modification)

The various embodiments described above have disclosed the mode in which, by using the concept of the moving average value (i.e., average strength), time-varying components of the RSSIs are suppressed in determining the location of the mobile terminal 20. However, a mode to be used is not limited thereto. It may also be possible to directly use a detection value without alteration, instead of using the moving average value, to determine the location of the mobile terminal 20. The first modification is applicable not only to the first to fourth embodiments described above, but also to various embodiments and modifications such as a fifth embodiment described later.

(Second Modification)

In the description given heretofore, a radio wave in a 2.4 GHz band is assumed to be the radio wave to be used for short-range communication. However, the radio wave to be used for the short-range communication is not limited thereto. The short-range communication may also be implemented using a radio wave in another frequency band.

As a frequency of a radio wave is lower (i.e., as a wavelength of a radio wave is longer), the radio wave has a stronger tendency to propagate, while bending around an object. In other words, a frequency at which the RSSI is remarkably affected by the human body is a frequency which is too high to allow the radio wave to bend around the human body. Also, a radio wave remarkably affected by a multipath is a radio wave implemented using a frequency which provides a wavelength not sufficiently long as compared to the size of the vehicle V. The wavelength not sufficiently long as compared to the size of the vehicle V is a wavelength shorter than a length (hereinafter referred to as an extended vehicle length) obtained by, e.g., multiplying a length of a vehicle body in the front-rear direction by 10. If the size of the vehicle V is assumed to be 5 m, the wavelength not sufficiently long as compared to the size of the vehicle V is a wavelength of equal to or less than 50 m. A radio wave having such a wavelength functions as a far field, and consequently the influence of a multipath is remarkably observed. In other words, the wavelength not sufficiently long as compared to the size of the vehicle V corresponds to a wavelength which does not operate in a near field mode around the vehicle.

Note that a frequency at which the wavelength is 50 m is about 6 MHz. Accordingly, the frequency which provides a wavelength not sufficiently long as compared to the size of the vehicle V is a frequency higher than 6 MHz. As a result, each of the various embodiments described above has increased usability when short-range communication is performed using a radio wave at a frequency higher than 6 MHz. Note that the extended vehicle length may appropriately have a value sufficiently larger than the length of the vehicle body in the front-rear direction, and a multiplication (hereinafter multiplication factor) thereof is not limited to 10. The multiplication factor may appropriately be designed in a range of equal to or more than 5. The second modification is also applicable not only to the first to fourth embodiments described above, but also to various embodiments, such as the fifth embodiment described later.

(Third Modification)

In each of the various embodiments described above, the location determination system 1 which determines whether or not the mobile terminal 20 is present inside the vehicle compartment using the two determination thresholds of the high level threshold and the low level threshold is shown by way of example. However, the mode in which an area (hereinafter referred to as the target area) assumed to be an object with respect to which the location determination system 1 makes a determination is set is not limited thereto.

For example, the location determination system 1 may also determine whether or not the mobile terminal 20 is present inside a locking/unlocking area Lx using the two determination thresholds of the high level threshold and the low level threshold. In other words, the target area may also be the locking/unlocking area Lx.

The locking/unlocking area Lx is an area set to serve as a condition for allowing the vehicle control portion F7 to perform a process of controlling the locked/unlocked state of the doors provided in the vehicle V. The vehicle control portion F7 performs the process of controlling the locked/unlocked state of the doors based on the presence of the mobile terminal 20 in the locking/unlocking area Lx and on successful authentication of the mobile terminal 20.

The locking/unlocking area is set to an area within several meters from each of the various doors provided in the vehicle V. The doors mentioned herein are not limited to the door for the driver seat and the door for the front passenger seat, and may also include a trunk door and the like.

Figure 24:
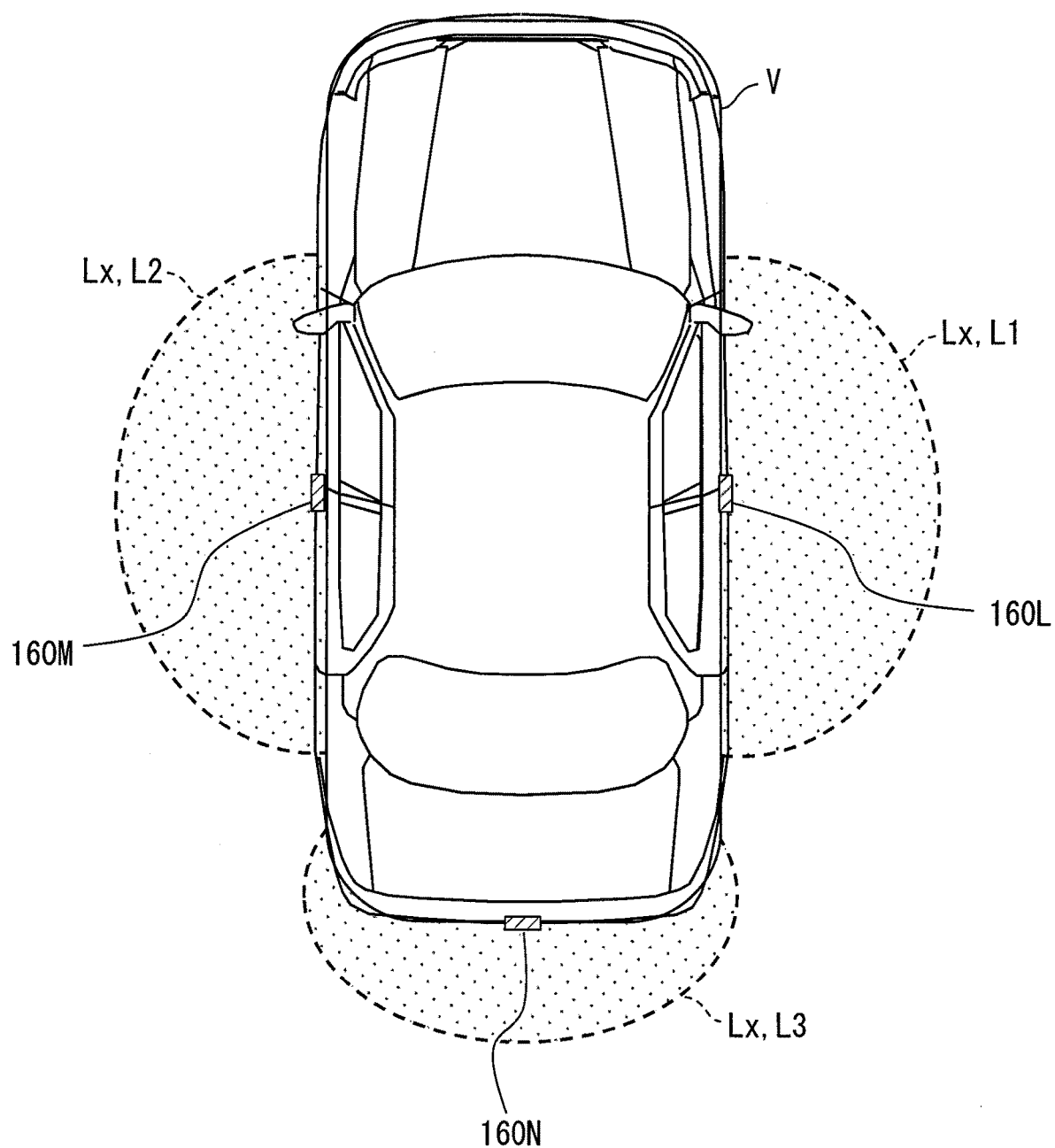
FIG. 24 is a conceptual view showing a mode in which a target area is set in a third modification.

As shown in FIG. 24, a plurality of the locking/unlocking areas Lx may also be set so as not to overlap each other outside the vehicle compartment. In other words, the plurality of locking/unlocking areas Lx may also be set for the vehicle V so as to correspond to the plurality of doors. FIG. 24 is a view conceptually representing the locking/unlocking areas. In FIG. 24, portions each hatched with a dot pattern conceptually represent the locking/unlocking areas.

A locking/unlocking area L1 shown in FIG. 24 represents the locking/unlocking area Lx (hereinafter referred to as a first locking/unlocking area) for controlling the locked/unlocked state of the door for the driver seat. A locking/unlocking area L2 represents the locking/unlocking area Lx (hereinafter referred to as a second locking/unlocking area) for controlling the locked/unlocked state of the door for the front vehicle passenger seat. A locking/unlocking area L3 represents the locking/unlocking area Lx (hereinafter referred to as a third locking/unlocking area) for controlling the locked/unlocked state of the trunk door. The first locking/unlocking area L1 is set in the vicinity of the door for the driver seat, while the second locking/unlocking area L2 is set in the vicinity of the door for the front passenger seat. The third locking/unlocking area L3 is set in the vicinity of the trunk door. Note that the vicinity of each of the doors is a region within a predetermined distance (e.g., 0.7 m, 1 m, or 1.5 m) from the door handle.

The vehicle system 10 is configured such that there is at least one vehicle compartment external module 160 corresponding to each one of the locking/unlocking areas Lx. The vehicle compartment external module 160 corresponding to a given one of the locking/unlocking areas Lx is the vehicle compartment external module 160 having the locking/unlocking area at a center of the communication area. The center of the communication area is a place where a communication quality (such as, e.g., the RSSI or a signal quality) is at a predetermined level and where a distance from the vehicle compartment external module 160 is within several meters.

It is expected that, when the antenna 141 is non-directional, formation of the intended locking/unlocking area L1 is difficult. Accordingly, when a predetermined region outside the vehicle compartment, such as the locking/unlocking area Lx, is set as the target area, the vehicle compartment external module 160 is preferably implemented using a directional antenna.

In the present third modification, it is assumed that the first locking/unlocking area L1, the second locking/unlocking area L2, and the third locking/unlocking area L3 are set for the vehicle V. In addition, the vehicle system 10 includes, as the vehicle compartment external modules 160 corresponding to the individual locking/unlocking areas Lx, a first vehicle compartment external module 160L, a second vehicle compartment external module 160M, and a third vehicle compartment external module 160N.

The first vehicle compartment external module 160L is the vehicle compartment external module 160 disposed to allow the communication area to include the first locking/unlocking area L1. In other words, the first vehicle compartment external module 160L is the vehicle compartment external module 160 corresponding to the first locking/unlocking area L1. When the driver seat is disposed on the right side of the vehicle as in the present third embodiment, the right second module 1606 described above can be used as the first vehicle compartment external module 160L. The first vehicle compartment external module 160L may appropriately be disposed to allow the communication area to include a region set in the first locking/unlocking area L1 outside the vehicle compartment. For example, the first vehicle compartment external module 160L can be disposed in an A-pillar or a B-pillar on the right side of the vehicle. When the antenna 141 included in the first vehicle compartment external module 160L is formed of a directional antenna, the first vehicle compartment external module 160L may also be disposed in the roof portion inside the vehicle compartment located in the vicinity of the window portion to be in a position in which the center of the directionality thereof faces the window portion of the door for the driver seat. The first vehicle compartment external module 160L corresponds to a right reception portion.

The second vehicle compartment external module 160M is the vehicle compartment external module 160 disposed to allow the communication area to include the second locking/unlocking area L2. In other words, the second vehicle compartment external module 160M is the vehicle compartment external module 160 corresponding to the second locking/unlocking area L2. When the driver seat is disposed on the right side of the vehicle as in the present third modification, the left second module 160E described above can be used as the second vehicle compartment external module 160M. The second vehicle compartment external module 160M may appropriately be disposed to allow the communication area to include a region set in the second locking/unlocking area L2 outside the vehicle compartment. For example, the second vehicle compartment external module 160M can be disposed in an A-pillar or a B-pillar on the left side of the vehicle. When the antenna 141 included in the second vehicle compartment external module 160M is a directional antenna, the second vehicle compartment external module 160M may also be disposed in the roof portion inside the vehicle compartment located in the vicinity of the window portion to be in a position in which the center of the directionality thereof faces the window portion of the door for the front vehicle passenger seat. The second vehicle compartment external module 160M corresponds to a left reception portion.

The third vehicle compartment external module 160N is the vehicle compartment external module 160 disposed to allow the communication area to include the third locking/unlocking area L3. In other words, the third vehicle compartment external module 160N is the vehicle compartment external module 160 corresponding to the third locking/unlocking area L3. The third vehicle compartment external module 160N corresponds to the rear end portion module 160G described above.

In the configuration described above, the location determination portion F6 performs the same location determination process as that performed in the first embodiment described above or the like with respect to each of the plurality of locking/unlocking areas Lx. For example, the location determination portion F6 determines whether or not the mobile terminal 20 is present in the first locking/unlocking area L1 using the RSSI in the first vehicle compartment external module 160L.

Specifically, in a state where the location determination portion F6 has determined that the mobile terminal 20 is present outside the first locking/unlocking area L1, when the RSSI detected by the first vehicle compartment external module 160L becomes equal to or more than the predetermined high level threshold, the location determination portion F6 determines that the mobile terminal 20 is present inside the first locking/unlocking area L1. On the other hand, in a state where the location determination portion F6 has determined that the mobile terminal 20 is present inside the first locking/unlocking area L1, when the RSSI detected by the first vehicle compartment external module 160L becomes equal to or less than the low level threshold, the location determination portion F6 determines that the mobile terminal 20 is present outside the first locking/unlocking area L1. Needless to say, the location determination portion F6 may also make a determination using the average strength instead of the RSSI.

Whether or not the mobile terminal 20 is present in the second locking/unlocking area L2 can be determined using the RSSI in the second vehicle compartment external module 160M as the vehicle compartment external module 160 corresponding to the second locking/unlocking area L2. Whether or not the mobile terminal 20 is present in the third locking/unlocking area L3 can be determined using the RSSI in the third vehicle compartment external module 160N as the vehicle compartment external module 160 corresponding to the third locking/unlocking area L3.

With the configuration described above, it is possible to specify in which one of the first locking/unlocking area L1, the second locking/unlocking area L2, the third locking/unlocking area L3, and another area the mobile terminal 20 is present. The other area is a region which corresponds to none of the first locking/unlocking area L1, the second locking/unlocking area L2, and the third locking/unlocking area L3. When the location determination portion F6 has determined that the mobile terminal 20 is present inside the first locking/unlocking area L1 and authentication of the mobile terminal 20 is successful, the vehicle control portion F7 performs vehicle control under which the door for the driver seat is locked or unlocked based on a predetermined user operation performed on the door handle.

Figure 25:
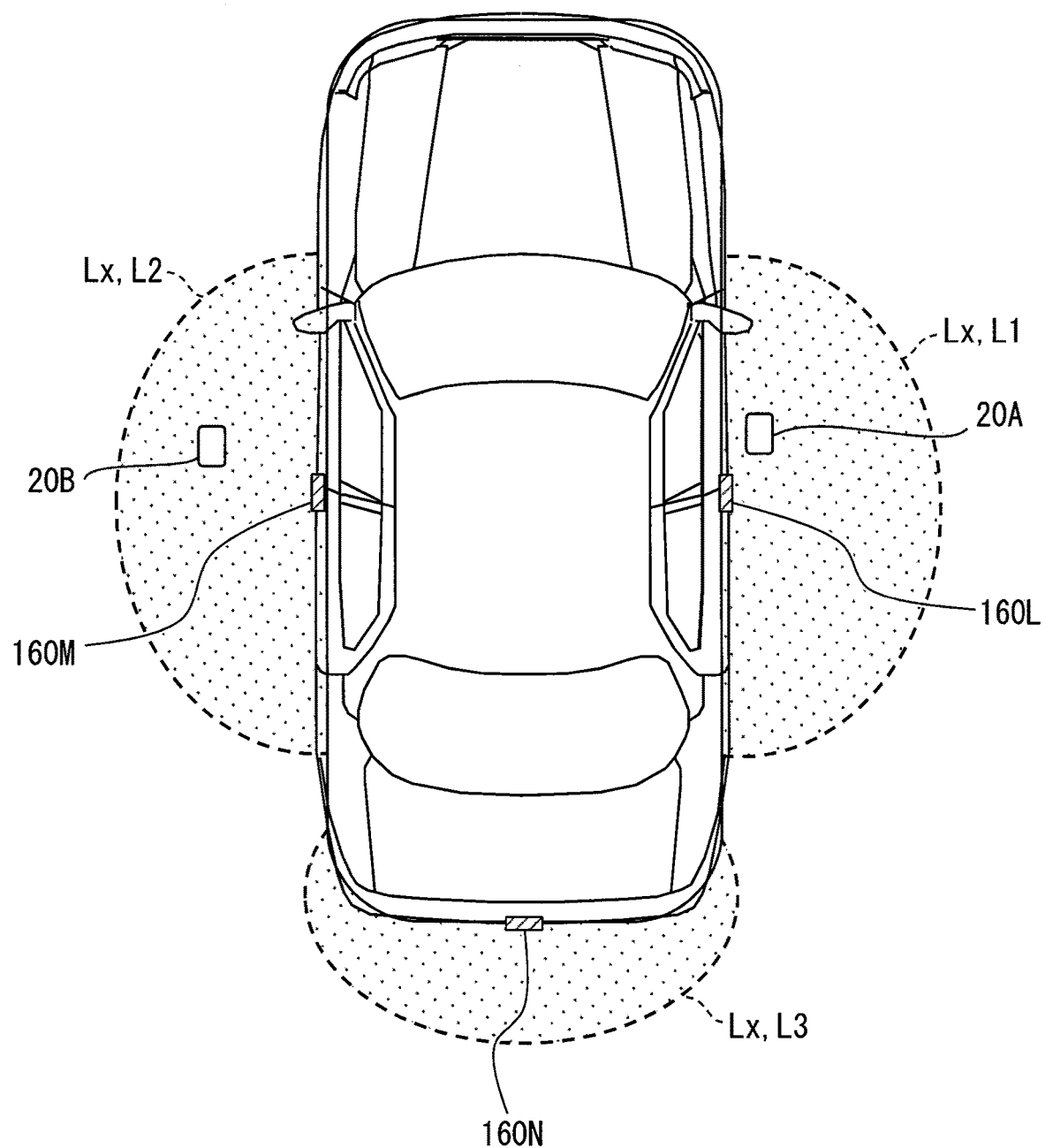
FIG. 25 is a view showing the operation of the location determination portion and an operation of a vehicle control portion in the third modification.

When the plurality of mobile terminals 20 are registered in the vehicle system 10 and the RSSIs from the plurality of mobile terminals 20 have been successfully acquired, the location determination portion F6 may appropriately specify the area in which each of the mobile terminals 20 is present based on the RSSI of each of the mobile terminals 20. For example, in a configuration in which a mobile terminal 20A of a user A and a mobile terminal 20B of a user B are registered in the vehicle system 10, when the mobile terminal 20A is present inside the first locking/unlocking area L1 and the mobile terminal 20B is present inside the second locking/unlocking area L2 as shown in FIG. 25, the vehicle control portion F7 performs vehicle control under which both of the door for the driver seat and the door for the front passenger seat are locked or unlocked. Such a mode can improve convenience when the one vehicle V is shared by the plurality of users. In addition, since the user occupying each of the seats can be specified based on the terminal ID of the mobile terminal 20, it is possible to provide service appropriate to each of the users. The service appropriate to each of the users is, e.g., automatic adjustment of a seat position, adjustment of the temperature and the volume of air-conditioned air, or the like.

Note that, when the location determination portion F6 has determined that one of the mobile terminals 20 is present in the plurality of locking/unlocking areas Lx, i.e., when the determination result includes conflicts, the location determination portion F6 may appropriately specify the location of the mobile terminal 20 using a determination algorithm separately described later in the fifth embodiment.

Figure 26:
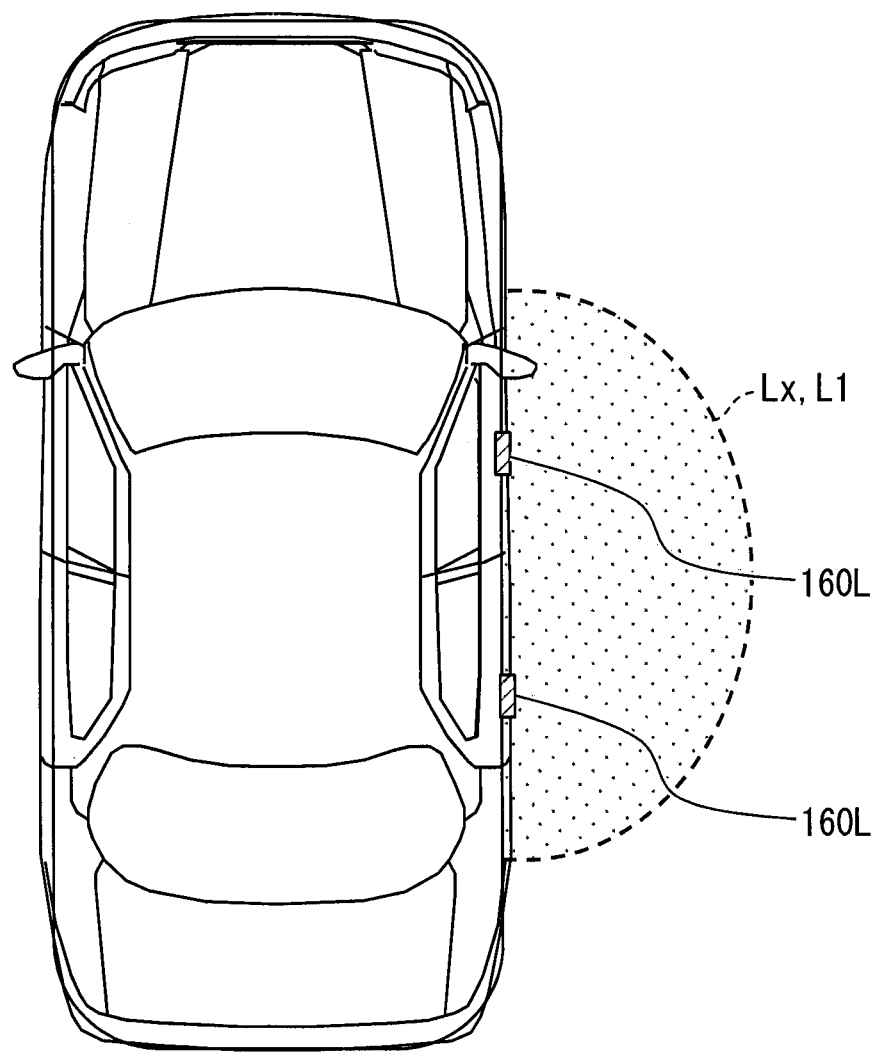
FIG. 26 is a conceptual view showing an example of a mode in which the vehicle compartment external module is disposed.

It may also be possible to apply the concept disclosed in the fourth embodiment to the present third modification and dispose the plurality of vehicle compartment external modules 160 corresponding to one of the locking/unlocking areas Lx. For example, as shown in FIG. 26, the plurality of vehicle compartment external modules 160 corresponding to the first locking/unlocking area L1 may also be disposed. In other words, such a configuration corresponds to a configuration in which the first vehicle compartment external modules 160L are provided. As shown in FIG. 26, when there are the plurality of first vehicle compartment external modules 160L, the location determination portion F6 calculates a representative value (e.g., an average value or a maximum value) based on the RSSIs in the plurality of first vehicle compartment external modules 160L and compares the representative value to the high level threshold or the low level threshold to determine whether or not the mobile terminal 20 is present in the first locking/unlocking area L1. Such a mode can reduce, in the same manner as in the third embodiment and the fourth embodiment, the probability of erroneously determining the location of the mobile terminal 20 due to the mode in which the user carries the mobile terminal 20.

(Fourth Modification)

The location determination system 1 may also determine whether or not the mobile terminal 20 is present in an area (hereinafter referred to as a welcome area) Wx in which a predetermined welcome process is to be performed using the two determination thresholds of the high level threshold and the low level threshold. In other words, the target area as the area with respect to which the location determination system 1 makes a determination may also be the welcome area Wx.

The welcome process is a process in which, when approach of the user is sensed, illumination inside or outside the vehicle compartment is turned on or the air conditioning device is activated. The welcome area Wx is, e.g., an area within 5 m from the vehicle V. The welcome area Wx is preferably set so as to include the locking/unlocking area Lx described above.

Figure 27:
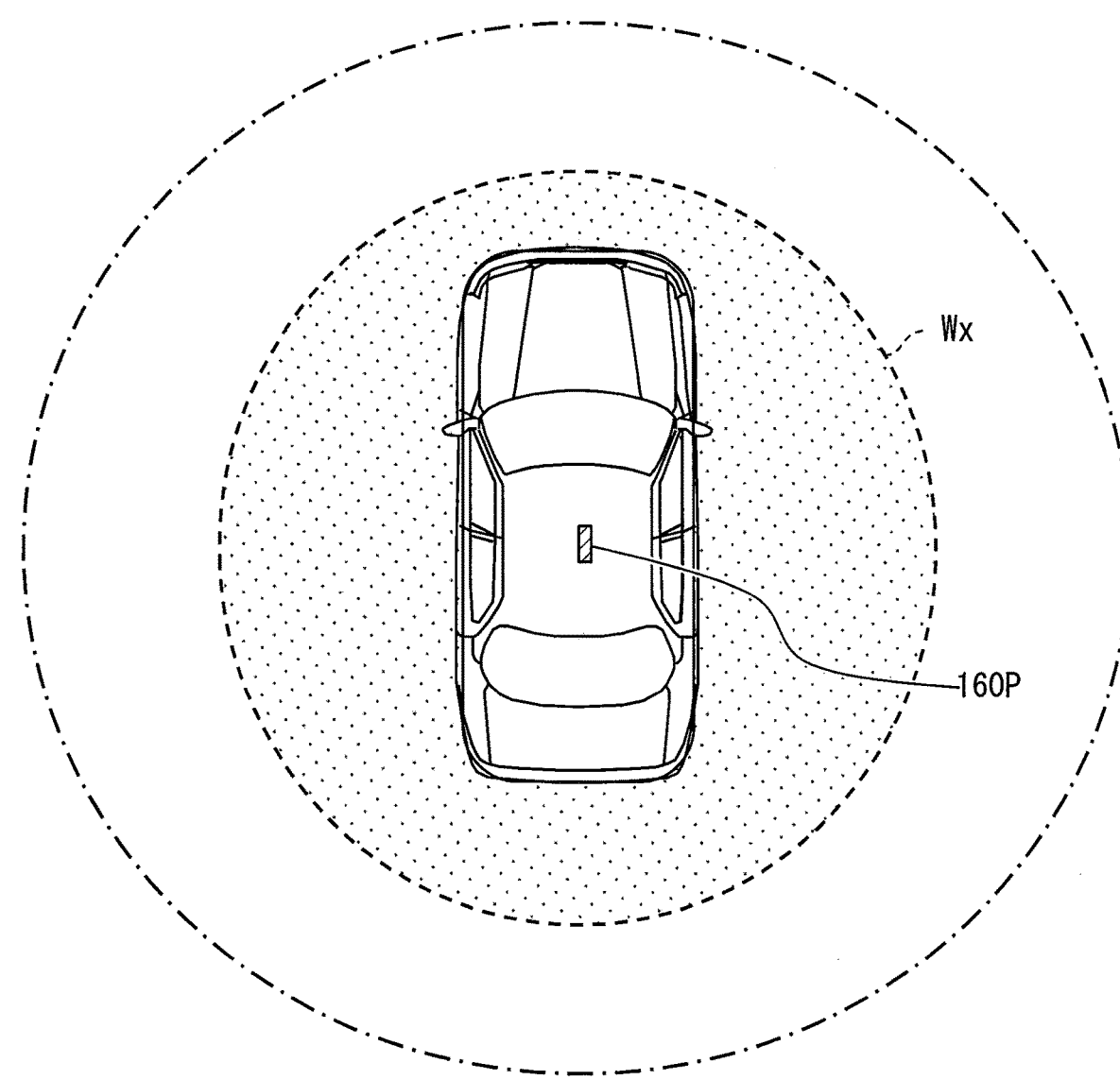
FIG. 27 is a conceptual view showing the mode in which the target area is set in a fourth modification.

FIG. 27 is a view conceptually representing the welcome area Wx. In FIG. 27, a portion hatched with a dot pattern conceptually represents the welcome area Wx. Note that, in FIG. 27, a region enclosed by a one-dot-dash line conceptually represents a range in which the vehicle system 10 and the mobile terminal 20 can perform short-range communication with each other.

When the welcome area Wx is set for the vehicle V, the vehicle system 10 includes at least one vehicle compartment external module 160 forming the communication area including the welcome area Wx. The welcome area Wx may also be formed using the plurality of vehicle compartment external modules 160. By way of example, it is assumed herein that the welcome area Wx is formed using one vehicle compartment external module 160P. The position at which the vehicle compartment external module 160P is mounted may appropriately be designed. For example, the position at which the vehicle compartment external module 160P is mounted can be in, e.g., the roof portion of the vehicle V or the like.

In the configuration of the present fourth modification, the location determination portion F6 determines whether or not the mobile terminal 20 is present inside the welcome area Wx using the RSSI in the vehicle compartment external module 160P. Specifically, in a state where the location determination portion F6 has determined that the mobile terminal 20 is present outside the welcome area Wx, when the RSSI detected by the vehicle compartment external module 160P becomes equal to or more than the predetermined high level threshold, the location determination portion F6 determines that the mobile terminal 20 is present inside the welcome area Wx.

Also, in a state where the location determination portion F6 has determined that the mobile terminal 20 is present inside the welcome area Wx, when the RSSI in the vehicle compartment external module 160P becomes equal to or less than the low level threshold, the location determination portion F6 determines that the mobile terminal 20 is present outside the welcome area Wx. The location determination portion F6 may also make a determination using the average strength instead of the RSSI. With the configuration in which the location determination portion F6 thus determines the location of the mobile terminal 20 using the two thresholds of the high level threshold and the low level threshold, it is possible to accurately determine whether or not the mobile terminal 20 is present inside the welcome area Wx.

Figure 28:
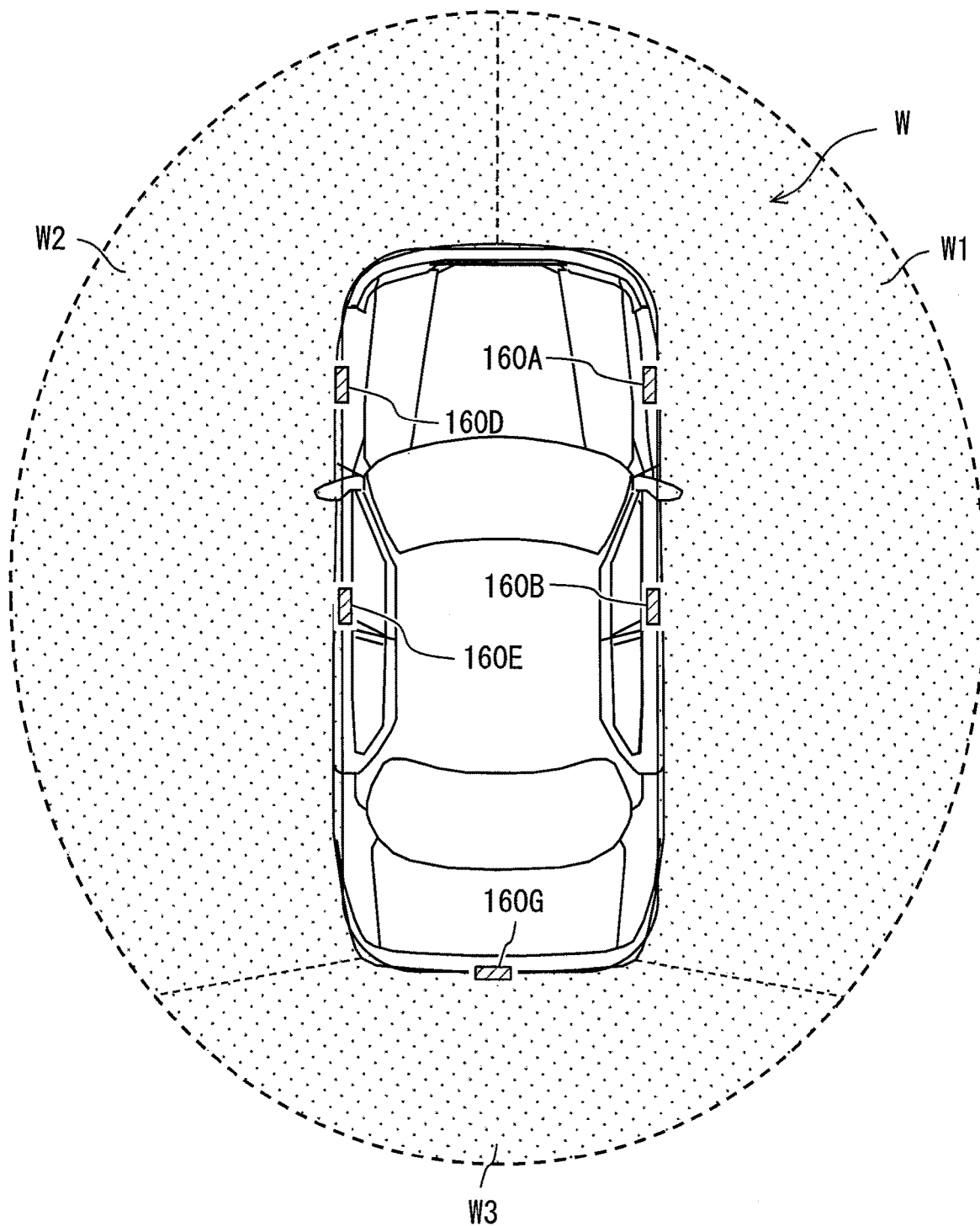
FIG. 28 is a view showing an example of the operation of the location determination portion in the fourth modification.

Note that the welcome area Wx may also be formed using the plurality of vehicle compartment external modules 160. For example, as shown in FIG. 28, the welcome area Wx may also be formed using the total of five vehicle compartment external modules 160. Each of the vehicle compartment external modules 160A, 160B, 160D, 160E, and 160G shown in FIG. 28 corresponds to the vehicle compartment external modules 160 denoted by the same reference numerals and mentioned in the third embodiment.

The right first module 160A and the right second module 160B are the vehicle compartment external modules 160 each forming the communication area on the right side of the vehicle. The left first module 160D and the left second module 160E are the vehicle compartment external modules 160 each forming the communication area on the left side of the vehicle. The rear end portion module 160G is the vehicle compartment external module 160 forming the communication area on the rear side of the vehicle.

Note that the number of the vehicle compartment external modules 160 provided to form the welcome area Wx is not limited to 5, and may also be 2, 3, 7, or the like. If the vehicle system 10 includes the right third module 160C and the left third module 160F each shown in FIG. 17, the RSSIs in these vehicle compartment external modules 160 may also be used for a determination of whether the mobile terminal 20 is present inside or outside the welcome area Wx.

As shown in FIG. 28, when there are the plurality of vehicle compartment external modules 160 which can be used for a determination of whether the mobile terminal 20 is present inside or outside the welcome area Wx, the location determination portion F6 calculates the vehicle compartment external strength representative value based on the respective RSSIs in the plurality of vehicle compartment external modules 160 and compares the vehicle compartment external strength representative value to the high level threshold or the low level threshold to determine whether or not the mobile terminal 20 is present inside the welcome area Wx. With such a mode, it is possible to reduce the probability of erroneously determining the location of the mobile terminal 20 due to the mode in which the user carries the mobile terminal 20. Note that, in a mode in which the welcome area Wx is formed using the three or more vehicle compartment external modules 160, as the vehicle compartment external strength representative value, a maximum value in the individual vehicle compartment external modules 160 is preferably used. By specifying a sub-area of the welcome area Wx in which the user is present, it is possible to perform, based on a direction in which the user is present, the welcome process such as, e.g., turning on of illumination on a side on which the user is present.

Also, in a configuration in which the welcome area Wx is formed using the plurality vehicle compartment external modules 160 forming the communication areas in different regions outside the vehicle compartment, when having determined that the mobile terminal 20 is present inside the welcome area Wx, the location determination portion F6 can determine a detailed location of the mobile terminal 20 inside the welcome area Wx based on the respective RSSIs in the plurality of vehicle compartment external modules 160.

For example, the location determination portion F6 in the present modification determines, based on the respective RSSIs in the plurality of vehicle compartment external modules 160, in which one of a right area W1 corresponding to the right side of the vehicle, a left area W2 corresponding to the left side of the vehicle, and a rear area W3 corresponding to the rear side of the vehicle the mobile terminal 20 is present. For the sake of convenience, small segments such as the right area W1, the left area W2, and the rear area W3 resulting from the division of the welcome area Wx are referred to as the sub-areas. FIG. 28 is a view conceptually showing the sub-areas.

Note that each of the vehicle compartment external modules 160 is assigned to the sub-area corresponding to the region where the vehicle compartment external module 160 forms the main communication area. For example, each of the right first module 160A and the right second module 160B is the vehicle compartment external module 160 forming the communication area on the right side of the vehicle and is therefore registered as the vehicle compartment external module 160 corresponding to the right area W1. Each of the left first module 160D and the left second module 160E is the vehicle compartment external module 160 forming the communication area on the left side of the vehicle and is therefore registered as the vehicle compartment external module 160 corresponding to the left area W2. The rear end portion module 160G is the vehicle compartment external module 160 forming the communication area on the rear side of the vehicle and is therefore registered as the vehicle compartment external module 160 corresponding to the rear area W3.

In the foregoing settings, when determining that the mobile terminal 20 is present inside the welcome area Wx, the location determination portion F6 specifies, among the plurality of vehicle compartment external modules 160, the largest module which is the vehicle compartment external module 160 in which the average strength is largest and the second largest module which is the vehicle compartment external module 160 in which the average strength is second largest. When the largest module and the second largest module are the vehicle compartment external modules 160 corresponding to the same sub-area, the location determination portion F6 determines that the mobile terminal 20 is present in the sub-area.

For example, when both of the largest module and the second largest module are the vehicle compartment external modules 160 each assigned to the right area W1, the location determination portion F6 determines that the mobile terminal 20 is present in the right area. In other words, such a mode corresponds to a configuration which determines that the mobile terminal 20 is present on the right side of the vehicle when both of the largest module and the second largest module are the vehicle compartment external modules 160 which form the communication areas on the right side of the vehicle.

On the other hand, when the largest module and the second largest module do not correspond to the same sub-area, the difference between the RSSIs therein is calculated. When the difference is equal to or more than a predetermined threshold, the location determination portion F6 may appropriately determine that the mobile terminal 20 is present in the sub-area corresponding to the largest module.

When the difference is less than the predetermined threshold, the location determination portion F6 may appropriately determine that a detailed location of the mobile terminal 20 is unknown. Alternatively, when the difference is less than the predetermined threshold, the location determination portion F6 may also consider that the mobile terminal 20 is present in the vicinity of a boundary between the sub-areas and adopt, as the area in which the mobile terminal 20 is present, both of the sub-area corresponding to the largest module and the sub-area corresponding to the second largest module. Note that a case where the largest module and the second largest module do not correspond to the same sub-area is a case where, e.g., the largest module is the right second module 160B and the second largest module is the rear end portion module 160G or the like. In the mode disclosed heretofore, the location determination portion F6 specifies on which one of the right side, the left side, and the rear side, the mobile terminal 20 is present, but a mode to be used is not limited thereto. The location determination portion F6 may also be configured to specify on which one of the front side and the rear side the mobile terminal 20 is present. Alternatively, the location determination portion F6 may also be configured to specify on which one of the left side and the right side the mobile terminal 20 is present.

Fifth Embodiment

In the third modification, the mode is disclosed in which the location determination portion F6 performs, with respect to each of the plurality of locking/unlocking areas Lx, the same location determination process as performed in the first embodiment described above or the like. However, the method of specifying the area in which the mobile terminal 20 is present is not limited thereto. Another embodiment for specifying the area in which the mobile terminal 20 is present is disclosed herein as a fifth embodiment.

By way of example, in the vehicle system 10 of the present embodiment, the plurality of locking/unlocking areas Lx as the target areas are set outside the vehicle compartment so as not to overlap each other, and at least one of the vehicle compartment external modules 160 is provided for each of the locking/unlocking areas Lx, as shown in FIG. 24. Specifically, the vehicle system 10 includes the first vehicle compartment external module 160L disposed such that the first locking/unlocking area L1 is located at the center of the communication area thereof, the second vehicle compartment external module 160M disposed such that the second locking/unlocking area L2 is located at the center of the communication area thereof, and the third vehicle compartment external module 160N disposed such that the third locking/unlocking area L3 is located at the center of the communication area thereof.

Note that, since the first locking/unlocking area L1 is set in the vicinity of the driver seat door and the driver seat is disposed on the right side of the vehicle V, the first vehicle compartment external module 160L corresponds to the vehicle compartment external module 160 forming the communication area on the right side of the vehicle V. On the other hand, since the second locking/unlocking area L2 is set in the vicinity of the front passenger seat door and the front passenger seat is disposed on the left side of the vehicle, the second vehicle compartment external module 160M corresponds to the vehicle compartment external module 160 forming the communication area on the left side of the vehicle V.

Likewise, since the first locking/unlocking area L1 is set in the vicinity of the driver seat door and the driver seat is disposed on the right side of the vehicle V, the first locking/unlocking area L1 corresponds to the right area. Since the second locking/unlocking area L2 is set in the vicinity of the front passenger seat door and the front passenger seat is disposed on the left side of the vehicle V, the second locking/unlocking area L2 corresponds to the left area.

Figure 29:
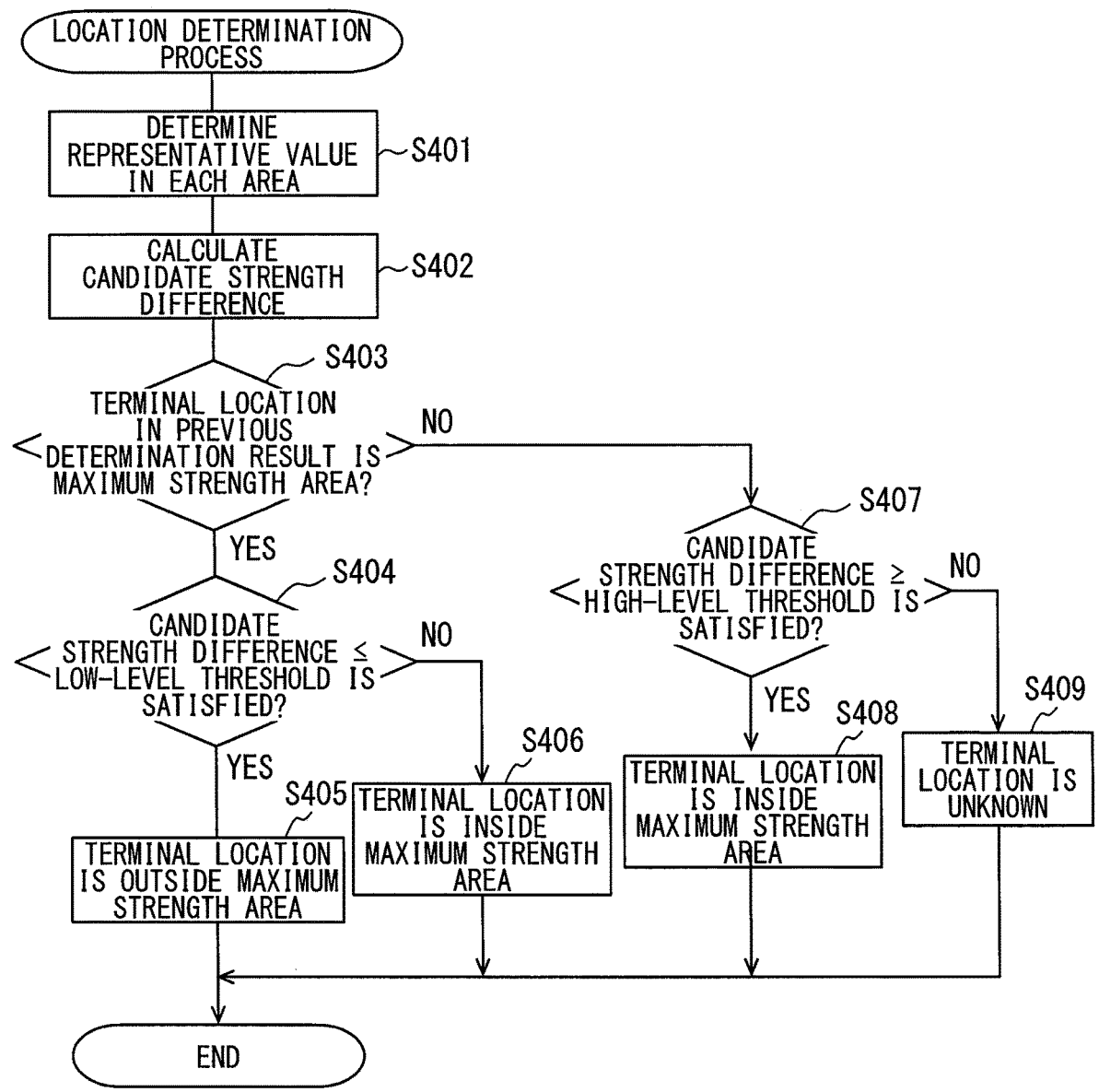
FIG. 29 is a flow chart showing a location determination process in a fifth embodiment.

Using the flow chart shown in FIG. 29, a description will be given of the operation of the location determination portion F6 placed in the settings described above. FIG. 29 is a flow chart for illustrating the location determination process in the present embodiment. It is assumed that the location determination portion F6 has performed, as a preparatory process for the flow chart shown in FIG. 29, a process corresponding to, e.g., S301 to S304 in FIG. 19.

First, in S401, the location determination portion F6 placed in the settings described above determines, for each of the locking/unlocking areas Lx, a representative value (hereinafter referred to as the area representative value) of the RSSIs in the vehicle compartment external module 160 assigned to the locking/unlocking area Lx. The area representative value for the given locking/unlocking area Lx may appropriately be a maximum value of the RSSIs in at least one of the vehicle compartment external modules 160 which is assigned to the locking/unlocking area Lx. The area representative value may also be an average value or a median value.

In the present embodiment, to each of the locking/unlocking areas Lx, one of the vehicle compartment external modules 160 corresponds on a one-to-one basis. Accordingly, the RSSI (more specifically, the average strength) in each of the vehicle compartment external modules 160 is used directly as the area representative value. Specifically, the average strength in the first vehicle compartment external module 160L is used as the area representative value in the first locking/unlocking area L1. The average strength in the second vehicle compartment external module 160M is used as the area representative value in the second locking/unlocking area L2. The average strength in the third vehicle compartment external module 160N is used as the area representative value in the third locking/unlocking area L3.

Next, in S402, the location determination portion F6 calculates a candidate strength difference as a difference between a first strength as the largest area representative value among the plurality of area representative values and a second strength as the second largest area representative value among the plurality of area representative values.

In S403, the location determination portion F6 refers to the location storage portion M2 for the result of the previous location determination process to determine whether or not it has been determined in the previous location determination process that the mobile terminal 20 is present in the locking/unlocking area Lx (hereinafter referred to as the maximum strength area) corresponding to the first strength. When it has been determined in the previous location determination process that the mobile terminal 20 is present in the maximum strength area, the location determination portion F6 makes an affirmative determination in S403, and performs S404. On the other hand, when it has been determined in the previous location determination process that the mobile terminal 20 is not present in the maximum strength area, the location determination portion F6 makes a negative determination in S403, and performs S407.

In S404, the location determination portion F6 compares the candidate strength difference calculated in S402 to the low level threshold to determine whether or not the candidate strength difference is equal to or less than the low level threshold. A specific value of the low level threshold used herein may appropriately be designed. Preferably, the low level threshold is set to a value such as, e.g., +5 dB at which it can be considered that there is no significant difference between the first strength and the second strength.

When the candidate strength difference is equal to or less than the low level threshold, the location determination portion F6 makes an affirmative determination in S404, and performs S405. In S405, the location determination portion F6 determines that the mobile terminal 20 is present outside the maximum strength area, stores the determination result in the location storage portion M2, and ends the present flow.

On the other hand, when the candidate strength difference is in excess of the low level threshold in S404, the location determination portion F6 moves to S406, determines that the mobile terminal 20 is present inside the maximum strength area, and ends the present flow. In other words, the location determination portion F6 maintains the result of the previous determination that the mobile terminal 20 is present in the maximum strength area.

In S407, the location determination portion F6 compares the candidate strength difference calculated in S402 to the high level threshold to determine whether or not the candidate strength difference is equal to or more than the high level threshold. A specific value of the high level threshold used herein may appropriately be designed in a range larger than the low level threshold. Preferably, the high level threshold is set to a value larger than the low level threshold described above by, e.g., 5 dB or more.

When the candidate strength difference is equal to or more than the high level threshold, the location determination portion F6 makes an affirmative determination in S407 and performs S408. On the other hand, when the candidate strength difference is less than the high level threshold, the location determination portion F6 makes a negative determination in S407, and performs S409.

In S408, the location determination portion F6 determines that the mobile terminal 20 is present inside the maximum strength area, stores the determination result in the location storage portion M2, and ends the present flow. In S409, the location determination portion F6 determines that the location (i.e., the terminal location) of the mobile terminal 20 is unknown. Then, the location determination portion F6 stores, in the location storage portion M2, the result of the determination that the location of the mobile terminal 20 is unknown, and ends the present flow. Note that a state where the location determination portion F6 has determined that the terminal location is unknown corresponds to a state where the location determination portion F6 suspends the specification of the terminal location.

With the configuration described above, when the mobile terminal 20 is present in, e.g., the first locking/unlocking area L1, it is possible to accurately detect the presence of the mobile terminal 20 in the first locking/unlocking area L1. Once the location determination portion F6 has determined that the mobile terminal 20 is present in the first locking/unlocking area L1, the location determination portion F6 holds the determination result until the candidate strength difference becomes equal to or less than the predetermined low level threshold. Accordingly, it is possible to reduce the probability that the reception strength in the first vehicle compartment external module 160L decreases under the influence of a multipath or the like, and the location determination portion F6 erroneously determines that the mobile terminal 20 is not present in the first locking/unlocking area L1 despite the presence of the mobile terminal 20 in the first locking/unlocking area L1. In other words, it is possible to enhance the stability of the result of determining the location of the mobile terminal 20. The same applies also to another locking/unlocking area Lx, such as the second locking/unlocking area L2. In other words, the configuration of the present embodiment can increase the accuracy of the determination of the area in which the mobile terminal 20 is present.

(Fifth Modification)

A fifth modification is a modification of the fifth embodiment. In the fifth embodiment described above, the mode is disclosed in which, as the target areas, the first locking/unlocking area L1, the second locking/unlocking area L2, and the third locking/unlocking area L3 are set. However, a mode to be used is not limited thereto. The third locking/unlocking area L3 need not necessarily be set.

Alternatively, the target area may also correspond to the right area W1, the left area W2 as the welcome area, and the like. The location determination portion F6 may also be configured to determine on which one of the right side and the left side of the vehicle V the mobile terminal 20 is present. Alternatively, the location determination portion F6 may also be configured to determine on which one of the front side and the rear side of the vehicle V the mobile terminal 20 is present. In other words, a predetermine range in front of the vehicle V may also be set as the target area. Note that, when the predetermine range in front of the vehicle V is set as the target area, the vehicle compartment external module 160 is preferably disposed also in the front end portion of the vehicle V.

(Sixth Modification)

Figure 30:
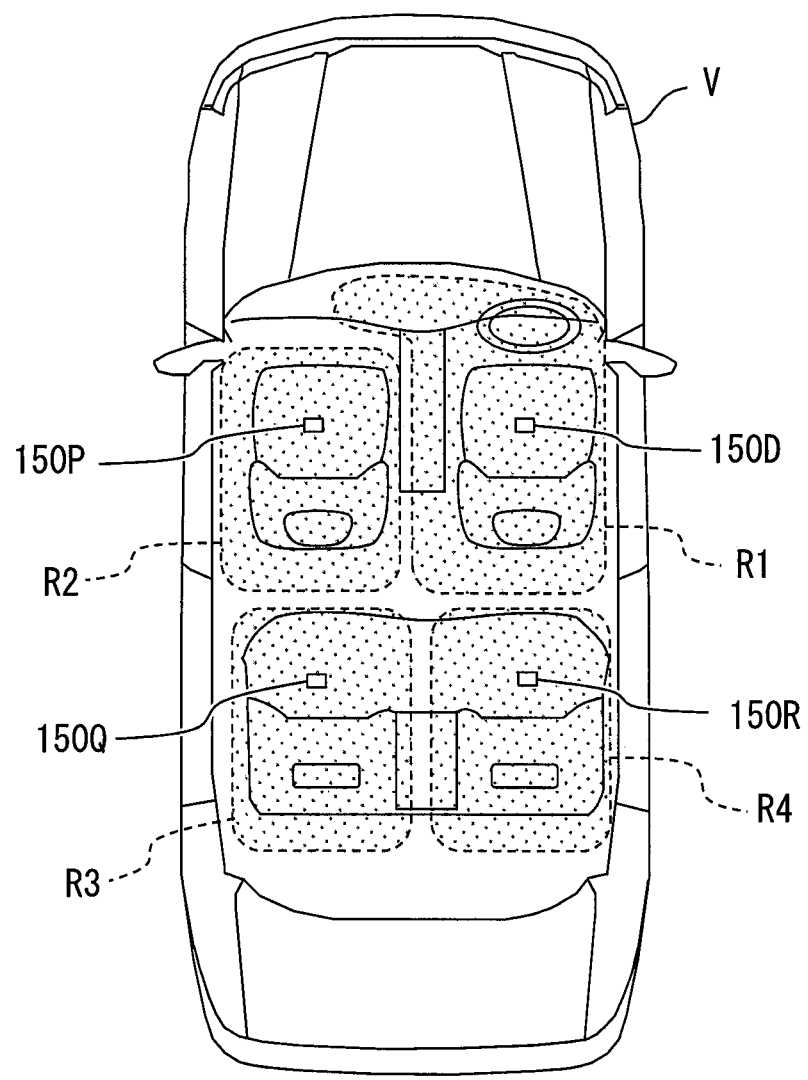
FIG. 30 is a conceptual view showing the mode in which a target area is set in a sixth modification.

In the fifth embodiment described above, the mode is shown in which the plurality of target areas are set outside the vehicle compartment so as not to overlap each other, but a mode to be used is not limited thereto. As shown in FIG. 30, the plurality of target areas may also be set inside the vehicle compartment. FIG. 30 shows a mode in which, as the target areas, a driver seat area R1, a front passenger seat area R2, a first rear passenger seat area R3, and a second rear passenger seat area R4 are set. The driver seat area R1, the front passenger seat area R2, the first rear passenger seat area R3, and the second rear passenger seat area R4 respectively correspond to the driver seat area, the front passenger seat area, the first rear passenger seat area, and the second rear passenger seat area each described above. The driver seat module 150D corresponds to a driver seat reception portion. The front passenger seat module 150P corresponds to a front passenger seat reception portion.

Such a target area setting mode allows the location of the mobile terminal 20 inside the vehicle compartment to be accurately determined. Note that the first rear passenger seat area R3 and the second rear passenger seat area R4 may also be integrated into one target area to be handled as such.

The fifth embodiment can also be combined with the sixth modification and implemented. Specifically, as the target areas, the first locking/unlocking area L1, the second locking/unlocking area L2, the third locking/unlocking area L3, the driver seat area R1, the front passenger seat area R2, the first rear passenger seat area R3, and the second rear passenger seat area R4 may also be set. Alternatively, it may also be possible to apply the determination algorithm shown by way of example as the third modification to the area setting disclosed as the present sixth modification and specify in which area the mobile terminal 20 is present.

The flowcharts or the processing depicted in the flowcharts according to the present disclosure include a plurality of sections (alternatively referred to as steps) each indicated as S101 or the like. Some of the sections may be further divided into a plurality of subsections or may be appropriately combined to configure a single section. Each of these sections may also be referred to as a circuit, a device, a module, or means.

Each of the plurality of sections or some of the sections combined to each other can be embodied as (i) a software section combined with a hardware unit (e.g., a computer) or (ii) a hardware section (e.g., an integrated circuit or a wiring logic circuit) including or excluding a function of a relevant device. The hardware section may still alternatively be installed in a microcomputer.

Although the present disclosure has been described in accordance with the examples, it is understood that the disclosure is not limited to such examples or structures. The present disclosure covers various modification examples and equivalent arrangements. In addition, while the various elements are shown in various combinations and configurations, which are exemplary, other combinations and configurations, including more, less or only a single element, are also within the spirit and scope of the present disclosure.

The invention claimed is:

1. A location determination system, comprising:
   a vehicle device mounted in a vehicle; and
   a mobile terminal provided as a communication terminal to be carried by a user of the vehicle and set to transmit a radio signal including transmission source information at least once within a predetermined period of time, wherein
   the vehicle device includes:
      a reception portion configured to receive the radio signal transmitted from the mobile terminal via an antenna disposed in the vehicle and detect a reception strength of the received radio signal; and
      a location determination portion configured to determine, based on the reception strength of the radio signal detected by the reception portion, whether the mobile terminal is present inside a target area set in advance based on a position at which the antenna is disposed, wherein,
   as determination thresholds for the location determination portion to determine whether the mobile terminal is present inside the target area based on the reception strength of the radio signal detected by the reception portion, two parameters that are a high level threshold and a low level threshold lower than the high level threshold are set, wherein,
   when the location determination portion has previously determined that the mobile terminal is present outside the target area, the location determination portion is configured to determine that the mobile terminal has moved from outside the target area to inside the target area in response to the reception strength of the radio signal detected by the reception portion becoming greater than or equal to the high level threshold, and wherein,
   when the location determination portion has previously determined that the mobile terminal is present inside the target area, the location determination portion is configured to determine that the mobile terminal has moved from inside the target area to outside the target area in response to the reception strength of the radio signal detected by the reception portion becoming less than or equal to the low level threshold.

2. The location determination system according to claim 1, wherein
   the vehicle device includes, as the reception portion, a vehicle compartment internal reception portion configured to receive the radio signal transmitted from the mobile terminal via a vehicle compartment internal antenna disposed inside a vehicle compartment of the vehicle and detect the reception strength of the received radio signal, wherein the location determination portion is configured to determine, based on the reception strength of the radio signal detected by the vehicle compartment internal reception portion, whether the mobile terminal is present inside the vehicle compartment, wherein, when the location determination portion has previously determined that the mobile terminal is present outside the vehicle compartment, the location determination portion is configured to determine that the mobile terminal has moved from outside the vehicle compartment to inside the vehicle compartment in response to the reception strength of the radio signal detected by the vehicle compartment internal reception portion becoming greater than or equal to the high level threshold, and wherein, when the location determination portion has previously determined that the mobile terminal is present inside the vehicle compartment, the location determination portion is configured to determine that the mobile terminal has moved from inside the vehicle compartment to outside the vehicle compartment in response to the reception strength of the radio signal detected by the vehicle compartment internal reception portion becoming less than or equal to the low level threshold.

3. The location determination system according to claim 2, wherein the vehicle device includes a plurality of the vehicle compartment internal reception portion, wherein the location determination portion is configured to calculate, based on the reception strength of the radio signal detected by each of the plurality of vehicle compartment internal reception portions, a vehicle compartment internal strength representative value provided as a representative value of the reception strength of the radio signal inside the vehicle compartment, wherein, when the location determination portion has previously determined that the mobile terminal is present outside the vehicle compartment, the location determination portion is configured to determine that the mobile terminal has moved from outside the vehicle compartment to inside the vehicle compartment in response to the vehicle compartment internal strength representative value becoming greater than or equal to the high level threshold, and wherein, when the location determination portion has previously determined that the mobile terminal is present inside the vehicle compartment, the location determination portion is configured to determine that the mobile terminal has moved from inside the vehicle compartment to outside the vehicle compartment in response to the vehicle compartment internal strength representative value becoming less than or equal to the low level threshold.

4. The location determination system according to claim 1, wherein the vehicle device includes, as the reception portion:

a vehicle compartment internal reception portion configured to receive the radio signal transmitted from the mobile terminal via a vehicle compartment internal antenna disposed inside a vehicle compartment of the vehicle and detect the reception strength of the received radio signal; and a vehicle compartment external reception portion configured to receive the radio signal transmitted from the mobile terminal via a vehicle compartment external antenna disposed outside the vehicle compartment of the vehicle and detect the reception strength of the received radio signal, wherein the location determination portion is configured to calculate, based on the reception strength of the radio signal detected by the vehicle compartment internal reception portion and the reception strength of the radio signal detected by the vehicle compartment external reception portion, a strength differential value indicative of a difference between a signal strength of the radio signal inside the vehicle compartment and the signal strength of the radio signal outside the vehicle compartment, wherein, when the location determination portion has previously determined that the mobile terminal is present outside the vehicle compartment, the location determination portion is configured to determine that the mobile terminal has moved from outside the vehicle compartment to inside the vehicle compartment in response to the strength differential value becoming greater than or equal to the high level threshold, and wherein, when the location determination portion has previously determined that the mobile terminal is present inside the vehicle compartment, the location determination portion is configured to determine that the mobile terminal has moved from inside the vehicle compartment to outside the vehicle compartment in response to the strength differential value becoming less than or equal to the low level threshold.

5. The location determination system according to claim 4, wherein the vehicle device includes a plurality of the vehicle compartment internal reception portion and a plurality of the vehicle compartment external reception portion, wherein the location determination portion is configured to calculate, based on the reception strength of the radio signal detected by each of the plurality of vehicle compartment internal reception portions, a vehicle compartment internal strength representative value as a representative value of the reception strength of the radio signal inside the vehicle compartment, wherein the location determination portion is configured to calculate, based on the reception strength of the radio signal detected by each of the plurality of vehicle compartment external reception portions, a vehicle compartment external strength representative value as a representative value of the reception strength of the radio signal outside the vehicle compartment, and wherein the location determination portion is configured to calculate the strength differential value by subtracting the vehicle compartment external strength representative value from the vehicle compartment internal strength representative value.

6. The location determination system according to claim 1, wherein the vehicle device includes, as the reception portion:

a vehicle compartment internal reception portion configured to receive the radio signal transmitted from the mobile terminal via a vehicle compartment internal antenna disposed inside a vehicle compartment of the vehicle and detect the reception strength of the received radio signal; and a vehicle compartment external reception portion configured to receive the radio signal transmitted from the mobile terminal via a vehicle compartment external antenna disposed outside the vehicle compartment of the vehicle and detect the reception strength of the received radio signal, wherein the location determination portion is configured to calculate, based on the reception strength of the radio signal detected by the vehicle compartment internal reception portion and the reception strength of the radio signal detected by the vehicle compartment external reception portion, a strength differential value indicative of a difference between a signal strength of the radio signal inside the vehicle compartment and the signal strength of the radio signal outside the vehicle compartment, wherein, when the location determination portion has previously determined that the mobile terminal is present outside the vehicle compartment, the location determination portion is configured to determine that the mobile terminal has moved from outside the vehicle compartment to inside the vehicle compartment in response to the strength differential value becoming less than or equal to the low level threshold, and wherein, when the location determination portion has previously determined that the mobile terminal is present inside the vehicle compartment, the location determination portion is configured to determine that the mobile terminal has moved from inside the vehicle compartment to outside the vehicle compartment in response to the strength differential value becoming greater than or equal to the high level threshold.

7. The location determination system according to claim 6, wherein the vehicle device includes a plurality of the vehicle compartment internal reception portion and a plurality of the vehicle compartment external reception portion, wherein the location determination portion is configured to calculate, based on the reception strength of the radio signal detected by each of the plurality of vehicle compartment internal reception portions, a vehicle compartment internal strength representative value as a representative value of the reception strength of the radio signal inside the vehicle compartment, wherein the location determination portion is configured to calculate, based on the reception strength of the radio signal detected by each of the plurality of vehicle compartment external reception portions, a vehicle compartment external strength representative value as a representative value of the reception strength of the radio signal outside the vehicle compartment, and wherein the location determination portion is configured to calculate the strength differential value by subtracting the vehicle compartment internal strength representative value from the vehicle compartment external strength representative value.

8. The location determination system according to claim 5, wherein the plurality of vehicle compartment external reception portions includes at least two vehicle compartment external reception portions disposed in a side surface of the vehicle closer to a driver seat, and wherein, between the plurality of vehicle compartment external reception portions disposed in a side surface of the vehicle closer to a driver seat, one of the plurality of vehicle compartment external reception portions disposed at a frontmost position and one of the plurality of vehicle compartment external reception portions disposed at a rearmost position are spaced apart at a distance of one meter or more in a front rear direction of the vehicle.

9. The location determination system according to claim 4, wherein the vehicle compartment internal reception portion is disposed at a position inside the vehicle compartment at which the radio signal from the mobile terminal present outside the vehicle compartment does not directly arrive, and wherein the vehicle compartment external reception portion is disposed at a position in a body of the vehicle at which the radio signal from the mobile terminal present inside the vehicle compartment does not directly arrive.

10. The location determination system according to claim 4, wherein a locking/unlocking threshold to determine whether the mobile terminal is present inside a locking/unlocking area is set in advance, the locking/unlocking threshold being a threshold different from the determination threshold, the locking/unlocking area being provided as an area where a process of controlling a locked and unlocked state of a door provided in the vehicle is performed, wherein, when the location determination portion has determined that the mobile terminal is present outside the vehicle compartment, the location determination portion is configured to determine that the mobile terminal is present inside the locking/unlocking area when the reception strength of the radio signal detected by the vehicle compartment external reception portion is greater than or equal to the locking/unlocking threshold, and wherein, when the location determination portion has determined that the mobile terminal is present outside the vehicle compartment, the location determination portion is configured to determine that the mobile terminal is not present inside the locking/unlocking area when the reception strength of the radio signal detected by the vehicle compartment external reception portion is less than the locking/unlocking threshold.

11. The location determination system according to claim 1, wherein the target area is provided by a locking/unlocking area where the vehicle device is to perform a process of controlling a locked and unlocked state of a door provided in the vehicle based on a determination made by the location determination portion that the mobile terminal is present inside the target area, the locking/unlocking area being set in a predetermined region outside the vehicle compartment, wherein, in the reception portion, the locking/unlocking area is included in a communication area, wherein, when the location determination portion has previously determined that the mobile terminal is present outside the locking/unlocking area, the location determination portion is configured to determine that the mobile terminal has moved from outside the locking/unlocking area to inside the locking/unlocking area in response to the reception strength of the radio signal detected by the reception portion becoming greater than or equal to the high level threshold, and wherein, when the location determination portion has previously determined that the mobile terminal is present inside the locking/unlocking area, the location determination portion is configured to determine that the mobile terminal has moved from inside the locking/unlocking area to outside the locking/unlocking area in response to the reception strength of the radio signal detected by the reception portion becoming less than or equal to the low level threshold.

12. The location determination system according to claim 11, wherein
the vehicle device includes a plurality of the reception portion provided at different positions to cause the locking/unlocking area to be included in communication areas, wherein
the location determination portion is configured to calculate, based on the reception strength of the radio signal detected by each of the plurality of reception portions, a strength representative value provided as a representative value of the reception strength of the radio signal in the plurality of reception portions, wherein,
when the location determination portion has previously determined that the mobile terminal is present outside the locking/unlocking area, the location determination portion is configured to determine that the mobile terminal has moved from outside the locking/unlocking area to inside the locking/unlocking area in response to the strength representative value becoming greater than or equal to the high level threshold, and wherein,
when the location determination portion has previously determined that the mobile terminal is present inside the locking/unlocking area, the location determination portion is configured to determine that the mobile terminal has moved from inside the locking/unlocking area to outside the locking/unlocking area in response to the strength representative value becoming less than or equal to the low level threshold.

13. The location determination system according to claim 1, wherein
the target area is provided by a welcome area set in advance as a region regarded as a periphery of the vehicle, wherein
in the reception portion, the welcome area is included in a communication area, wherein,
when the location determination portion has previously determined that the mobile terminal is present outside the welcome area, the location determination portion is configured to determine that the mobile terminal has moved from outside the welcome area to inside the welcome area in response to the reception strength of the radio signal detected by the reception portion becoming greater than or equal to the high level threshold, and wherein,
when the location determination portion has previously determined that the mobile terminal is present inside the welcome area, the location determination portion is configured to determine that the mobile terminal has moved from inside the welcome area to outside the welcome area in response to the reception strength of the radio signal detected by the reception portion becoming less than or equal to the low level threshold.

14. The location determination system according to claim 13, wherein
the vehicle device includes a plurality of the reception portion provided at different positions to cause at least a part of the welcome area is included in communication areas, wherein
the location determination portion is configured to calculate, based on the reception strength of the radio signal detected by each of the plurality of reception portions, a strength representative value provided as a representative value of the reception strength of the radio signal in the plurality of reception portions, wherein,
when the location determination portion has previously determined that the mobile terminal is present outside the welcome area, the location determination portion is configured to determine that the mobile terminal has moved from outside the welcome area to inside the welcome area in response to the strength representative value becoming greater than or equal to the high level threshold, and wherein,
when the location determination portion has previously determined that the mobile terminal is present inside the welcome area, the location determination portion is configured to determine that the mobile terminal has moved from inside the welcome area to outside the welcome area in response to the strength representative value becoming less than or equal to the low level threshold.

15. The location determination system according to claim 13, wherein
the vehicle device includes a plurality of the reception portion each of which has a different communication area, and wherein
when the location determination portion determines that the mobile terminal is present inside the welcome area, the location determination portion is configured to determine a detailed location of the mobile terminal inside the welcome area based on the reception strength of each of the plurality of reception portions.

16. The location determination system according to claim 1, wherein
a plurality of the target area set in different regions are provided, wherein
at least one reception portion is provided in each of the plurality of target areas to correspond one another, wherein
the location determination portion is configured to determine, for each of the plurality of target areas, an area representative value provided as a representative value of the reception strength in the reception portion assigned to corresponding one of the plurality of target areas based on the reception strength in the at least one reception portion assigned to the corresponding one of the plurality of target areas, wherein
the location determination portion is configured to calculate a candidate strength difference by subtracting a second strength that is a second largest area representative value from a first strength that is a largest area representative value, wherein,
when the location determination portion has not previously determined that the mobile terminal is present inside the target area corresponding to the first strength, the location determination portion is configured to determine that the mobile terminal is present inside the target area corresponding to the first strength in response to the candidate strength difference becoming greater than or equal to the high level threshold, and wherein,
when the location determination portion has previously determined that the mobile terminal is present inside the target area corresponding to the first strength, the location determination portion is configured to determine that the mobile terminal has moved from inside the target area corresponding to the first strength to outside the target area corresponding to the first strength in response to the candidate strength difference becoming less than or equal to the low level threshold.

17. The location determination system according to claim 16, wherein
a right area corresponding to a predetermined range on a right side of the vehicle and a left area corresponding to a predetermined range on a left side of the vehicle are provided as the target area outside the vehicle compartment, wherein
the vehicle device includes:
a right reception portion provided, as the reception portion corresponding to the right area, to include the right side of the vehicle as a communication area; and
a left reception portion provided, as the reception portion corresponding to the left area, to include the left side of the vehicle as the communication area, and wherein
the location determination portion is configured to detect that the mobile terminal is present in the right area or the mobile terminal is present in the left area by the determination using the candidate strength difference.

18. The location determination system according to claim 16, wherein
a driver seat area corresponding to a predetermined range in a periphery of a driver seat and a front passenger seat area corresponding to a predetermined range in a periphery of a front passenger seat are provided as the target area inside the vehicle compartment, wherein
the vehicle device includes:
a driver seat reception portion connected to the antenna set in the periphery of the driver seat as the communication area; and
a front passenger seat reception portion connected to the antenna set in the periphery of the front passenger seat as the communication area, and wherein
the location determination portion is configured to detect that the mobile terminal is present in the driver seat area or the mobile terminal is present in the front passenger seat area by the determination using the candidate strength difference.

19. The location determination system according to claim 1, wherein
the location determination portion is configured to determine that the mobile terminal is present outside the vehicle compartment when the reception portion does not receive the radio signal transmitted from the mobile terminal.

20. The location determination system according to claim 1, further comprising:
a vehicle state determination portion configured to determine, based on a signal input from a sensor mounted in the vehicle, whether the vehicle is parked and whether a door of the vehicle is locked, wherein
the location determination portion is configured to determine that the mobile terminal is present outside the vehicle compartment based on a determination made by the vehicle state determination portion that the vehicle is parked and a determination made subsequently by the vehicle state determination portion that the door of the vehicle is locked.

21. The location determination system according to claim 1, wherein
the radio signal is configured to be implemented using a radio wave at a frequency which provides a wavelength shorter than a value obtained by multiplying a length of the vehicle in the front rear direction of the vehicle by a predetermined magnification factor of equal to or more than ten.

22. A location determination system, comprising:
a vehicle device mounted in a vehicle; and
a mobile terminal provided as a communication terminal to be carried by a user of the vehicle and set to transmit a radio signal including transmission source information at least once within a predetermined period of time, wherein
the vehicle device includes:
a reception portion configured to receive the radio signal transmitted from the mobile terminal via an antenna disposed in the vehicle and detect a reception strength of the received radio signal; and
a processor configured to determine, based on the reception strength of the radio signal detected by the reception portion, whether the mobile terminal is present inside a target area set in advance based on a position at which the antenna is disposed, wherein,
as determination thresholds for the processor to determine whether the mobile terminal is present inside the target area based on the reception strength of the radio signal detected by the reception portion, two parameters that are a high level threshold and a low level threshold lower than the high level threshold are set, wherein,
when the processor has previously determined that the mobile terminal is present outside the target area, the processor is configured to determine that the mobile terminal has moved from outside the target area to inside the target area in response to the reception strength of the radio signal detected by the reception portion becoming greater than or equal to the high level threshold, and wherein,
when the processor has previously determined that the mobile terminal is present inside the target area, the processor is configured to determine that the mobile terminal has moved from inside the target area to outside the target area in response to the reception strength of the radio signal detected by the reception portion becoming less than or equal to the low level threshold.

* * * * *